US012794729B2

(12) United States Patent
Elberbaum

(10) Patent No.: US 12,794,729 B2
(45) Date of Patent: Nov. 10, 2026

(54) STRAIGHT LIGHT IN AIR DIRECT AND/OR BENDING VIA FIBER OPTIC CABLE ACTUATES LIGHT SWITCH FOR-ALL—FROM BUILDING WALLS TO WEARABLE

(71) Applicant: ELBEX VIDEO LTD., Tokyo (JP)

(72) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 18/097,482

(22) Filed: Jan. 16, 2023

(65) Prior Publication Data

US 2023/0299994 A1 Sep. 21, 2023

Related U.S. Application Data

(63) Continuation of application No. 18/092,240, filed on Dec. 31, 2022.

(60) Provisional application No. 63/430,322, filed on Dec. 5, 2022, provisional application No. 63/320,673, filed on Mar. 16, 2022.

(51) Int. Cl.

| | |
|---|---|
| ***H04L 12/28*** | (2006.01) |
| ***H02G 3/08*** | (2006.01) |
| ***H04B 10/112*** | (2013.01) |
| ***H04B 10/114*** | (2013.01) |
| ***H04B 10/25*** | (2013.01) |
| ***H04B 10/27*** | (2013.01) |

(52) U.S. Cl.

CPC ........... *H04L 12/2807* (2013.01); *H02G 3/08* (2013.01); *H04B 10/1123* (2013.01); *H04B 10/114* (2013.01); *H04B 10/2589* (2020.05); *H04B 10/27* (2013.01); *H04L 12/2838* (2013.01)

(58) Field of Classification Search

None

See application file for complete search history.

(56) References Cited

U.S. PATENT DOCUMENTS

| | | | | |
|---|---|---|---|---|
| 4,330,174 A * | 5/1982 | Douglass ............. | G02B 6/3508 385/100 |
| 4,836,636 A * | 6/1989 | Obara .................... | G02B 6/353 385/23 |
| 6,898,342 B2 * | 5/2005 | Sprague ............... | G02B 6/3508 385/20 |

(Continued)

OTHER PUBLICATIONS

Wikipedia, USB, 2020 (Year: 2020).*

(Continued)

*Primary Examiner* — Jai M Lee
(74) *Attorney, Agent, or Firm* — Hassan Abbas Shakir; Shakir Law PLLC

(57) ABSTRACT

A method installs a home automation grid and/or network, structurally hardened for supporting cascading structure via hardened three separated solid structured conductors, including self-lock for a plugin power wires, Live (L), Neutral (N), and Ground (G). The method provides for at least one or two Plastic Optical Fiber (POF) lines, and for combinations via three power lines and two communication signal lines is enabled by a simple plug in assembly into Intelligent Support Boxes (ISB)(s), along with into an electric wall box and hybrid switches, be it a residential and a commercial unit, via a chain of the cascading plurality of ISBs linked to said cascaded POF grids and/or direct to RF and IR signal.

20 Claims, 27 Drawing Sheets

(56) References Cited

U.S. PATENT DOCUMENTS 7,453,686 B2 11/2008 Elberbaum
7,461,012 B2 12/2008 Elberbaum
7,639,907 B2 12/2009 Elberbaum
7,649,727 B2 1/2010 Elberbaum
7,864,500 B2 1/2011 Elberbaum
7,973,647 B2 7/2011 Elberbaum
8,041,221 B2 10/2011 Elberbaum
8,117,076 B2 2/2012 Elberbaum
8,148,921 B2 4/2012 Elberbaum
8,170,722 B1 * 5/2012 Elberbaum ......... H04L 12/2803 455/92
8,175,463 B2 * 5/2012 Elberbaum ............ G08C 23/06 398/141
8,269,376 B1 * 9/2012 Elberbaum ............ H01H 9/167 307/115
8,331,794 B2 * 12/2012 Elberbaum ............ G08C 23/06 398/141
8,331,795 B2 * 12/2012 Elberbaum ............ G08C 23/06 398/141
8,340,527 B2 * 12/2012 Elberbaum ............. H10F 55/25 398/113
8,344,668 B2 * 1/2013 Elberbaum ............ G08C 23/06 385/139
8,384,249 B2 2/2013 Elberbaum
8,441,824 B2 5/2013 Elberbaum
8,442,792 B1 5/2013 Elberbaum
8,453,332 B2 6/2013 Elberbaum
8,594,965 B1 11/2013 Elberbaum
8,596,174 B2 12/2013 Elberbaum
8,639,465 B1 * 1/2014 Elberbaum ............ G01R 21/00 702/107
8,742,892 B1 6/2014 Elberbaum
8,930,158 B2 1/2015 Elberbaum
9,018,803 B1 4/2015 Elberbaum
9,036,320 B1 * 5/2015 Elberbaum ............ H01H 89/00 361/160
9,182,553 B2 * 11/2015 Cox ..................... G02B 6/3514
9,219,358 B2 12/2015 Elberbaum
9,257,251 B2 2/2016 Elberbaum
9,281,147 B2 3/2016 Elberbaum
9,541,911 B2 * 1/2017 Elberbaum ............ G05B 15/02
9,608,418 B1 3/2017 Elberbaum
9,684,921 B2 6/2017 Elberbaum
9,684,922 B2 6/2017 Elberbaum
9,684,923 B2 6/2017 Elberbaum
10,225,005 B1 * 3/2019 Elberbaum .............. H02G 3/14
10,313,141 B1 * 6/2019 Elberbaum ........ H04B 10/2589
10,586,671 B2 3/2020 Elberbaum
10,686,535 B2 * 6/2020 Elberbaum ............. H04L 67/12
10,797,476 B2 * 10/2020 Elberbaum .......... H01R 25/162
10,840,686 B1 11/2020 Elberbaum
10,840,687 B1 11/2020 Elberbaum
11,031,760 B2 * 6/2021 Elberbaum ......... H04L 12/2816
11,239,641 B2 * 2/2022 Elberbaum ............ H01R 24/76
11,329,463 B2 * 5/2022 Elberbaum ............ H04B 10/29
11,502,491 B2 * 11/2022 Elberbaum .............. H02G 3/12
2004/0022484 A1 * 2/2004 Sigloch ................ G02B 6/3574 385/16
2007/0040108 A1 * 2/2007 Wenstrand ............. H05B 47/17 250/221
2007/0172087 A1 7/2007 Olsen
2010/0082176 A1 4/2010 Chang
2011/0116751 A1 5/2011 Terlizzi
2016/0054717 A1 2/2016 Elberbaum
2023/0299994 A1 * 9/2023 Elberbaum .............. H02G 3/14 340/4.34

OTHER PUBLICATIONS

International Search Report in patent application PCT/US2023/015325 prepared by the USPTO and mailed Aug. 4, 2023.
Written Opinion of the International Searching Authority in patent application PCT/US2023/015325 prepared by the USPTO and mailed Aug. 4, 2023.

* cited by examiner

FIG. 1A Prior art and current of home electric grid
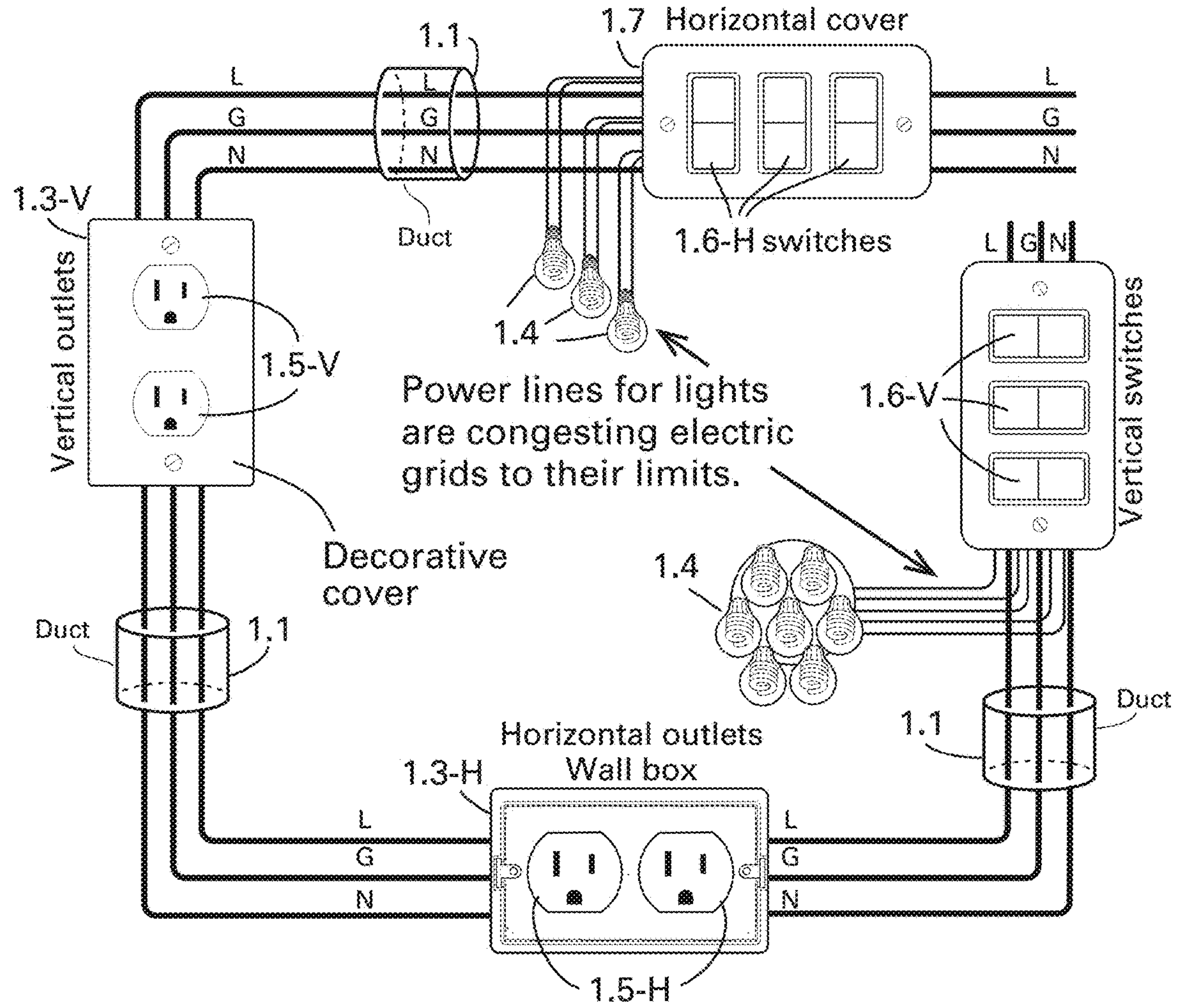
FIG. 1B Prior art of hearing aid devices (HRD)
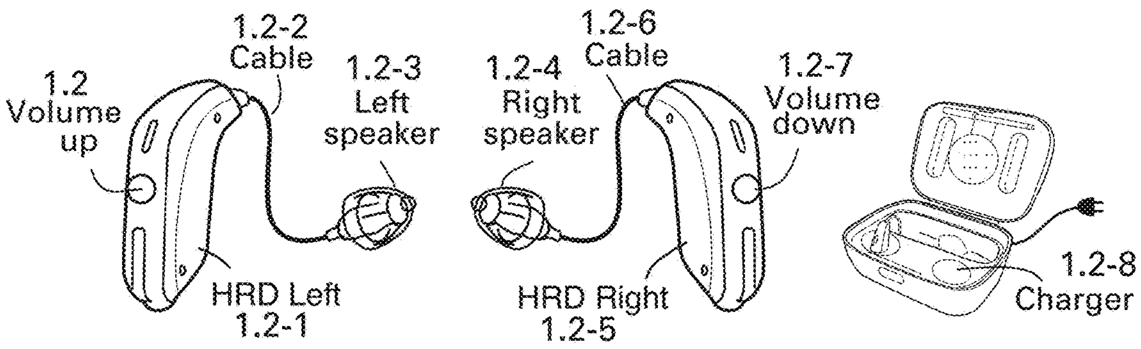

FIG. 2A Prior art of drawn lighting wires into wall boxes
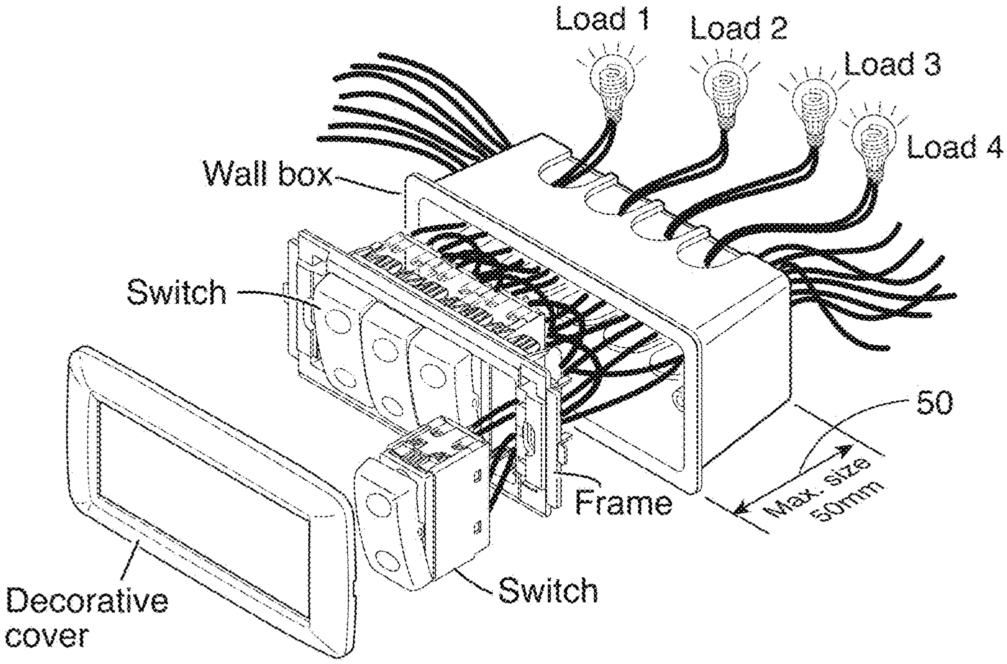
FIG. 2B
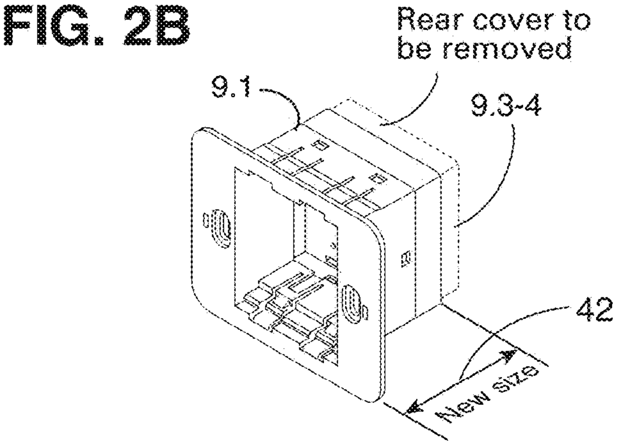
FIG. 3 Beamy Light Switch (BLS)
FIG. 3A
FIG. 3B
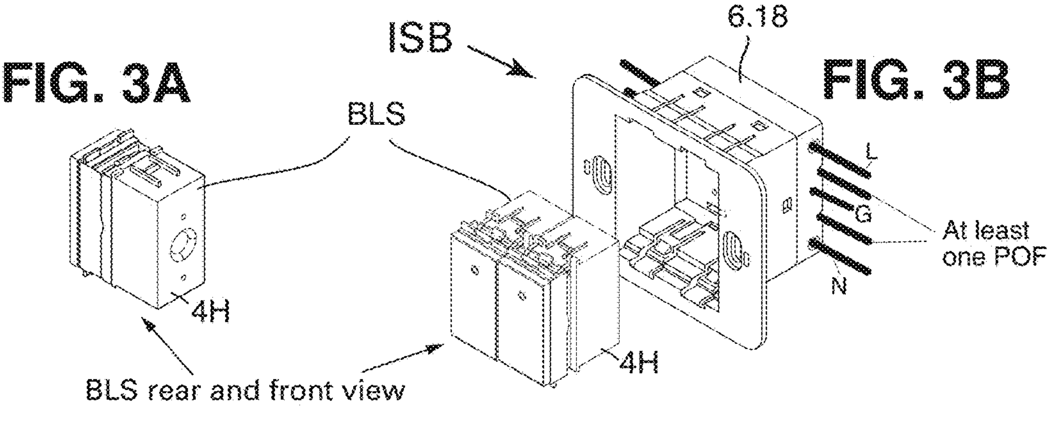

FIG. 4A Propagating Beamy Light FIG. 4B Beamy Light Cut
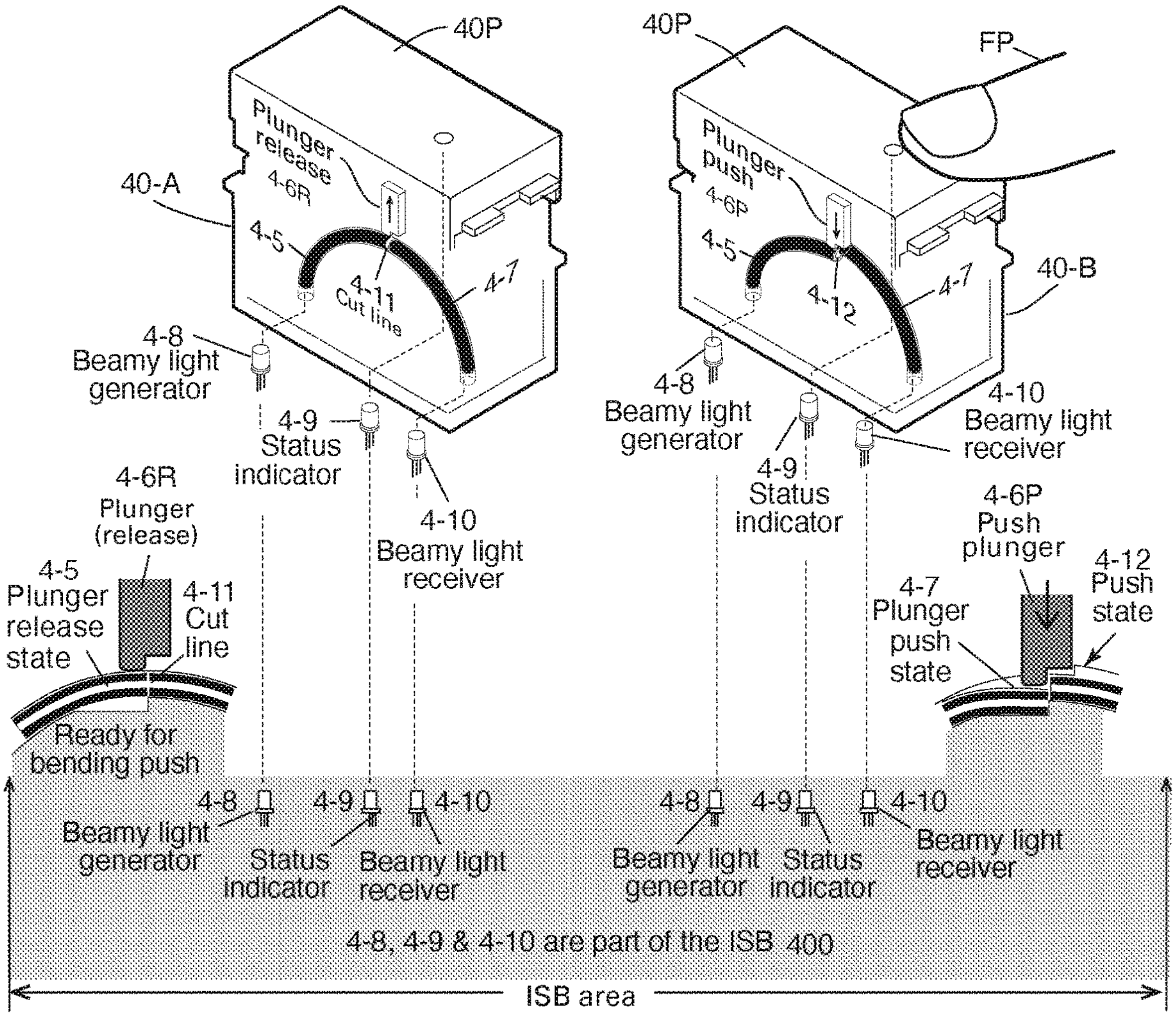
FIG. 4F
Plug in beamy light switch:
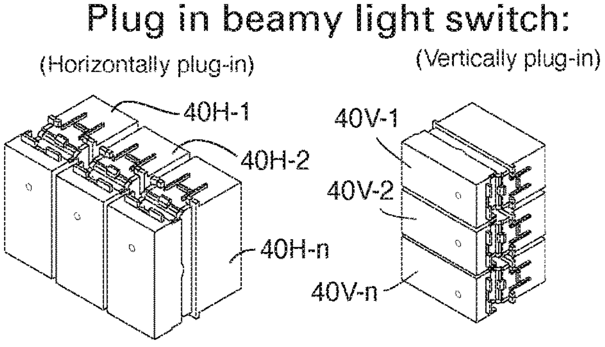
Beamy Light Switch (BLS) is/are plugged horizontal and vertical.
FIG. 4C
Bending & Straight
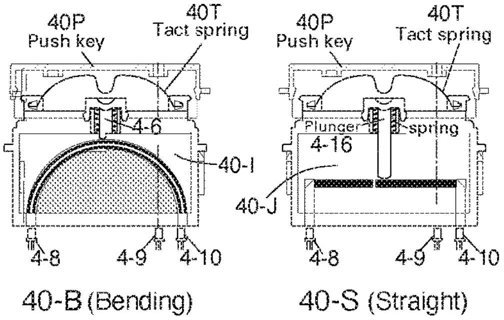

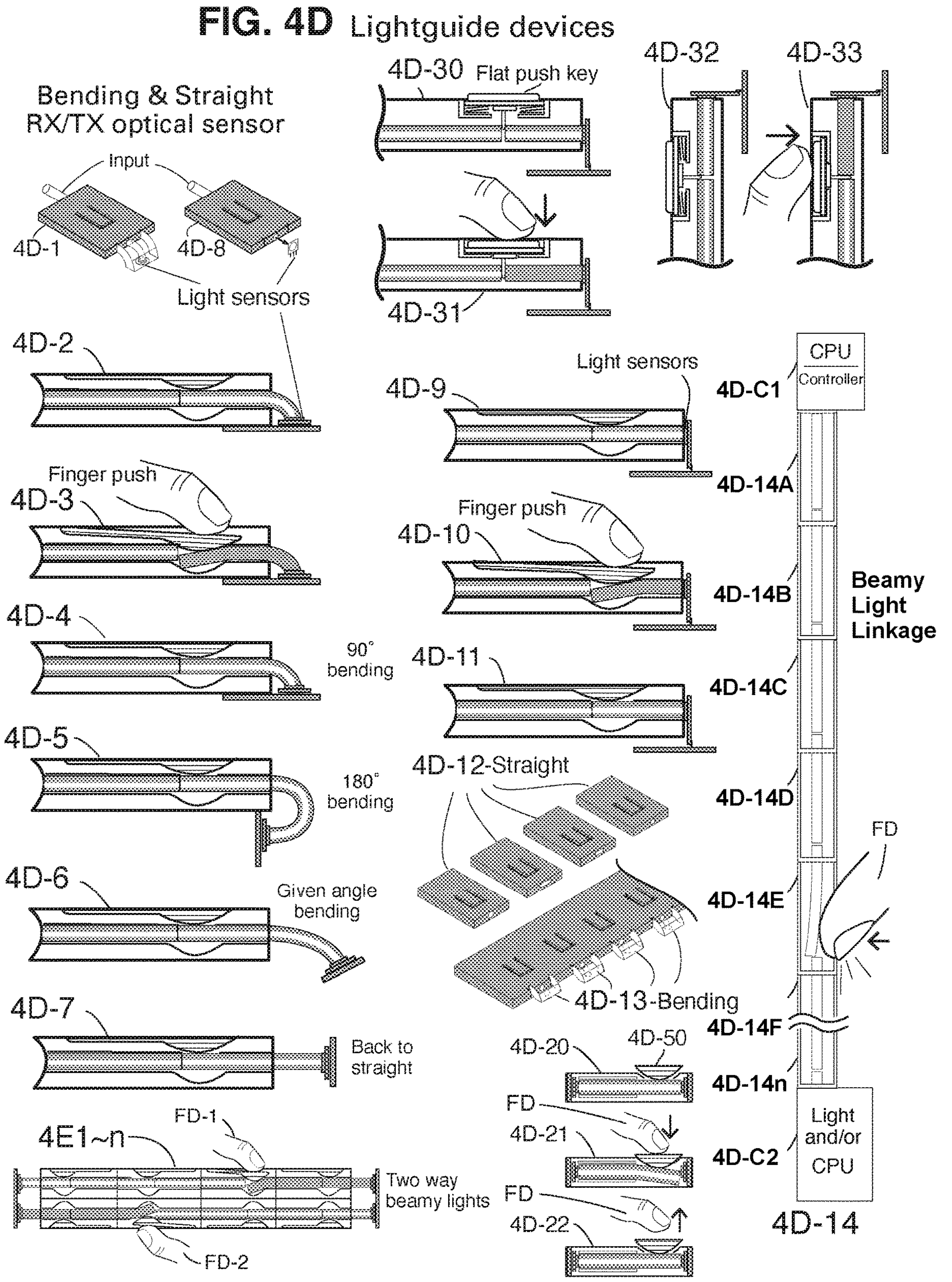
FIG. 4D Lightguide devices
Bending & Straight RX/TX optical sensor
Input
4D-1
4D-8
Light sensors
4D-2
Finger push
4D-3
4D-4
90° bending
4D-5
180° bending
4D-6
Given angle bending
4D-7
Back to straight
4E1~n
FD-1
FD-2
Two way beamy lights
4D-30
Flat push key
4D-31
4D-32
4D-33
Light sensors
4D-9
Finger push
4D-10
4D-11
4D-12-Straight
4D-13-Bending
4D-20
4D-50
FD
4D-21
FD
4D-22
CPU
Controller
4D-C1
4D-14A
4D-14B
4D-14C
4D-14D
4D-14E
4D-14F
4D-14n
4D-C2
Light and/or CPU
Beamy Light Linkage
FD
4D-14

FIG. 5A A prior art well known self increase or decrease sound volume.
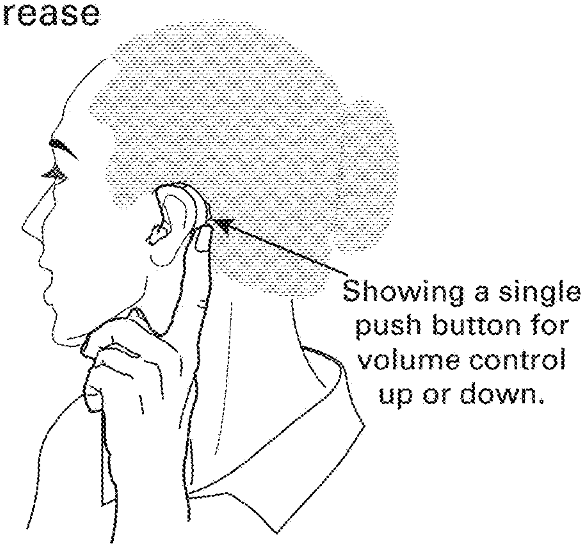
FIG. 5B
A prior art of well known persistent noise such as restaurant, wherein a guest is unable to communicate with the waiter.
FIG. 5C
The self setting advantages shows a simple process of touching Beamy Light Switch to adjust the many differing parameters, to fully understand and able to select and smile.

FIG. 6A DC low voltage elements
6.4
6.5
6.6
6.7
6.11-TEL
6.12-USB
6.13-AU
6.14-ANT +DC
Future linking plug
6.18
6.16P
+DC
G
-DC
At least one POF
6.19
6.1
6.3
6.16
6.9
6.10

+DC
6.18
At least one POF
+DC
G
-DC
6.16

Removed section
6.18
6.21 is a prior art outlet sensor
6.20 GND terminal
LR
9.3-4
DC communication.

FIG. 7 HORIZONTAL PLUG-IN AC OUTLETS
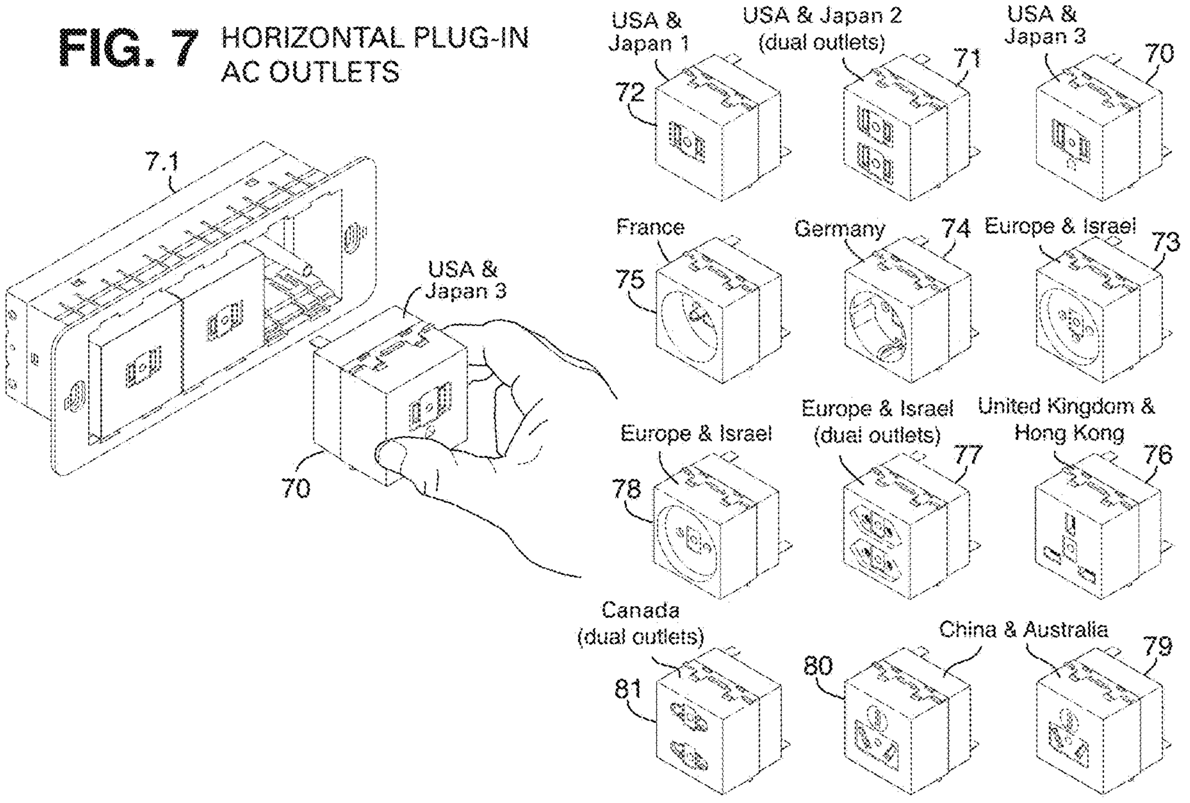
FIG. 8 VERTICAL PLUG-IN AC OUTLETS
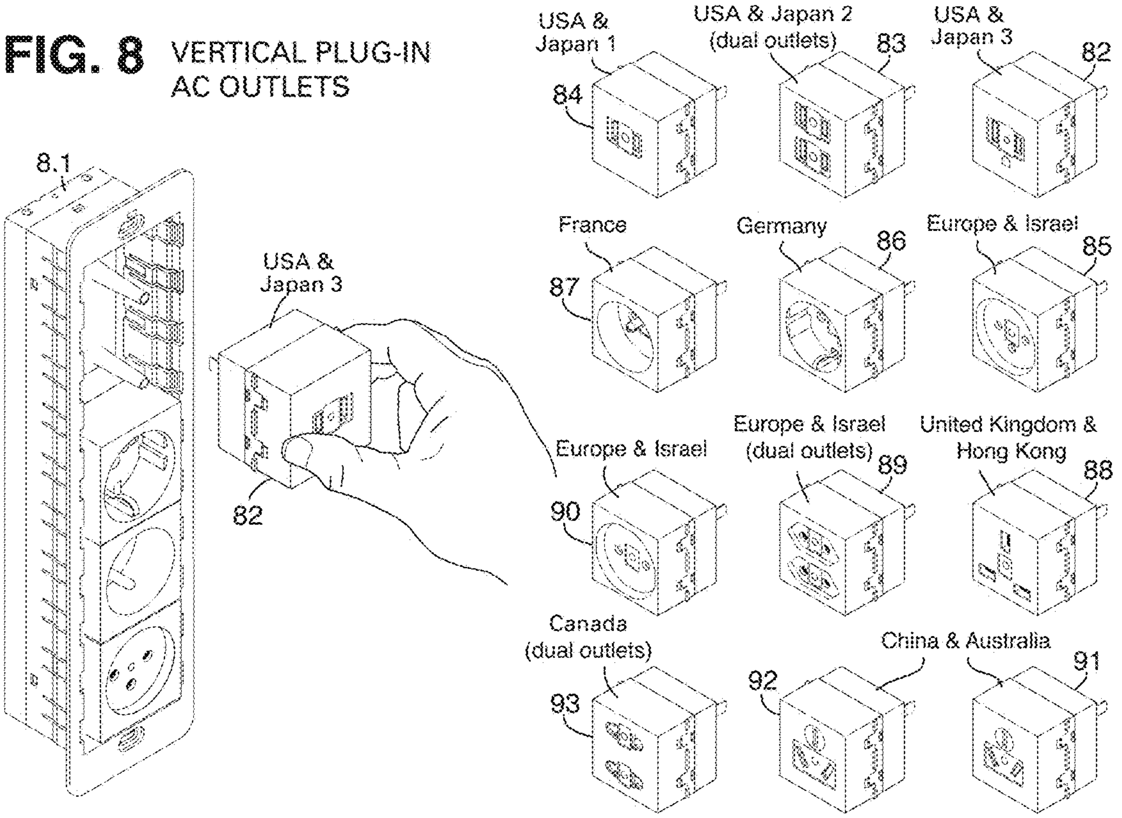

FIG. 9A COMBI DEVICES (COS) & BLOCK DIAGRAM
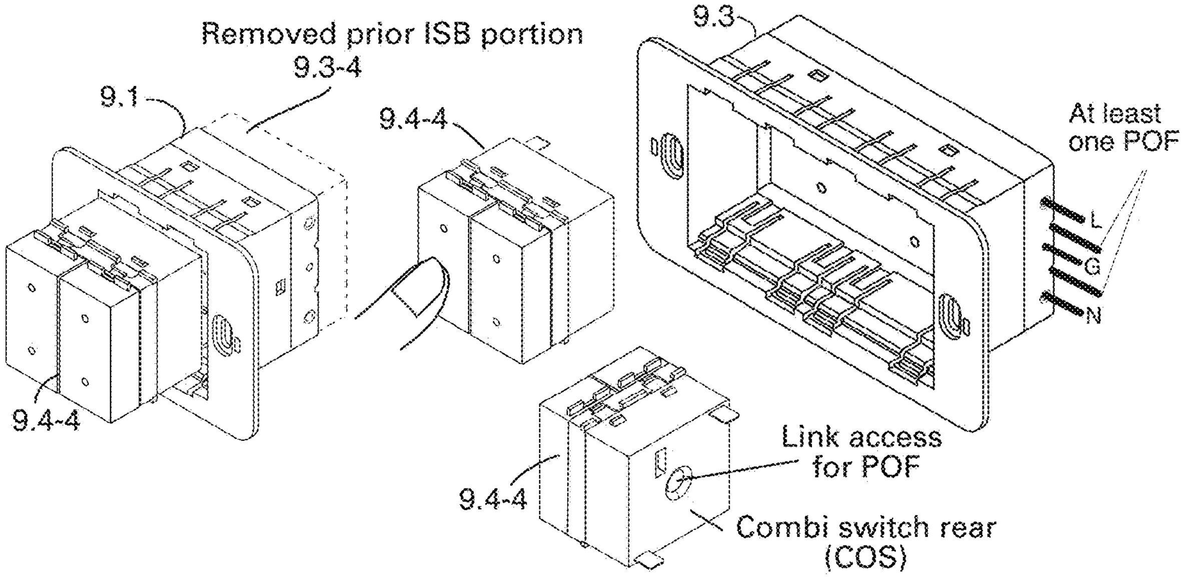
FIG. 9B Combi switches (COS) front
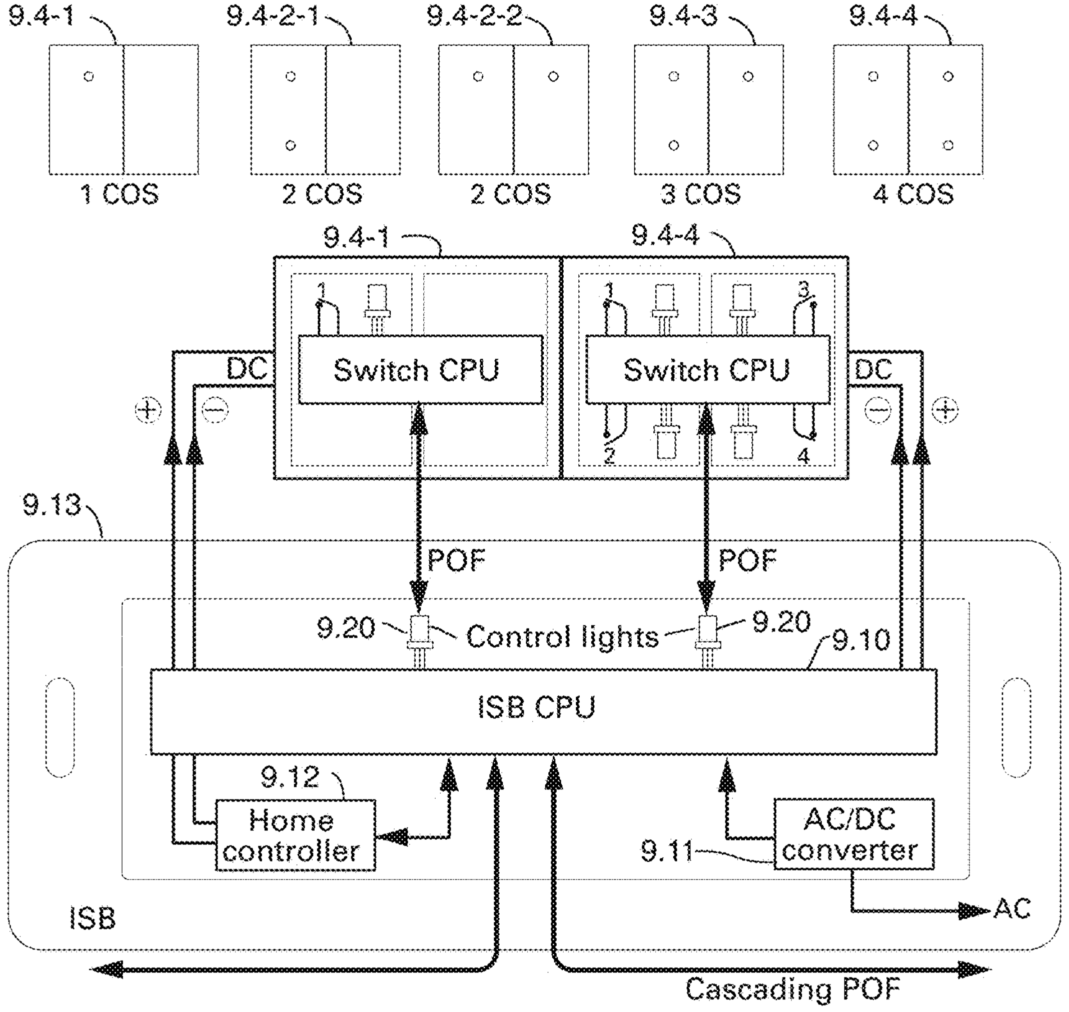

FIG. 10A LIGHTING - HYBRID SWITCHES & HOME CONTROLLER
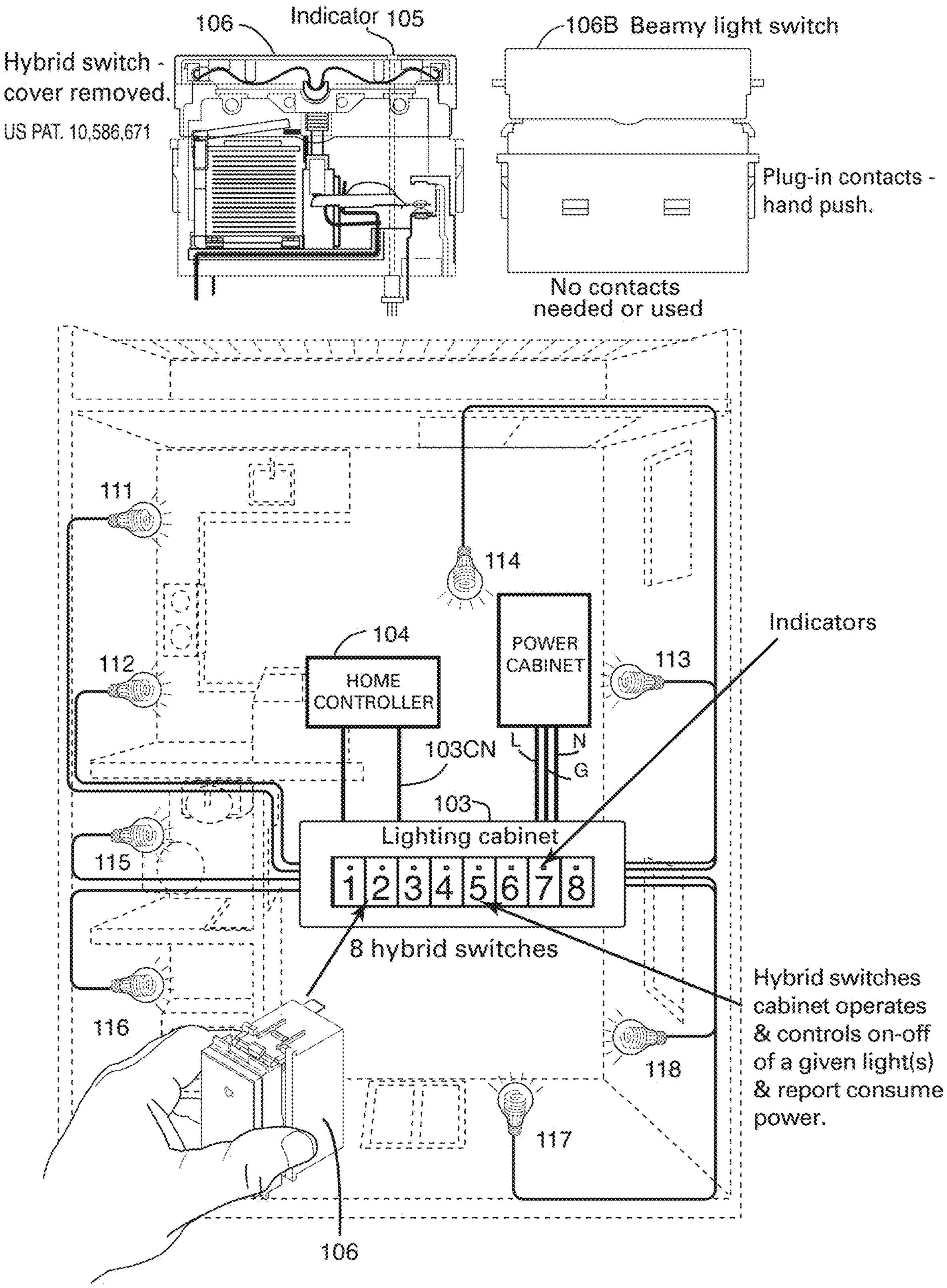

FIG. 10B COMBINED TWO LIGHT CABINETS
Fig. 10B link to 18 hybrid switches.
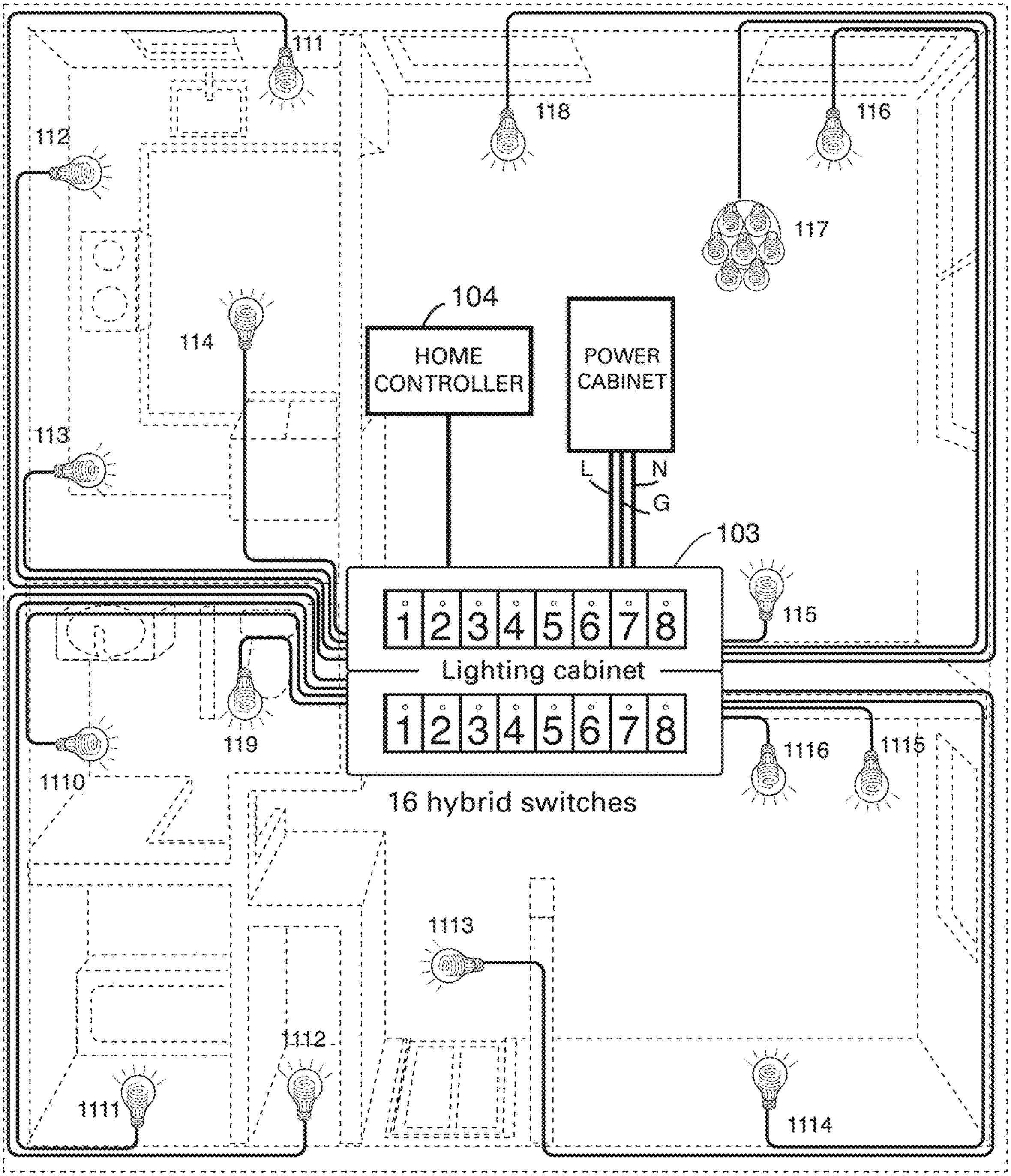

FIG. 11 LIGHTING CABINET FOR n LIGHTS
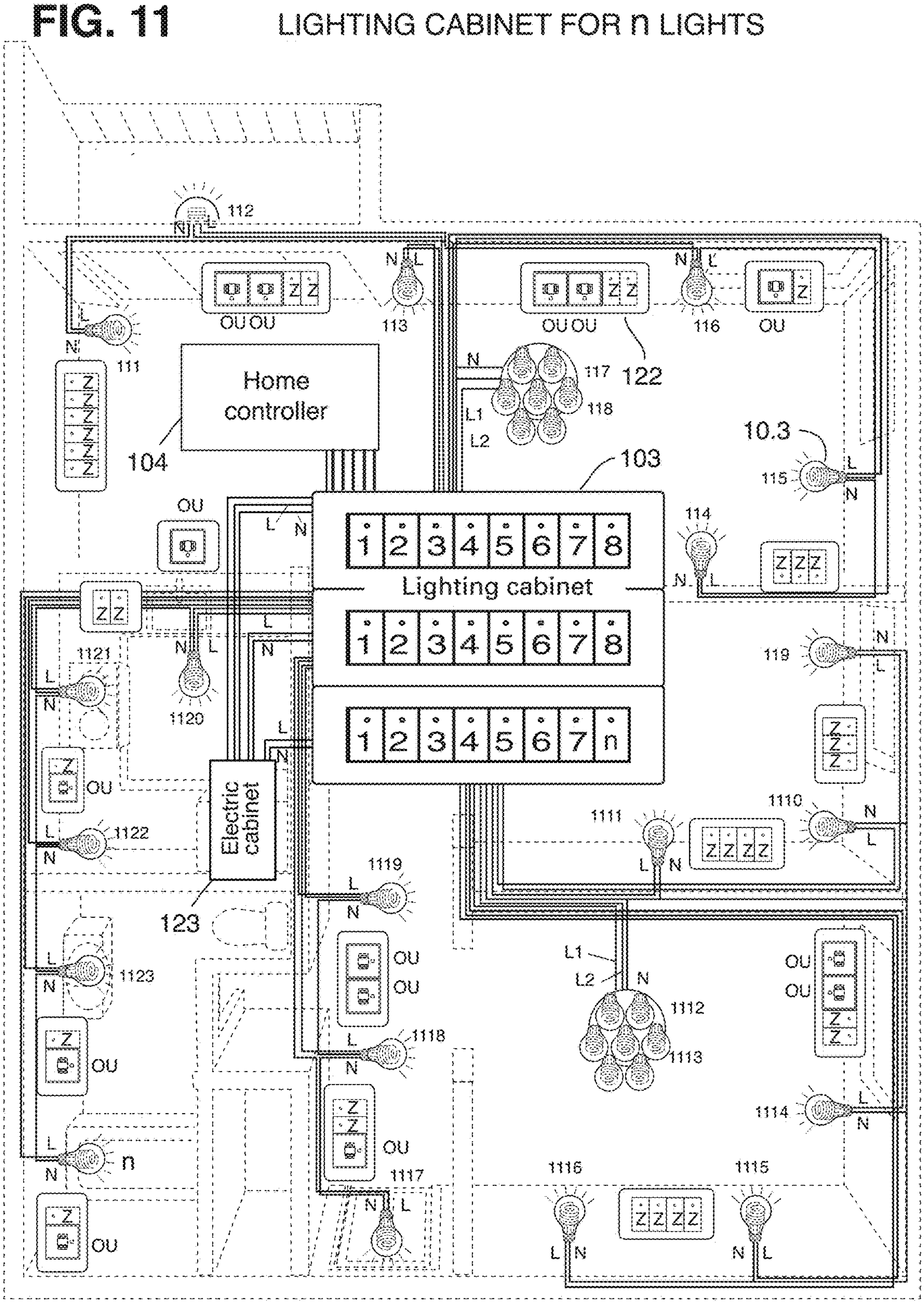
L= Live line
N= Neutral line
Z= 1~8/n - any given light numeral, or by identifying outlet (OU) self standing

FIG. 12 SPREAD LIGHTING CABINETS
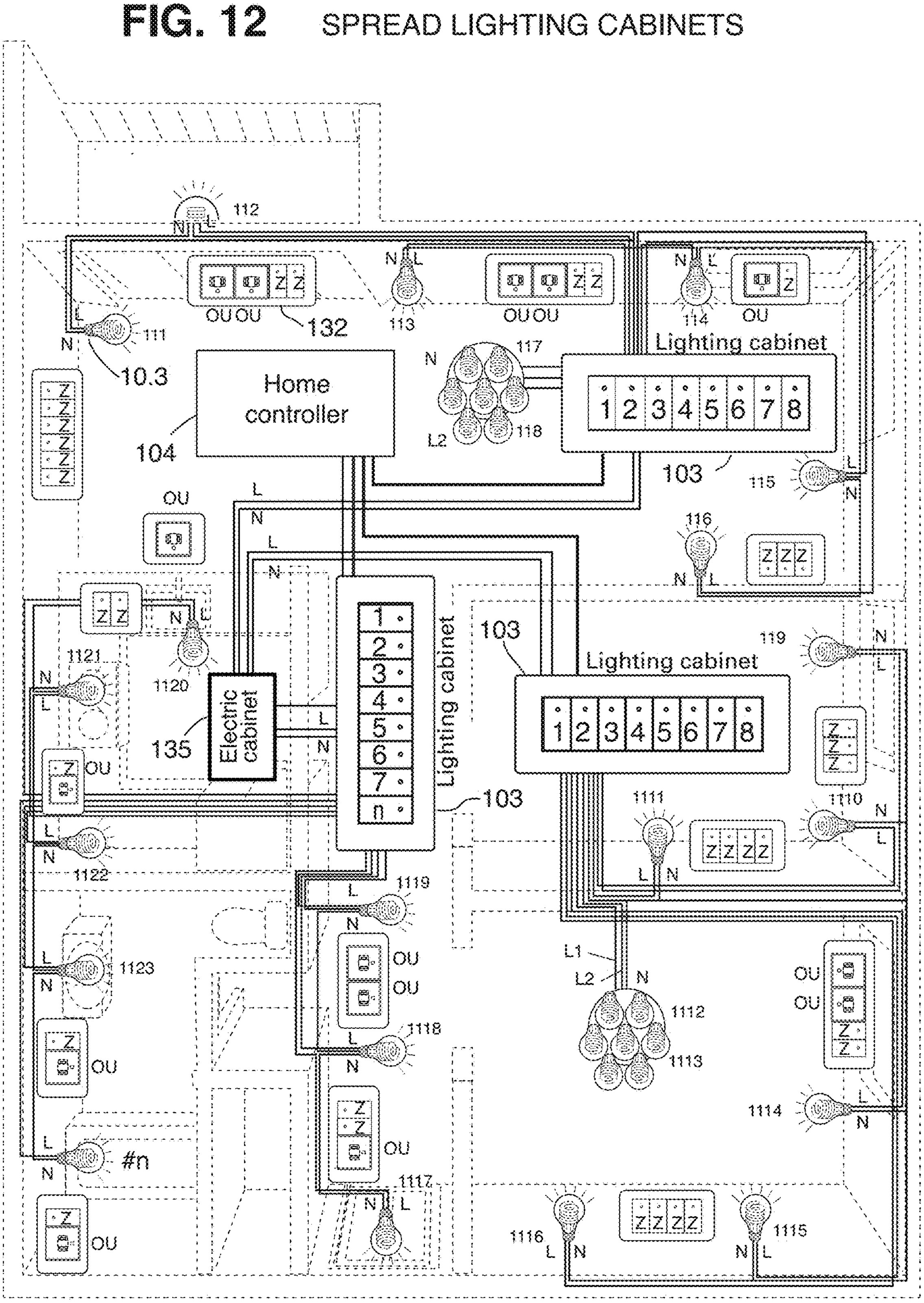
L= Live line
N= Neutral line
Z= 1~8/n - any given light numeral, or by identifying outlet (OU) self standing FIG. 13A PLUG-IN POWER OUTLETS (NO SCREWS)
China/Australia
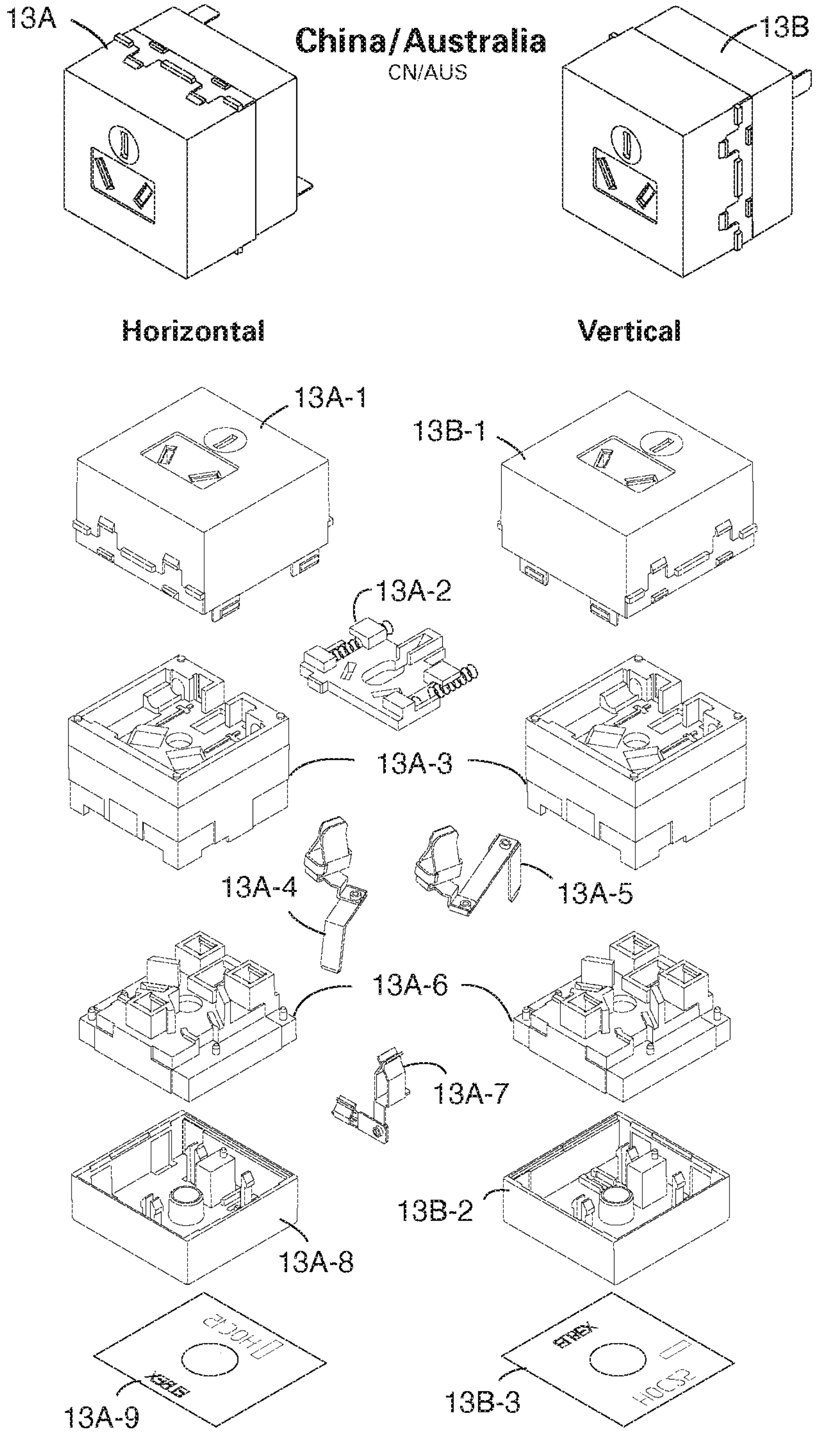

FIG. 13B PLUG-IN POWER OUTLETS (NO SCREWS) China/Australia
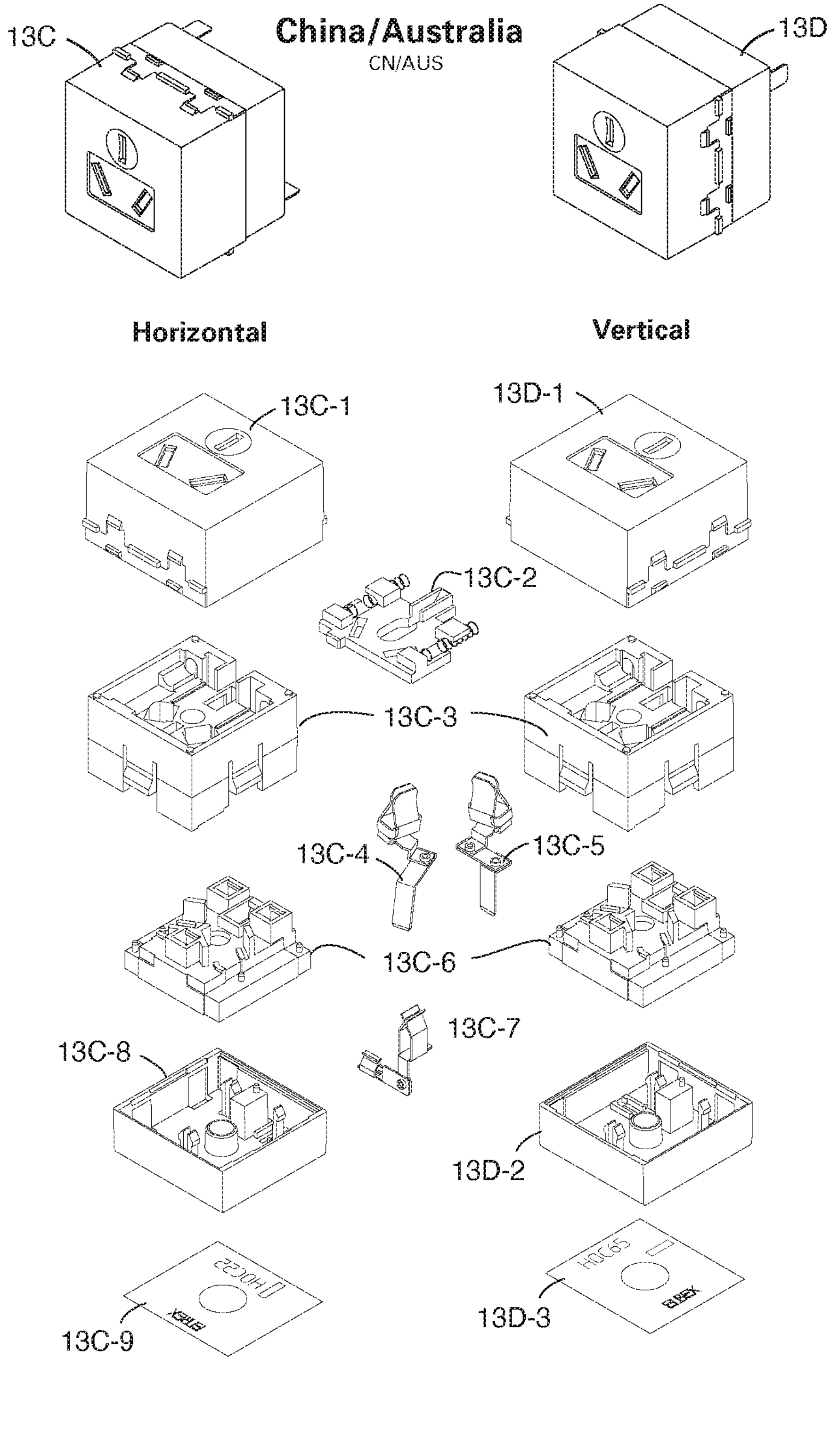

FIG. 16 England/Hong Kong
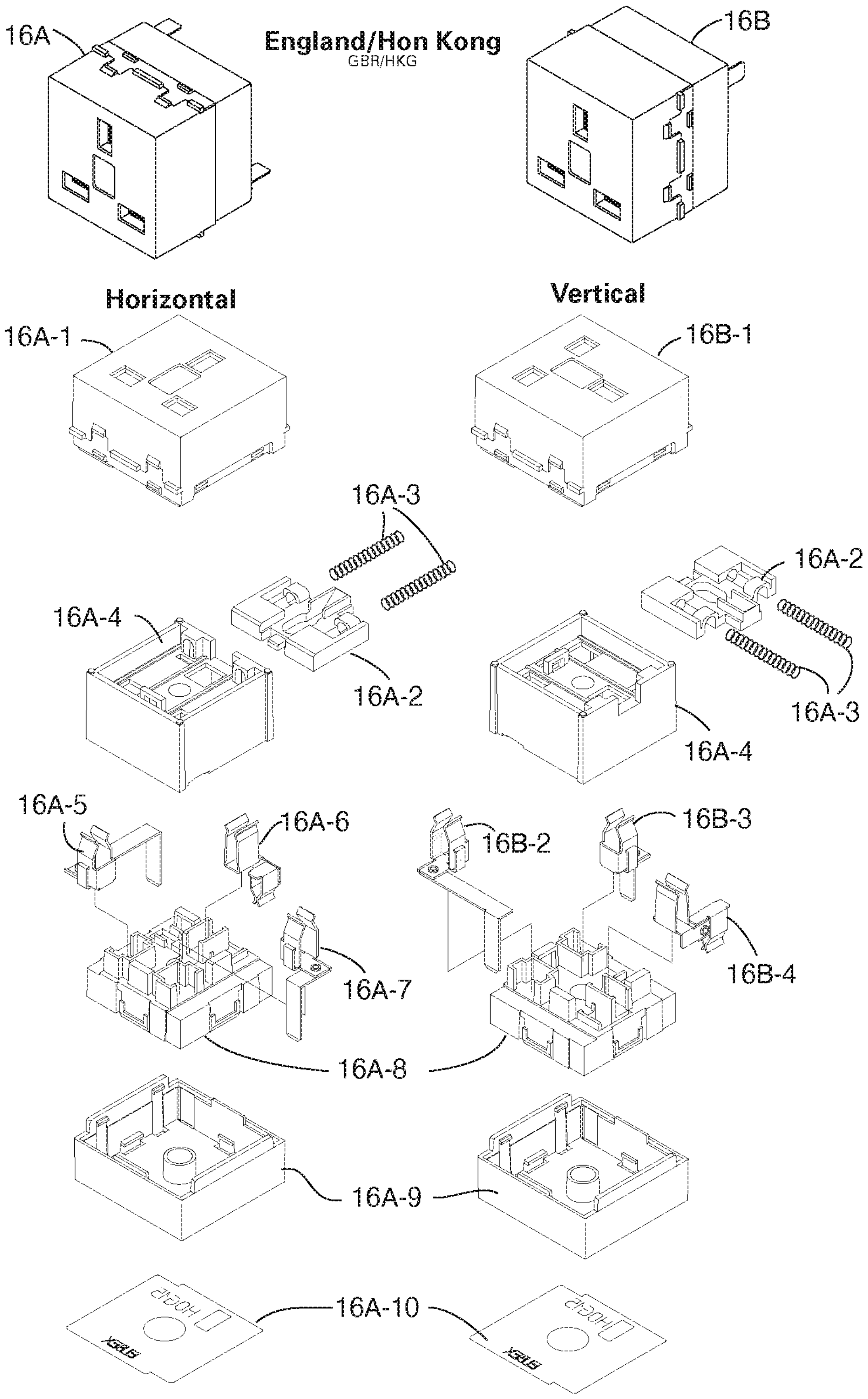

FIG. 17 HORIZONTAL/VERTICAL ISBs
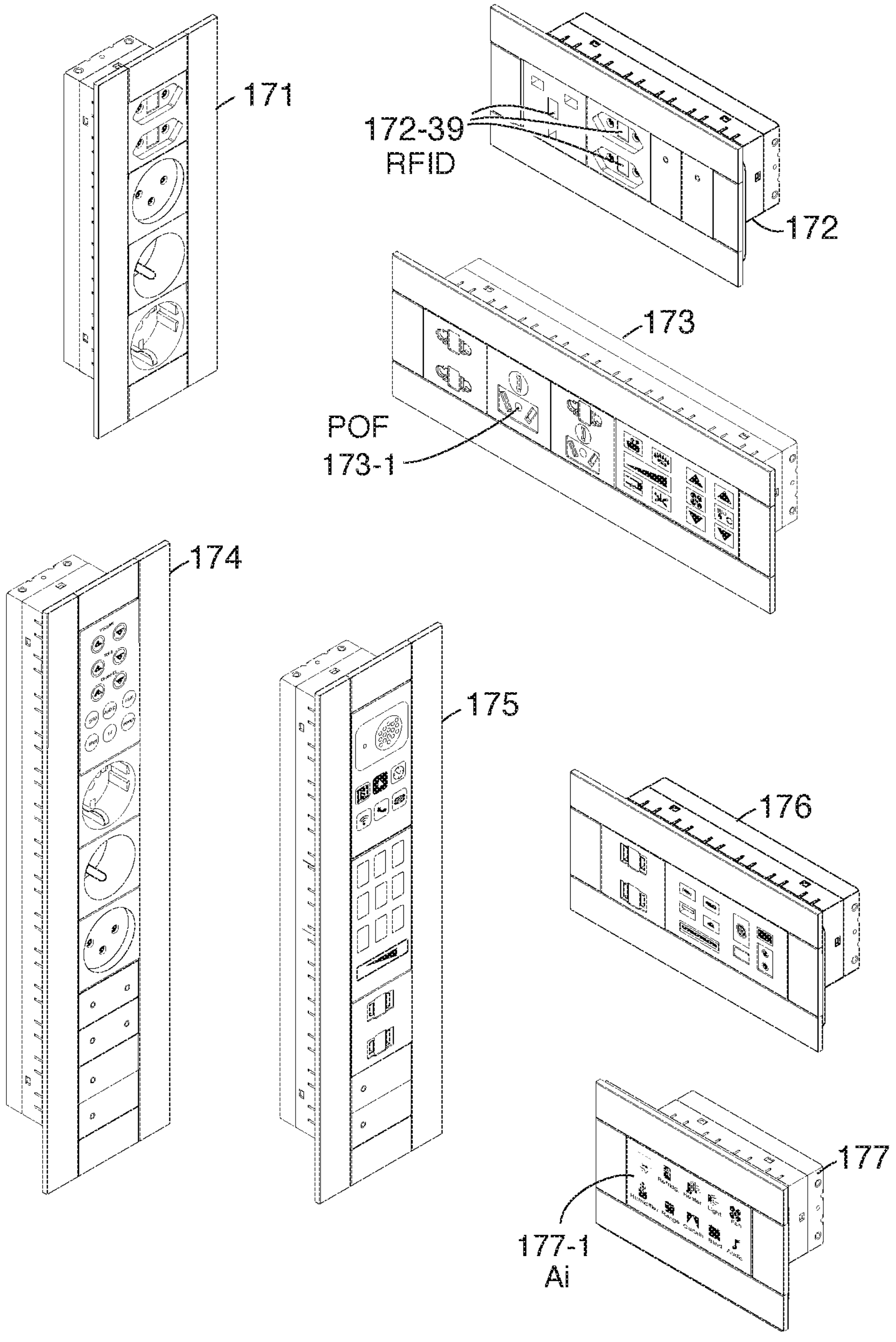

FIG. 18A ELECTRICAL DEVICE WITHOUT SCREWS
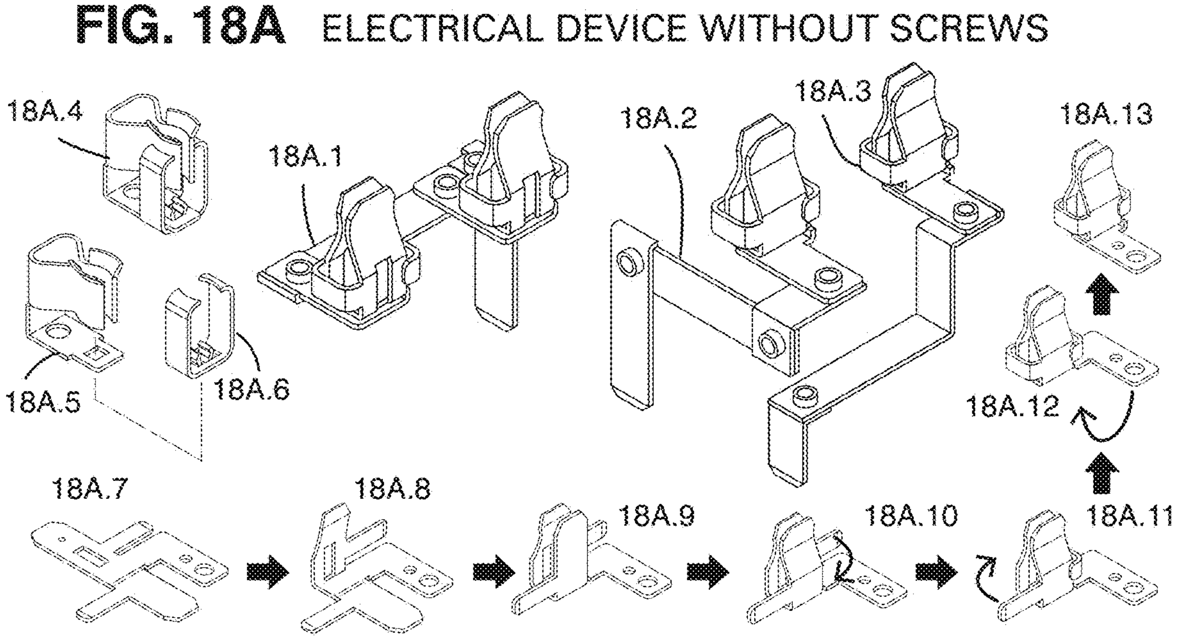
FIG. 18B POWER LINES WITHOUT SCREWS
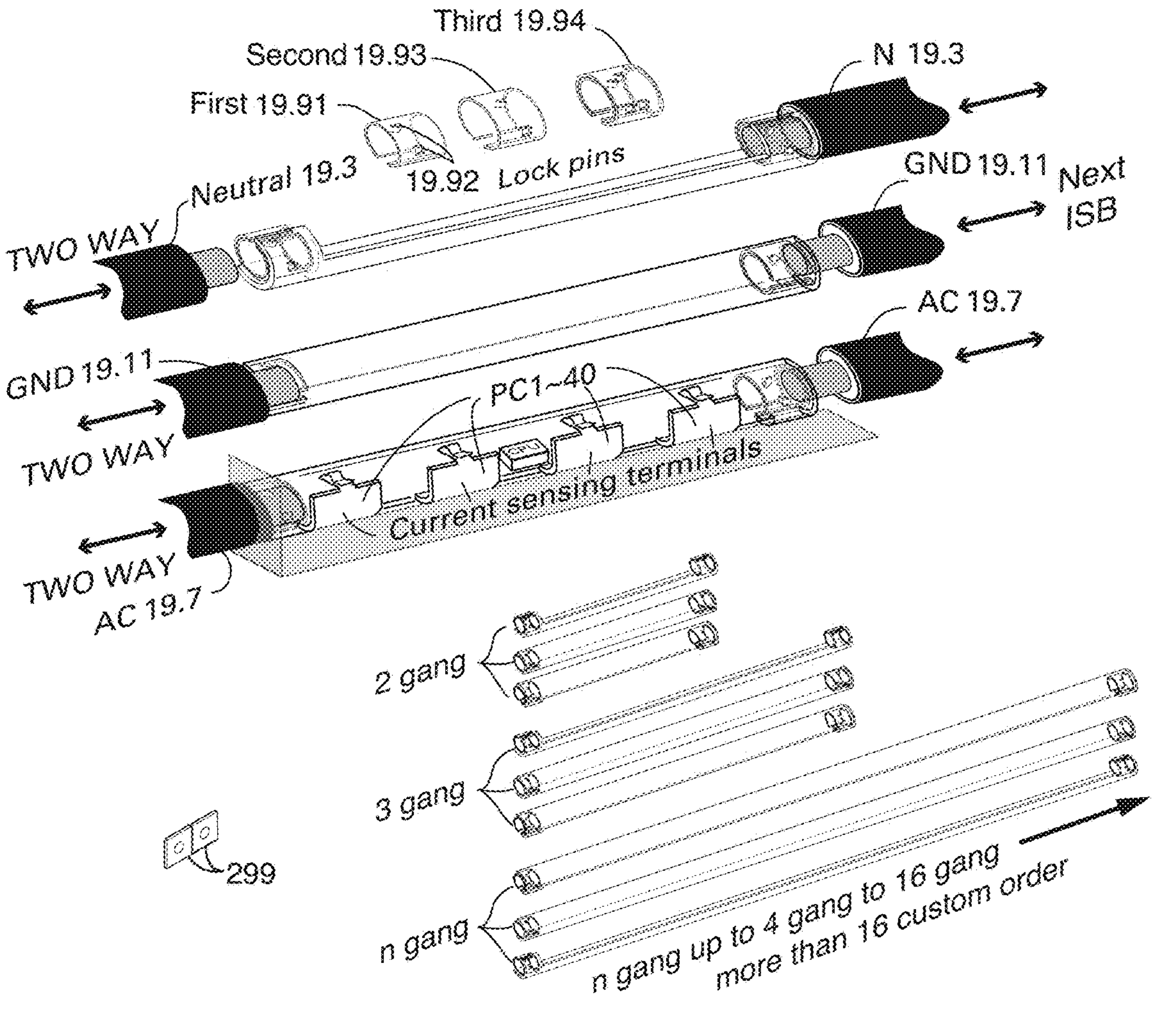

FIG. 19A SELF LOCKING & RELEASE - L, N, G & POF

L= LIVE LINE
N= NEUTRAL LINE
GND= GND LINE
POF-HS= HIGH SPEED
POF-LS=LOW SPEED

Size length ranges; from 2 gang ~ n gang.

FIG. 20 BED ROOM & LIGHTING "CENTER"
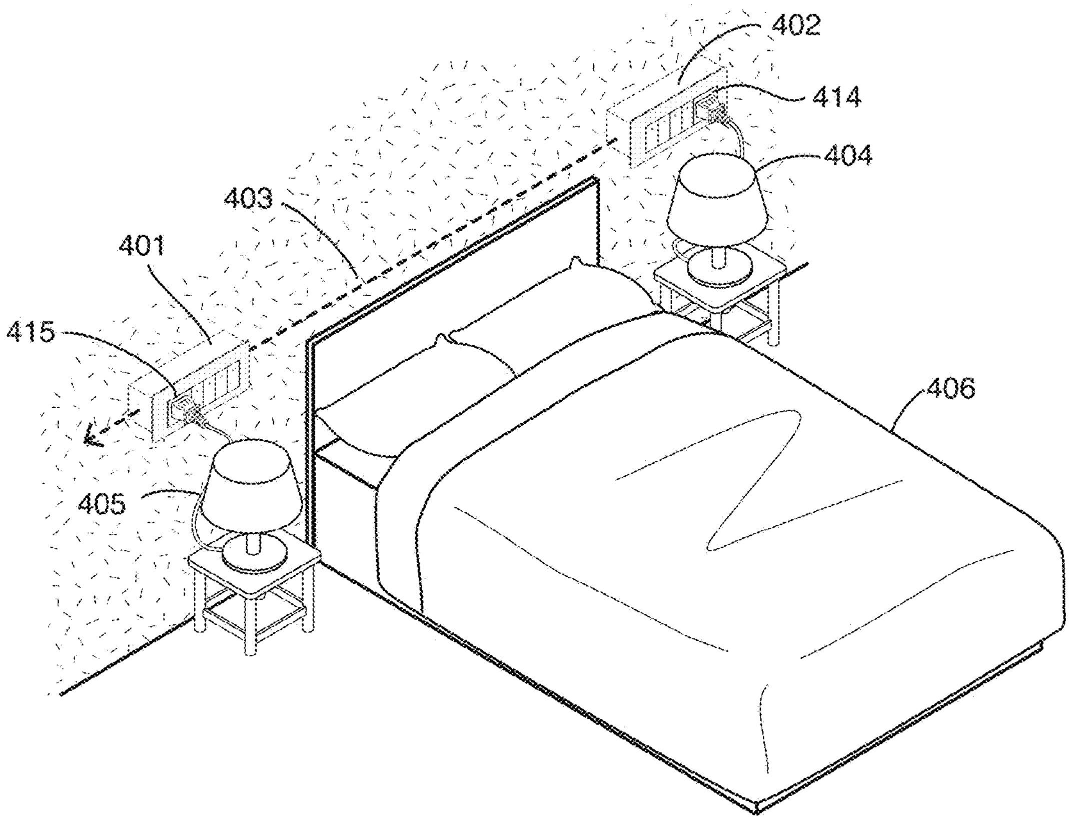
FIG. 21 HEARING AID DEVICES AND SELF SETTING
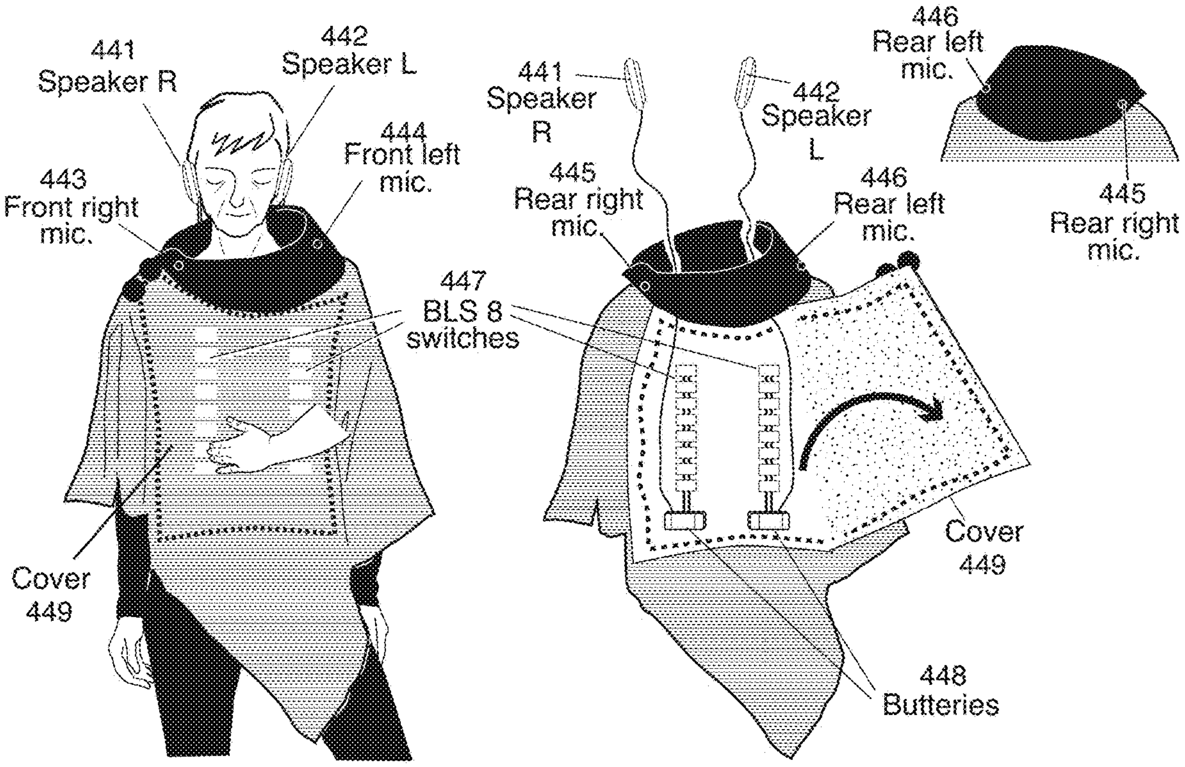

FIG. 22A SIMPLIFIED WEARABLES
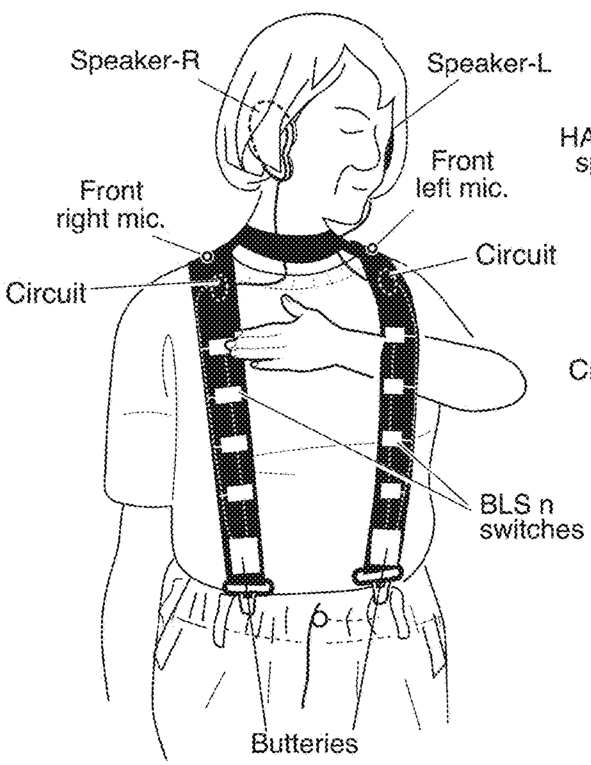
FIG. 22B
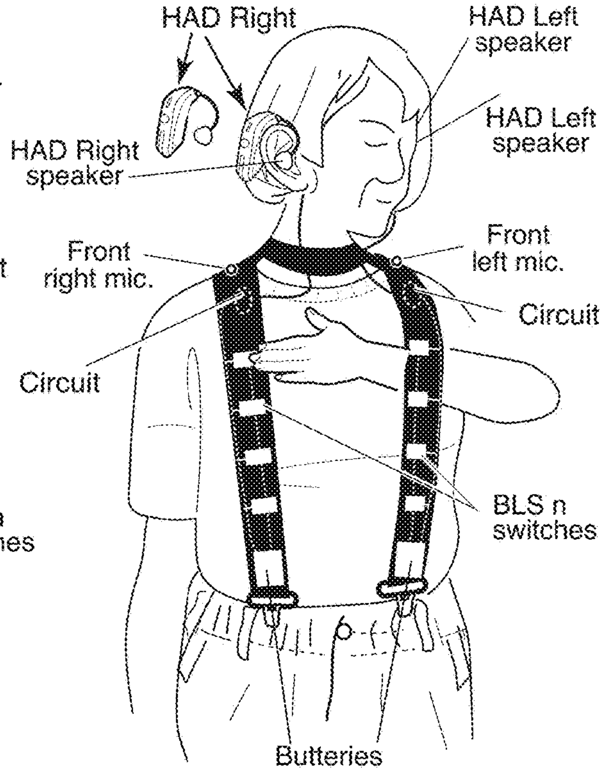
FIG. 22C
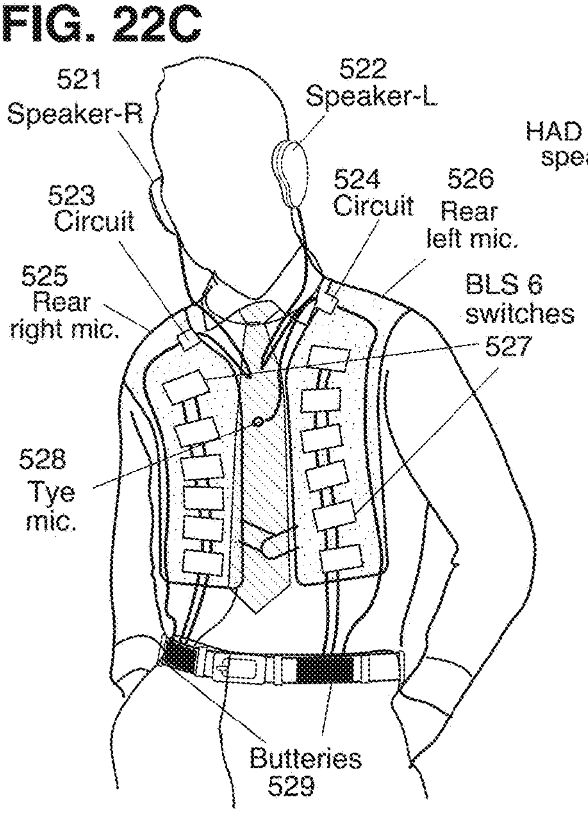
FIG. 22D
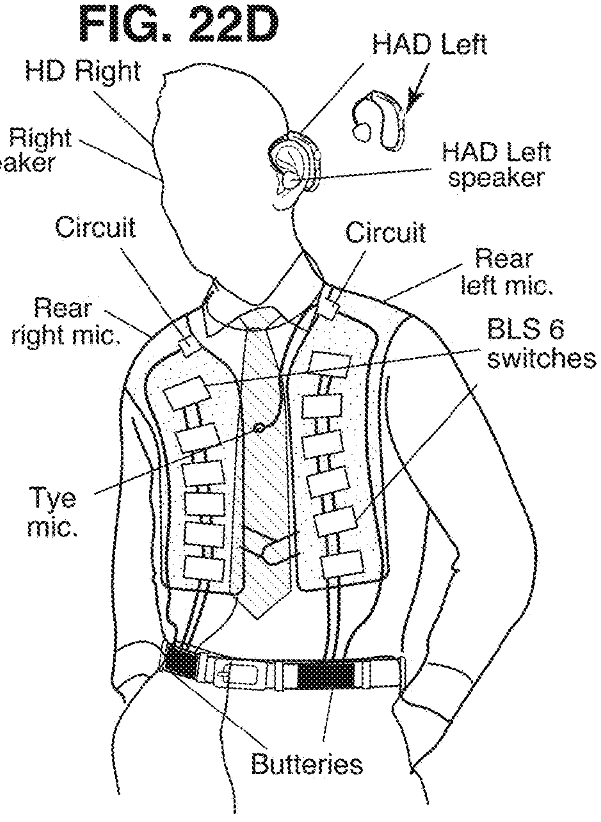

FIG. 23A SPEAKER ELEMENTS AND ASSEMBLIES
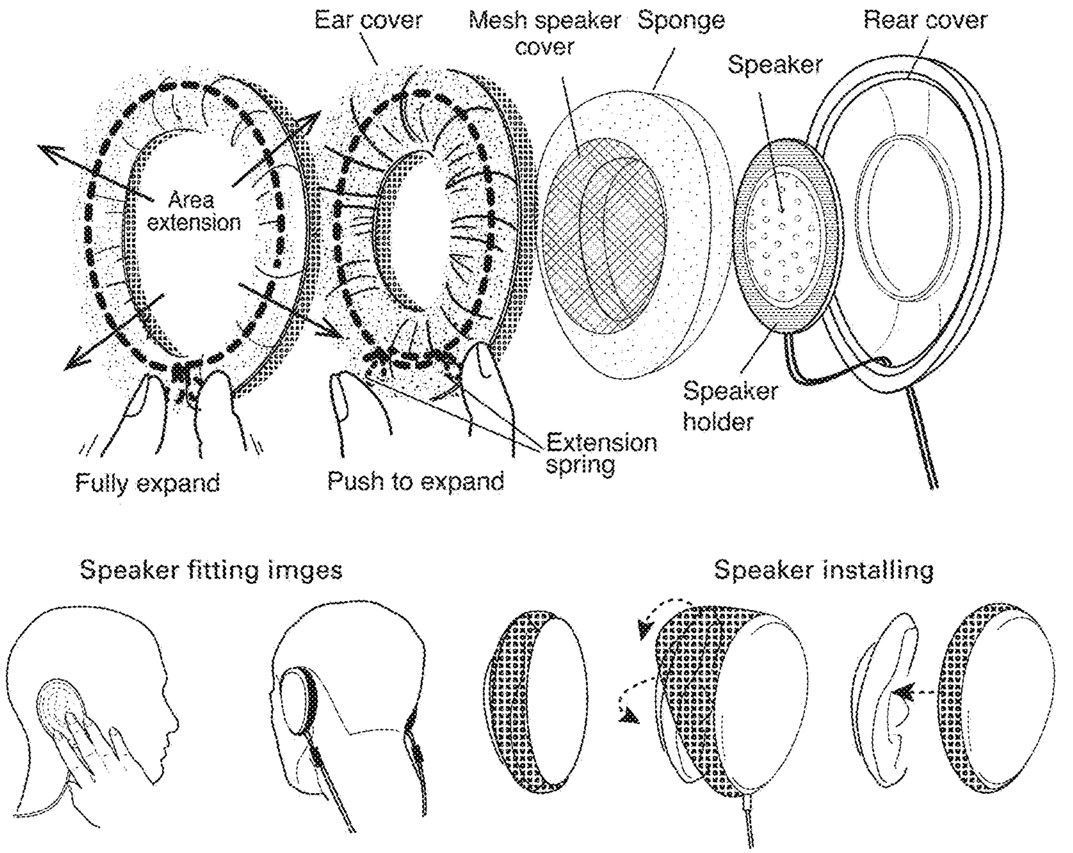
FIG. 23B DECORATIVE TIE/SHIRT FOR SELF SETTING
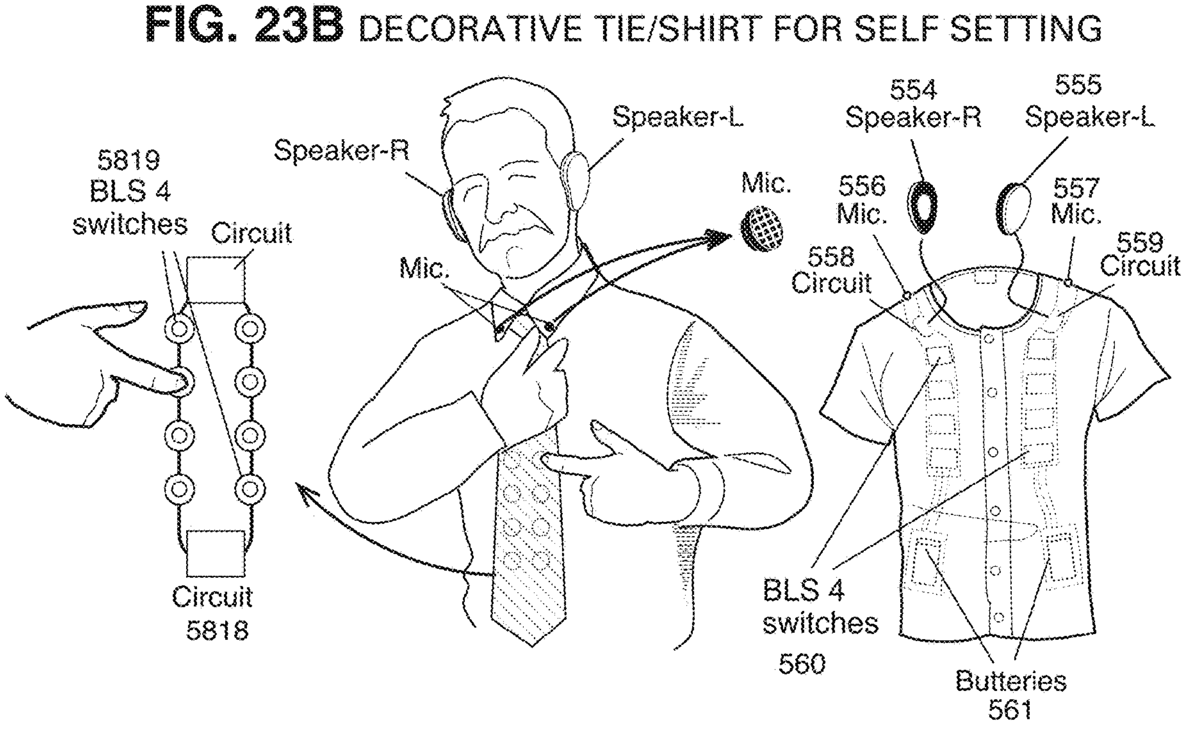

FIG. 24A SELF SETTING AND SUPPORTING NEWLY BORNE

FIG. 25A ACCURATE CURTAIN MOVEMENT
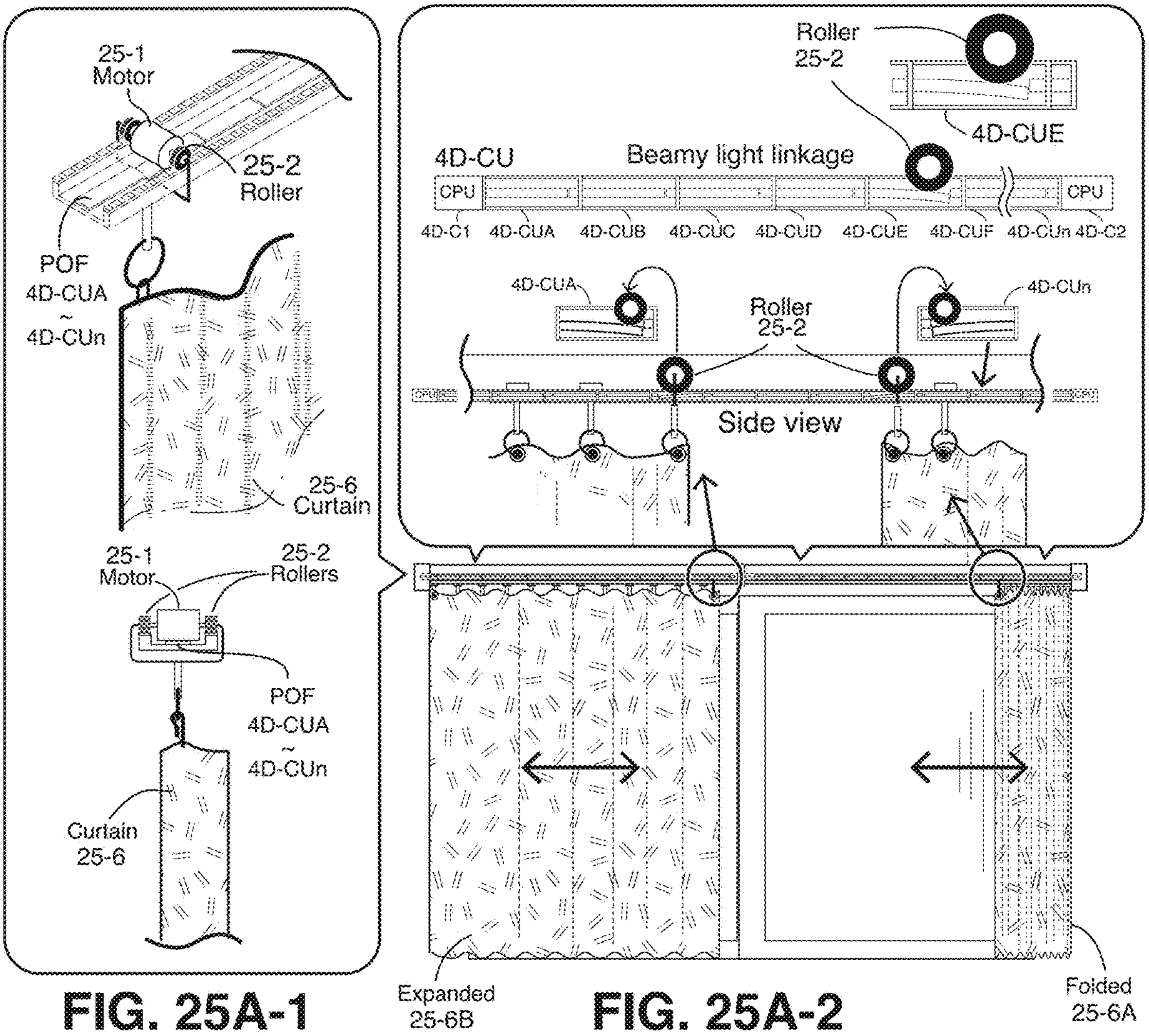
FIG. 25A-1 FIG. 25A-2
FIG. 25B ACCURATE BLIND/SHUTTER
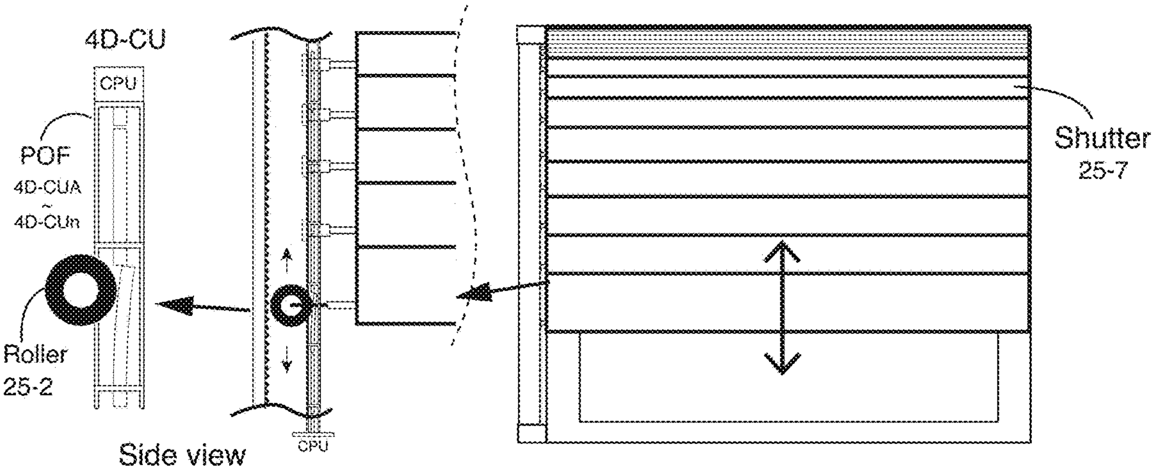

STRAIGHT LIGHT IN AIR DIRECT AND/OR BENDING VIA FIBER OPTIC CABLE ACTUATES LIGHT SWITCH FOR-ALL—FROM BUILDING WALLS TO WEARABLE

CROSS-REFERENCE TO RELATED APPLICATIONS

This application is a non-provisional counterpart to and claims priority to U.S. Ser. No. 63/320,673 filed Mar. 16, 2022, which is pending and which is hereby incorporated by reference in its entirety for all purposes.

This application is a non-provisional counterpart to and claims priority to U.S. Ser. No. 63/430,322 filed Dec. 5, 2022, which is pending and which is hereby incorporated by reference in its entirety for all purposes.

This application is a continuation of and claims priority to U.S. Ser. No. 18/092,240 filed Dec. 31, 2022, which is pending and which is hereby incorporated by reference in its entirety for all purposes.

U.S. Ser. No. 18/092,240 is a non-provisional counterpart to and claims priority to U.S. Ser. No. 63/320,673 filed Mar. 16, 2022, which is pending and which is hereby incorporated by reference in its entirety for all purposes.

U.S. Ser. No. 18/092,240 is a non-provisional counterpart to and claims priority to U.S. Ser. No. 63/430,322 filed Dec. 5, 2022, which is pending and which is hereby incorporated by reference in its entirety for all purposes.

1. FIELDS OF THE INVENTIONS

The present invention relates to n cascading Intelligent Support Boxes (ISBs)—supporting plugged-in devise(s) into a given ISBs, linked via Plastic Optic Fiber (POF) to home automation, also termed (controller) or (PC), by an actuated (cut light push key)—(Beamy).

Linking 1−n cascading Beamy devices within each of a cascading ISBs, and setting each Beamy device for identifying each individual Beamy key as set, fitting given commands via a Beamy touch, be it a device for supporting a given home automation device or a given wearable device for supporting the hearing-impaired and other invalids.

Each of a cascaded plug-in device are self-addressed from 1-*n* along with an enter or removal acts/sate, all particulars of each and devices, are individually set by the (PC) combined with first to last given touch surfaces and/or all surfaces pertaining all ISBs, within each cascaded entry. With first line segment is linked via an exit access, cascading into first cascaded ISB position and into a last POF cascaded position ISBs—linked via first ISBs.

Many of the elder tenants living in automated home, are and/or will be in need now, or for future living, a "better" hearing-aid systems, I.e. with self-control, such as wearable-devices of "things". Home dwellers need lights and curtains to operate by a wearable touch key. The present invention further relates to generating one of a single cut and a cascaded cuts of Beamy touch key actuators. Contacts are must for hybrid and/or Combi switch operation.

Beamy actuator that is not well known, alone or in any Combi switch. supported by hybrid switch and circuits disclosed in U.S. Pat. No. 10,586,671.

2. DESCRIPTION OF THE PRIOR ART

Switches and relays for switching on-off electrical appliances such as water boiler, air conditioners, heaters, lights and any other electrical equipment and appliances in residences, offices, public building, businesses, restaurants and factories are very well-known.

The well-known relay and switching devices for home automation are commonly installed in the main or a sub electrical cabinet of a given premises. The installed switch and/or relays are operated via bus lines, RF, or by control signal propagated via the AC power line.

The costs of upgrading the prior known automation devices and relays including their installations are very high as the electrical wiring must be changed from its standard commonly applied wiring and systems, in which the electrical power is fed via a commonly installed (switch) in the electrical wall boxes.

This is in clear contrast to the electrical direct feed from the main or sub electrical cabinet via the relays. For controlling the relays in the electrical cabinets, the commonly used standard switches are replaced by control switches, propagating electrical signals, RF signals, AC power line signals and in some instances IR signals in open air in line of sight to reach and operate the relay's control circuits in the electrical cabinets.

Such fundamental basic change in the structured electrical systems became too complex, costly and moreover the complexity is the cause for serious repeated malfunctions of the installed electrical automation systems. Further, the known home automation devices do not report the power consumed by the individual electrical appliances and do not provide usable data for reporting statistics to the home owners, nor to the yet to be born "smart grid".

The U.S. Pat. No. 7,649,727 introduced a new concept whereby single pole dual throw (SPDT) relay connected to a commonly used SPDT switch or dual poles dual throw (DPDT) switch enabling to switch the electrical appliances or lights manually via the commonly installed switch and remotely via the home automation controller. The SPDT and DPDT switches are known also as two way or four way switch respectively.

The referenced US patents further disclose in details the reporting of the power consumed by the appliances through the relays or through AC outlets and plugs or through the current drain adaptors. The current drain or power consumption reports are communicated via optical signals through plastic optical fiber cables known as POF or lightguide, via IR or RF in open air, and via electrical signals through bus lines or other networks directly or via command convertors.

The below listed US patents and in other countries disclose an add on or a combination of separate SPDT or DPDT switches and/or power sockets and/or current sensing adaptor combinations, which all teach substantially advanced residence and other building automation.

Yet, there is a need for a single automation device comprising a combination of a switch and a relay including the sensing, calculation and reporting power consumption circuits, structured within the sizes and shapes of current day commonly used AC switches at a lower cost than current day automation devices and providing further installation ease and simplicity.

The well-known decorative plates, panels, frames, and key covers are injected by plastic materials in different colors, shapes and sizes, or by glass keys and frames disclosed in U.S. Pat. No. 9,608,418. The support frames for varying AC wiring devices are disclosed in U.S. Pat. No. 9,219,358.

Further, the U.S. Pat. Nos. 7,453,686, 7,461,012, 7,639,907, 7,649,727, 7,864,500, 7,973,647, 8,041,221, 8,117,076, 8,148,921, 8,170,722, 8,175,463, 8,269,376, 8,331,794, 8,331,795, 8,340,527, 8,344,668, 8,384,249, 8,441,824, 8,442,792, 8,453,332, 8,594,965, 8,596,174, 8,639,465, 8,742,892, 8,930,158, 9,018,803, 9,036,320, 9,219,358, 9,257,251, 9,281,147, 9,541,911, 9,608,418, 9,684,921, 9,684,922, 9,684,923, 10,225,005, 10,313,141, 10,586,671, 10,686,535, 10,797,476, 10,840,686, 10,840,687, 11,031, 760, 11,239,641, disclose home automation controls, connections, intelligent outlets, hybrid switches, switches, relays and accessories, for operating electrical appliance via add-on devices such as the SPDT and DPDT relays, or current drain sensors, RFID tags for identifying the load and operating appliances via hybrid switches, including mechanically or magnetic latching hybrid switches. None of the disclosed prior devices discloses the elements, structures, or the operation of the present application.

3. SUMMARY OF THE INVENTION

The present application refer—to dual non-related items and/or devises in many aspects. First is home automation, the other is hearing aid. The present invention relate to at least one of straight and bending, one of Beamy light(s) and signal(s), within one of visible spectrum range of 380-800 nanometer(nm) and non-visible range of over 800 nm.

Wherein, the bending and the straight are guided through at least one of an optical fiber, a Plastic Optical Fiber (POF) cable(s) and other transparent element for propagating "first time ever" at least one of Beamy light and light signal, selected from a group comprising receive, transmit, link, delink, control, propagate, act, command, operate and report data pertaining such as intended and acted upon by at least one related device(s), such as equal to switching a light bulb on-off and/or reporting a change in the light state or color, including a consumed power drawn via power outlet as measured and programed.

The above Beamy is acted upon at a very short "cut time" by a CPU and/or a Homme controller, generating a "never before" floating response, based on which a CPU and/or Home controller (PC) responds by action, or via a wearable device(s) to assist Hearing aid devices and to other health difficulties.

None of the known prior art suggested to having an ability to link and delink (connect and disconnect) or switch over a light bulb by a cut of propagated Beamy light and/or light signal.

A "first ever" introduction of Hybrid light opt-switch, actuated via a light switch to extend at least one of optical and physical link and delink, by actions onto individual elements of a Beamy actuator and upon data grouped into "a never before" programmed, fed and stored by an Intelligent Support Box (ISB) and into Home Automation (PC) and or (Controller), optically responding to and commanding by one of said ISB and said controller via an optical cascading grid(s) to a given address(es)—first ever.

A simplicity to operate switches by one of straight and bending wearable, enabling the expanding to different fields, such as introduction of user self-adjusting hearing aid devices and elements by a finger touch of a "button/ornament" or a "surface" of a shirt, underwear or other wearables. Provide self-control of the hearing status by a soft finger touch of a given light opti-switch(es).

FIG. 1A shows common prior and current wiring devices of the art, mandates and individually connect wires to the electric devices terminals, including wires mounted onto a frame, with the frame mounted onto a wall, and into a known electrical wall box(s).

FIG. 1B shows hearing aid devices and elements linked via cables and wireless (as explained separately) designed to amplify voice, music and other propagated signals and noise.

Removing the electrical wired device for service or replacement is a process that is not too complex but takes time to complete. First by removing a surrounding decorative frame, followed by removing the frame from the box, to be followed via a step disconnecting the wires from the device terminals, the device from the frame, and re-installing a new, replacement device.

The re-installing a replacement device calls for a reverse process that is not too complex either but takes time to complete. The time in this sense is far more costly than the cost of the device itself. More-over the removal and install must be carried by licensed electric professional and not by a user of the system.

Decorating plates or frames surrounding the switches, relays and AC outlets, including decorative keys that are used for switching on-off electrical appliances, such as lights, hot water boiler, air conditioners, heaters, curtains and any other electrical equipment and appliances in residences, offices, public building, businesses, hotels, restaurants, factories and the like are very well known.

The U.S. Pat. Nos. 9,219,358, 9,608,418 and 10,225,005 hereafter 358', 418' and 005' are further introduced herein by reference, for particularly disclosing details.

Intelligent Support Boxes (ISB)s that are mounted into electrical wall boxes with the wiring devices being attached to and/or into the ISBs by a plug-in action. The locking elements by the ISBs and the shown hand tool, disclosed in US PT. 10.840.686, for the purpose of identifying the elements involved in the release and remove process by a push of hand tools.

With the expanding demand for home automation a need is developed to replace and introduce "easier to install, set and remove" devices, and/or change the look of the frames and keys, be it simple color change or other architectural needs.

The other major important element(s) of each ISB are the introduction of Universal Serial Bus (USB), a well-known device and term for PC (Personal Computer) and cloud storages of data. Each ISB incorporate at least one USB for enabling the self-setting of the ISB, and self-identifying each and every Beamy cut action for as short time (0.1 m sec.) as an example. Memorizing and self-reporting and to other ISB(s) and to the home controller via a cascading POF line by each given cut.

There was a need for a solution to simplify the ISBs installation into wall boxes, creating a simpler install process of "plug into the box" and communicate the Beamy touch key via POF accesses with the home controller. No intelligent home control is possible without a programmable device or a PC to operate, control and above all, managing the intelligent home.

There was and is a need to introduce a simple "push process", by a simple "finger push" onto one of a plurality of finger push device, or be it one to simplifying the push onto a given cascaded chain of a given ISBs. Be it an electrical installer, or if permitted, by a user (a tenant) of a given premise.

There is a need for reporting statuses and a consumed power by at least one given load, be it a light bulb or any other appliance, actuated by a user plug-in the load's into a given power outlet (optically linked outlet), or use the user finger to push or touch an "opti-key" of an "opti-switch" for switching on a given light, followed by reporting the power consumed via a cascaded chain being optically linked to power outlet or a key (of a switch).

The optical switch(es) introduction initiated major changes into and within the wiring of homes, offices, public and other unit of buildings, via at least one of optical cable direct, I, e. a selected optical cable, linking optical commands via the home controller, to each and all loads in each of all units of buildings. The reporting optical power consumed follows the same pattern by the introduction of several changes to the ISBs and the outlets as explained below.

Two important introductions to the structure of the ISBs were needed for a smooth reporting of power consumption, mandating the combining of the horizontal and vertical mounted ISBs to be identical.

Wherein all the ISBs transformed into a Combined Intelligent Support Box (CISB)(s) to further enable install plug-in devices including Opti-switches, in both vertical and horizontal mounted CISB(s).

Wherein a global consumed power and statuses reporting include all the world countries current power plugs, needed to be identically fit, be it into vertical or horizontal mounted CISB(s).

The introduction of horizontal and vertical ISBs enabled a revision of the plug-in outlets structure and unify the plug-in structure of all the power outlets, and be attached identically by amending the prior power outlets to fit the install. With both vertically mounted and horizontally mounted CISBs. The other details of modification are disclosed in FIGS. 2B, 3, 4, 4D, 6A-6D, 7-8, 10A-B, 11-16, 17, 18A-B, 19 and many more.

The known prior art to actuate a switch and/or report statuses and power consumed via optical signals disclosed by the applicant in U.S. Pat. No. 10,225,005 and further disclosed in the U.S. Pat. Nos. 10,313,141; 10,686,535; 10,797,476; 10,840,687; 11,031,760; 11,239,641; 11,329,463.

None of the above recited disclosed patents Beamy light or cut Beamy for actuating a switch. No one ever suggested to operate a light switch, or for that matter, a hearing device to be guided, operated or controlled by a push or touch of a wearable key for cutting a Beamy key linking a device or a switch.

None, or no one ever suggested a combination of straight or bended Beamy key in open air or inside a switch, and/or bended light via Plastic Optical Fiber (POF), inside the switch. Nor nearby or outside a switch, or touching a wearable keypad or a shirt or any.

Another new in the present application disclosure is a concept used for at least one wearable ornament or a portion of a wearable surface to be a push key(s), for cutting at least one Beamy of a single or multi-Beamy actuator(es), be it with a CPU or with a controller of a HeaRing aid Device (s)(HRD)(s), or to a portion of a person's body or space, for supporting a medical state needs.

The providing of a plurality of cut lights—via wearables touch surfaces or push of a given soft key, and the plurality of cut light finger push switch, by push of a soft button or ornament, by a single finger, is to be read, the pushing for self-adjust or support onto or related to the wearable surface elements. Presenting an obvious use for bed ridden and endless different medical uses.

The main limits for the current HeaRing aid Devices (HRD) are the congested tiny circuits and the inability to handle the surround sounds. Current HRD devices cannot be modified by adding devises, or by adding RF circuits and/or control panels-linking via wires.

The inventor of the present application—a long-time user of HRDs appreciate the effort and the engineers of present HRDs, but does not agree nor accept the hearing quality of present time.

The inventor made some test in a noisy atmosphere and to the inventor surprise this direction particularly for elderly is clearly one solution we are all looking for. The following will not take long for involving elderlies into testing, and review their comments which our engineers are waiting for. Due to the commonality of many devices elements preparation for production takes time, our management decided we do both together home automation and hearing device. Preparing the opportunity to correctly generate home automation.

The inventor anticipates that an esthetical surface including ornaments to be pushed or touched by a finger will be acceptable and adopted by potential users. Yet and whatever a need is for self-adjust and set—is/are basic element(s) to be applicable for many functions.

HRDs can and should be controlled and set by a user finger touch onto esthetical surfaces, comprising Beamy touch key switches for operating a plurality of touch switches for up-down, left-right and front-rear, to control wearable microphones—to start with.

As stated in paragraph 1, the use of POF of the prior art is well known to currently expanding. The known POF is used for the communication with the car (industries). or The POF is operable for limited short distance (max. 120 m). Fit well for inside car and/or inside homes. And a perfect solution to keep out hearing by neighbors what is going on in your home.

Moreover, the use of visible/non-visible light spectrum introduces another multi usages. The above recited statuses reduce the search for prior art to a literal none to find.

The recited 358', 418', 005' and other patents by the applicant disclose the structures of ISBs, switches and loads linked via (POF), but none about Beamy touch key switches, nor the setting or adjusting HRDs by a touch of a finger, to actuate a given Beamy touch key switch, via such as not yet known button/ornament—the other first ever.

With the above reasoning the applicant believes to be presenting a firm base to a long list of needs.

Going back to the Home Automation operation and long list of building devices and systems and other fields of life with similar needs. Start with light system, communication, home control, car control, home car park, health devices, hospitals, business, offices, factories, school buildings and other facilities.

Above do not apply to the structure of the referenced keys and power outlet, none is flammable. POFs are non-flammable. The AC or/and DC power outlets are non-flammables. The Beamy touch key switches are non-flammable. Further, the PC is preferable to be singular and in control of a whole home, shop, office or other disclosed units of a building, none suggest or show to operate "Beamy actuator", a novel device. Going back to the hearing aid.

The HRDs "speaker" of the present invention are structured to cover the ears and the ears surrounds by comfortable thin speakers, attached to the whole of the two ears surround, a novel support for generating voice and music with enlarged audible spectrum, to substantially upgrade the voice and music hearing quality range and level, to properly fit for hearing impaired size and shape.

The applicant is also planning and intend to introduce HRDs speaker to deaf born children, which speaker is experimental. Introduction will be allotted to hospitals and medical schools, by the applicant, if any of a test will show slight positive results.

The receiving of the sound or signals and/or vibration from and "between" the surround "tragus" and inside the ear(s) cavity "fossa", in contrast to current sound fed via a thin tube with a very small diameter and a very small sound membrane.

The HRDs are steadily being modified and improved, however a squeezed small devices and membrane for generating voice or music remains. Regardless of a well performing processors, the sound fed is directed via physically limited band width being a result of the very small (tiny) "speaker" elements, prevail.

The above with small microphones sizes of the small sized hearing device are another major limiting factor. The smaller sizes causing difficulties to the hearing impair people in general, and to elderly hearing impair in particular.

The most disturbing failure results are "I cannot hear" and "I do not understand". Be it a response or a complain to a distort, by the elderly hearing impaired—being in the "dark"—"sound dark". A non-acceptable state by the hearing impaired.

Another "I do not understand" difficulties by being surrounded with talking people—such as in restaurants. It is like being "attacked" by a background music and loudly talking people, or a crowded line waiting near bus station and the like.

The inability to understand the communicated words and passages are a major issue. It is extremely difficult or literally impossible to overcome by the "tiny" sized HRDs. More-over, other disturbing factors are noise, hum of the streets (outside noise), or inside noise, such as air condition along with noises by street cars.

Street noises via the rear and front microphones enhance the inability to separate the surround noise from conversing—the way human brain functions. The hearing aid process needs to be somehow directed to the intended sound source direction, such as with left-right, front-rear, and up-down (L-R, F-R & U-D).

A finger touch may be the best answer to the brain intent to hear L-R, F-R & U-D. When a finger touches up or down and side way wearable surfaces and may well be memorizing the touching points and direction, the plunger may assist by a given formed shape over given time and may bring the user brain to follow the finger touch, and may their-by memorize and adopt the surround noise two way as set i.e., via the microphone and the brain . . . control.

All the generated surround-sounds, exposed to varying voices and back grounds—degrading the hearing ability of the hearing impair from a clear-voice within the mixed sounds and noises.

No direction select are provided for a given sound generated from the L-R, F-R & U-D to help. And as no such HRDs known to be available, mandate a solution for the hearing impaired.

The only HRDs ability to provide is volume in each HRD, not a self-select be it left or right or up and down, nor self-read or control the communicated noise vs the exist hearing level.

The need for clear hearing therefore direct to the introduction of presently disclosed new and different HRDs systems, that among others, may be the right aid to learn and find the proper means to bring deaf born babies into our hearing world.

The present application introduces new HRDs devices to counter the hearing aid inability to a service in a given service office at given times—versus a finger push or touch onto wearable touch area. Presenting a need not attend a service—being unable (in-fact) to improve any, outside repair and review the amplified and processed signals. Not a service to improve a speaker sound inside the fossa.

The future mandates a convenience of self-adjust. Set throughout the time of a day or night, via soft wearable Beamy touch keys, should be the optical system. Setting and controlling variety of functions, pointing by fingers—are a basic means deaf people hand and fingers communicate—throughout.

To increase-decrease-adjust of music and voice, mandates a defined "volume" and "tone" and "surround" Vs lucidity, presently a never defined values. Particularly as lucidity varies along with surrounds, never both, regardless of the HRDs settings.

Back from lucidity to both Home Automation and HRD. The main object of the present invention(s) as set, is to program the Beamy or the beam by introducing a given code or data pertaining the light(s) particulars, and the light to be switched (on or off) with the data being communicated with the PC for further instructing via the POF to switch on or off a given light bulb, comprising one of optical data for processing and communicating as instructed, via the cascaded POF optical signals.

Such non clear presentation followed by recording of at least one consumed electric power by at least one of devices via the cascaded POF, including lighting.

The next object of the present invention is to provide the hearing impaired with a new first-ever convenient elegant wearable hat, covering head and a single or dual (singular or combined) hearing device. Comprising at least one pair of round or oval speaker, for attachment around each ear posterior helix (fit ear surround).

Supported by a soft and comfortable sponge like elastic cover in a circled or elongated (oval) "fit cover all" speakers, providing simple attachments by a soft lock spring. The springs surrounds the left and right ear's helixes by a soft squeeze.

And . . . releasing said-lock spring from the surrounding helixes. Wherein both speakers generate voice and music sound, can range from below 60 Hz to well over 8 KHz. As self-set by the user, by a setting up a self-listening, as self-desired, and for self-enjoy.

Further objects are an introduction of plurality of various narrow to broad band microphones, positioned along with the user dress, jacket, decorative shirts or combination of shirt with underwear or with a tie or a belt or other wearable. Being fully visible or partially visible to provide sound access to the microphones and for touching given surfaces and/or via wearable ornament(s).

Another object is the use of long-term wearable charged battery(s), charge for a week, as an example, for the user convenience, including the HRD circuits. Being linked to a belt or a tie, or to other part of a wearable and or other surfaces to provide Beamy touch key generating for a Beamy cut signal, and for communicating as set, be it a given device at home or at a workplace device, or parking and similar, for actions, or movements and report.

Beamy touch key switch is not a self-operated light switch. The Beamy touch key propagated cut is via a cascading POF grid(s) to a given ISB and or to the home controller direct, and/or via a distributor and/or a command converter.

The home controller commands on or off to each power switch direct, covering each and all light switches, included in at least one hybrid lighting cabinet. Hybrid switch(es) can be actuated by a CPU(s) of a given ISB. Acting as commanded by any one of the selected hybrid switches, is limited to reversing the given switch state only, i.e., from on to off or from off to on only.

To better understand the cut Beamy follow the explained below. Light is known to switched on-off via a mechanical lock into on or off contact state (via a switched live power line). Separate from the neutral line connection.

The applicant introduced the U.S. Pat. No. 10,586,671 in addition to a long list of US and other countries patents pertaining devices and circuits for providing a solution to lighting automation.

The Beamy touch key via given cascaded chain is not individually operated. Cascaded beamy light chain of a plurality of cascaded chains operate via one of a distributor and a command converter linked to the controller. Clearly establishing that only a single light bulb is needed and applied to each cascaded chain powered by n (milli-W), consumed via dual cascaded POF chains by HRD.

The above bring us back to home automation.

Same front and rear microphones including left-right microphones are structurally positioned, the front-rear and up-down microphone can be structured and commanded by finger touch controlling up-down microphones as set within the microphone positions.

The other first ever to introduce a never before is the linking by an optical (Beamy) actuator via one of Soft Bending Optical POF cable and direct via a straight optical link line, between a light source and a POF access. Wherein a Beamy touch key and a Beamy Signal actuates a switch via a Controller, limited to control via the linked cascade POF, via at least one of a CPU with the Home Controller;

The further object of the present invention provides for beamy light in "air" via one of inside and outside switch body to operate by transforming a Beamy actuator into actions via a controller or a CPU generated command.

Straight and bended color beamy light of 380-800 nm and non-visible beamy light or signals of over 800 nm, and the bended beamy lights and signals via optical cable, were never known to physically actuate switching device on-off, by straight or bended beamy light within a switch enclosure, and/or other enclosure(s) in a cascaded chain.

BRIEF DESCRIPTION OF THE DRAWINGS

The foregoing and other objects and features of the present invention will become apparent from the following description of the preferred embodiments of the invention with reference to the accompanying drawings, in which:

FIG. 1A shows a prior and current horizontal and vertical ducts, wall boxes and drawn AC power lines, comprising (L) power line (AC), Neutral (N) and ground (G).

FIG. 1B shows perspective of a current known Hearing Aid devices and a battery charger.

FIG. 2A shows a congested lighting wires onto and into current wall box and light switches, showing a complex to handle/install within the wall box space.

FIG. 2B shows shorten rear, by a removal of rear cover for enlarging the rear box space, forming a slimmer ISB by the removal and occupying new spaces, and far less power wires shown in FIG. 3.

FIGS. 3-3A and 3B shows a single and dual novel Beamy Touch (BT) for attaching one or plurality of BLAs into n gang ISBs. Each BLA is linked to a CPU access, for communicating with given ISBs, linked to a home controller (PC) via a cascaded POF.

FIGS. 4-A and 4-B show dual cut POF cable, bending inside (BLA)(s) 40-A & 40-B. Wherein 40-A shows dual cuts POFs link a Beamy touch, fed from the generator 4-8 to link a Beamy touch receiver 4-10 via the dual engage POF segments 4-5 & 4-7.

FIG. 4-B shows a finger push a keypad 40P pushes a plunger 4-6P and onto a tact spring 40T (FIG-4*c*) to reverse the BLA state for a very short time and remove the finger to re-start the Beamy touch.

FIG. 4F shows two sets of Beamy touch keys 40H-1~40H-n including 40V-1~40V-n, wherein both shown switches are identical switching that can be mounted horizontally and vertically into ISBs.

FIG. 4C shows different internal structures of the bending and straight Beamy touch keys, both are using POF cut segment(s) or via other optical fiber segment, or the fiber segment can be differently structured or shaped and/or positioned to guide the light or be cut by a push of a differing plunger 4-6 or 4-16.

FIG. 4D based on the POF diameter, flat or other surfaces and/or other shaped elements beyond the shown in FIGS. 4D-1 to 4D-33.

FIG. 4D-1~13, 4D-20~22, 4D-14A~14*n*, 4D-30~33 and 4E1~n introducing a base for wide ranged actions and or data exchanges.

FIG. 4E1~n show an introduction of a multi two-way exchanges, and dual push of a cut Beamy element(S) 4E1~n for a push Beamy of a given other data and/or receive capability. The applicant represents that a pre-cut end of cable for engaging another cut end of cable, or directly engage a light receiver, photoreceiver, transmitter or a photo transmitter direct, or via other receive, transmit and/or push element, is a further design option.

The shown two-way can be multi way 4E1~n as applicable, and a multi feed can be similar or can be single power feed to all.

FIGS. 4D-2~4D-4 show an introduction into two or plurality (no limit) bending and formatting a POF cables including 4D-2~4D-11~4E1 can bend, be it any degree from straight and up to 180 reverse all stated to be and show bending including a range of bending. Other devices in addition to the shown 4D-1, 4D-8, 4D-12, 4D-13 and 4D-14, each represents a literal endless links, cuts, cascading, bending and push elements.

FIG. 5A shows a single push knob at the back side of a hearing aid-device, plugged onto the user ear. With the user pushes the knob to change the volume up (or down).

FIG. 5B shows a noisy crowded restaurant or night club with a client being unable to understand, nor communicate with a waiter.

FIG. 5C shows simple process to enable a self-setting by touching wearable Beamy Touch Keys and adjust the different parameters of his wearable hearing aid, within an inside crowded restaurant, to end up pleasantly understand and communicate with the waiter.

FIG. 6A shows a DC plug-in device into a modified ISBs to be plugged-into four gang space, showing front and rear of a combination for two single gang and a single four gang. Each with dual outlets shown in identical pairs and a dual gang for supporting four differing DC outlets supporting two plug-in switches and newly designed outlets and plugs for home automation use.

Figures 6B, 6C, 6D:
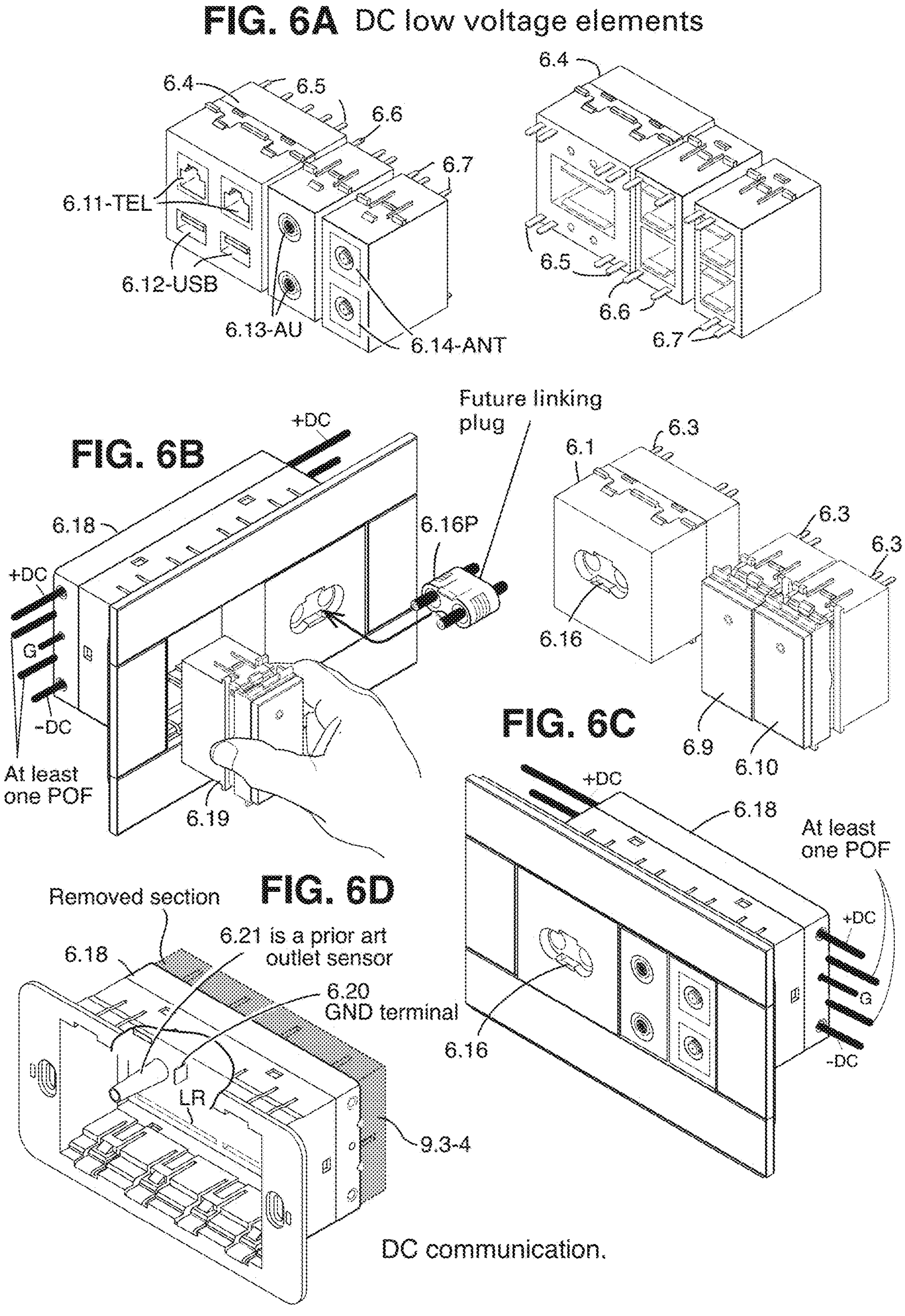

FIG. 6B show an install single plug-in switch 6.10 and dual gang socket 6.16P. Also shown through a visible rear the DC wires cut ends and POF cables(s) ends. The shown single and dual gang devises are adjusted to fit the rear accesses into a whole range of future plug-in power wire and POF, cut and plugged in by hand tools to most advanced power line cascading to fit the freshly modified ISBs B shorter dept. See also FIGS. 18B, 19A, 19B, and 19C one of the hand tools.

FIG. 6C introduces similar four-gang with the amended rear cover and the three electrical wires +DC, −DC, G, and two (max) fiber optic cables for slow signal of approx. 1 kHz and high speed. The 1 kHz is used for all electrical, environment (curtains, fans, heaters, coolers, lights, entry, security and similar as the provide sufficient speed to all the home automation actions including power consumption reporting in full details.

FIG. 6D shows in more details the removed rear from the wall boxes, a new Ground terminal and the prior sensor link of the prior ISBs.

FIGS. 7 and 8 are conceptual introduction of changes made to the wall boxes, and major changes to the ISBs to be a fit for all, be it horizontal and vertical mounted wall boxes including pulled cables into ducts fit for all.

FIGS. 9A & 9B introduce a new innovative COmbi Switch (COS). COS is plugged into an AC or DC ISB dual gung outlets space, such as shown in FIGS. 9.1 and 9.3. The COS is selected from 1~4 switch combinations 9.4-1 to 9.4-4, plugged into dual gang ISB.

FIG. 10A shows lights operated via a light cabinet (FIG. 10A~12) and operating the lights via hybrid switches, forming another never before home lighting system.

The shown small home unit with 8 lights operated via self-assigned ISBs are simple to absorb. The shown lights cabinet 103 operates by two or more combi switches, or the 1~8 Beamy Touch Key (106), via a lighting code, set via the ISBs into the lighting cabinet and a home controller, via power cable 103CN. The lighting cabinet code is recalled by the home controller to switch given light(s) on-off.

FIG. 10B shows a larger home with 16 lights and two lights cabinets that are identical in literal all aspects to FIG. 10, outside the number of the switches and the number of POF cable (two POF cables in FIG. 10B), via power cable 103CL and 103CN linking the two lighting cabinets to the home controller.

FIGS. 11 and 12 show practical setup of a central lighting via home hybrid switches and n Beamy touch key, to be positioned and accessible to operate any of the installed lights within the home.

FIG. 12 is another setup of expanded lighting set up via home controller and a three or more (n) lighting cabinets, operated by n hybrid switches, n Beamy touch keys and n COS switches to be positioned and accessible to operate any and all of the installed lights within the home.

Inch base will set 5 rows of 8 switches, covering a space of 5×6 or 6×7 inches, sufficient to include circuit breakers, power feed, power consumed measuring, reporting and many more. The sizes of 5×6/6×7 are within half of A4 sized paper.

FIGS. 13A, 13B, 14A, 14C, 15A, 15B, and 16. show detail of the newly plug-in outlets, forming the next object, similar to and following the plug-in outlets disclosed in FIGS. 7 and 8. Covering many countries and providing a whole range of plug-in outlets and switches. FIGS. 7 and 8 disclose and show outlets for US and Japan.

FIGS. 13A and 13B disclose outlets for use by China and Australia. The plug-in devices are designed for install by a simple plug-in and simple removal by using a plug-in hand tool.

Figure 14A:
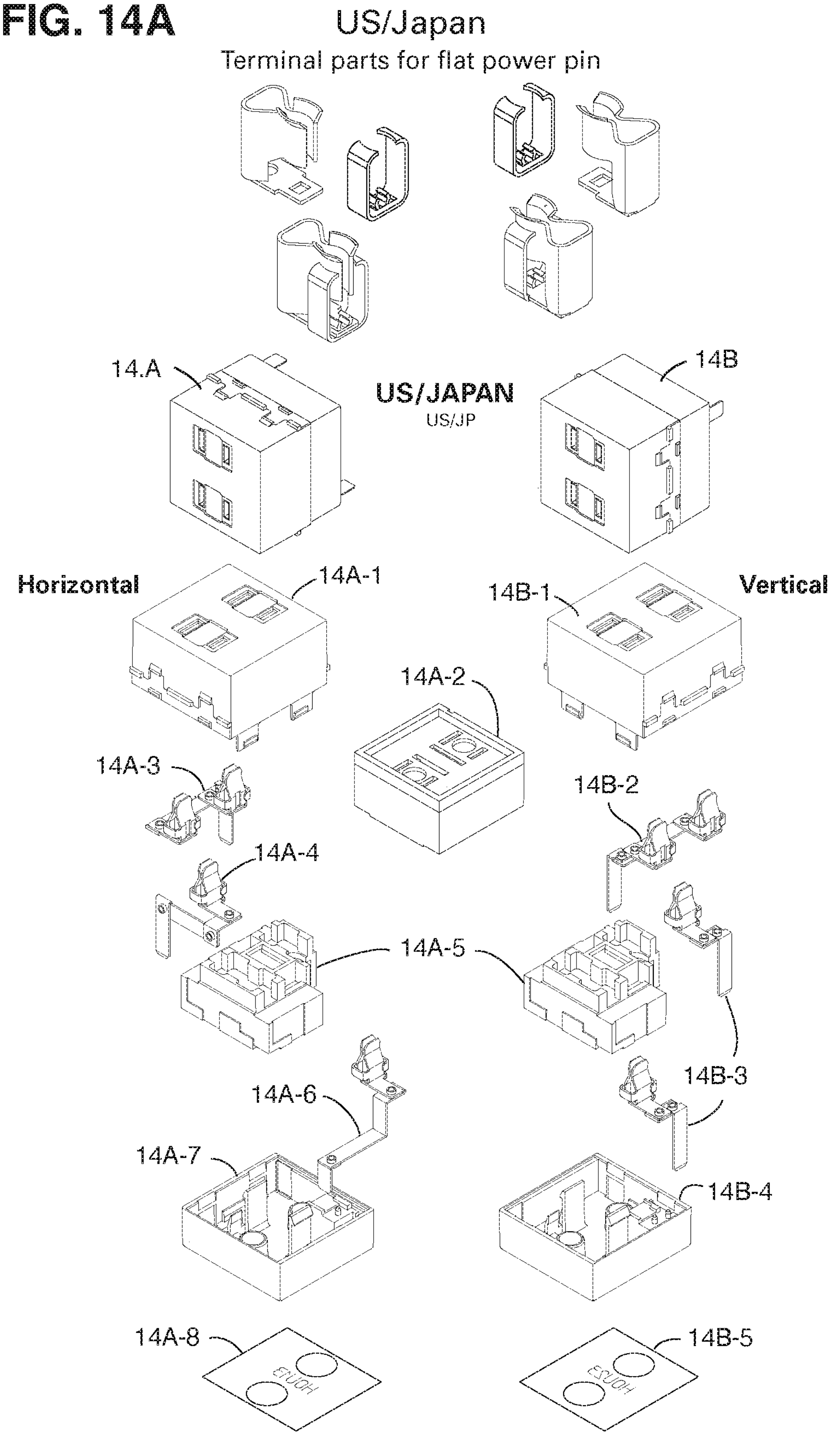
Figure 14B:
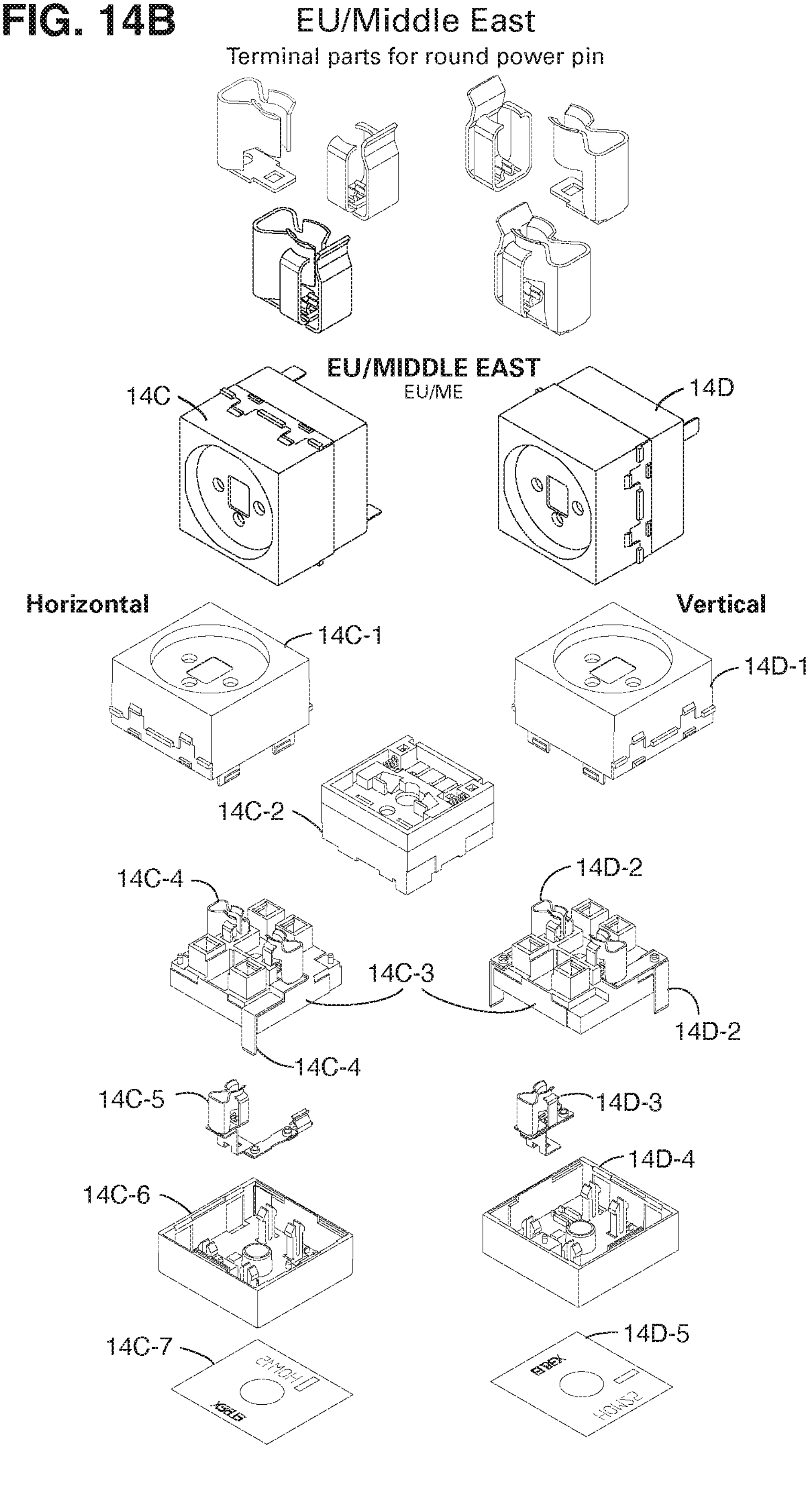

FIGS. 14A and 14B show another newly designed global power sockets for US, Japan, and the Middle East, for simple install by a plug-in into ISB. An inventive plug-in outlet, covering any and all outlets shown, for use by major countries—US, Japan, Europe and Middle East.

Figure 15A:
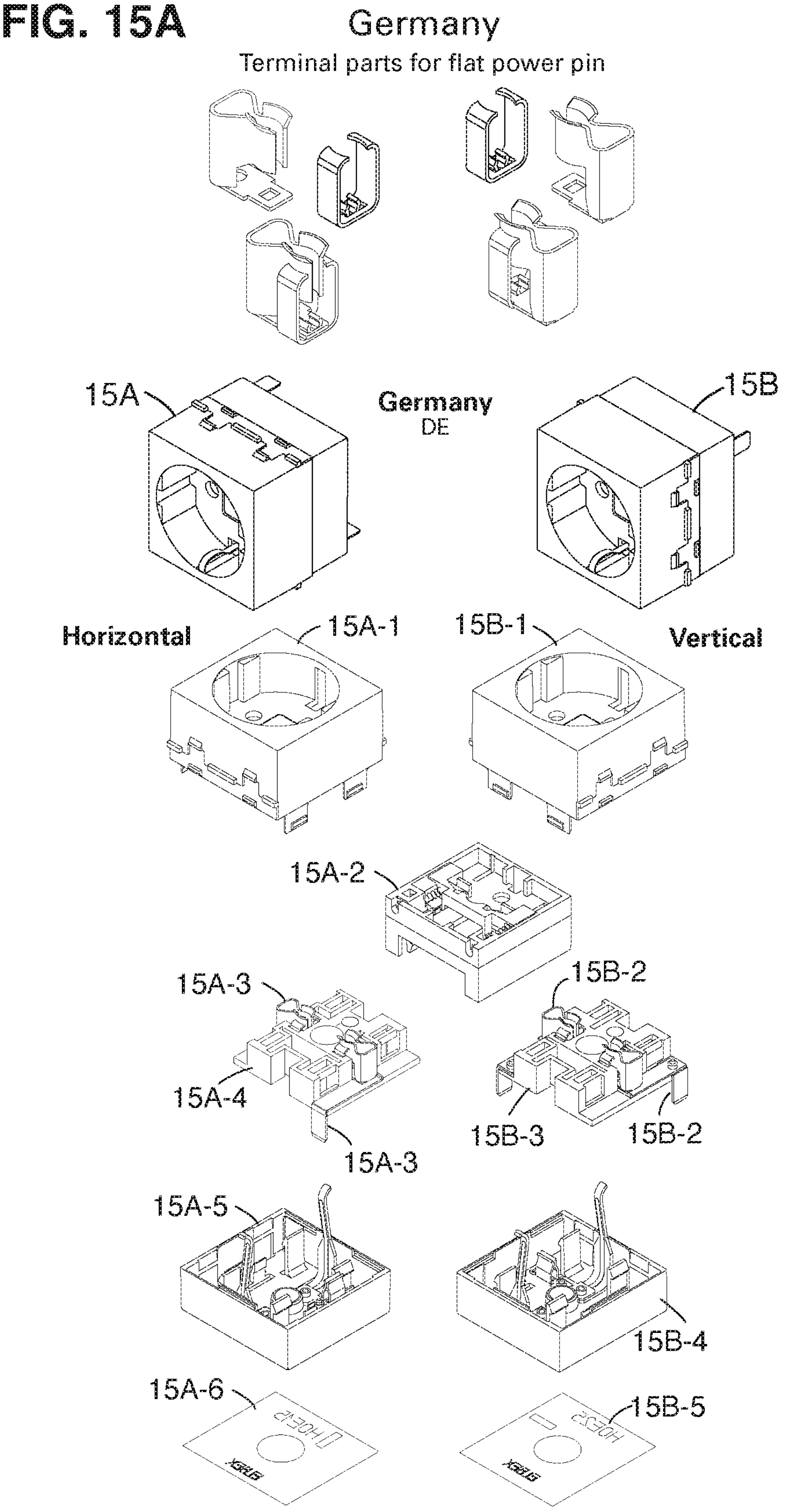
Figure 15B:
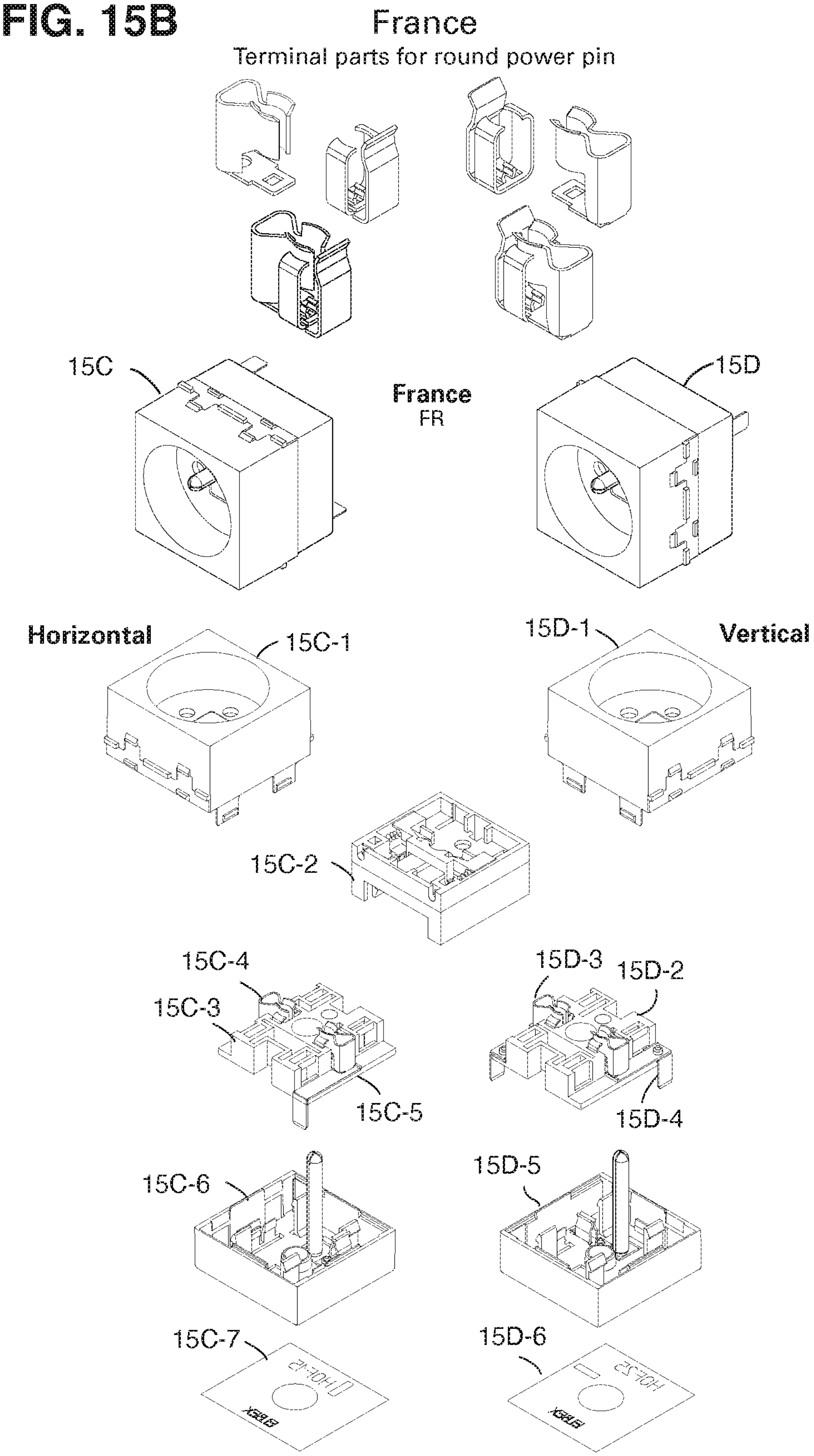

FIGS. 15A and 15B show similar switches and sockets for plug-in into ISB for use by major countries such as Germany and France.

FIG. 16 shows similar switches and sockets for plug-in into ISB for use by major country such as England and Hong Kong.

FIG. 17 shows vertical and horizontal ISBs device for accommodating horizontal or vertical install ISBs. All wiring L, N and G are provided and need not be physically connected outside a plug-in action as provided to all ISBs.

FIG. 18A shows a new innovative power terminal structure with no screws, uses plug-in technic in all linkages and contacts by and into or with the electric grid.

FIG. 18B shows a new innovative cascaded wiring system with all powered wires and ground wires are plugged-in and with no screws. Feed main power to the given cascaded line by a standard power line as specified in the given country such as 1.6, 2.0 and 2.6 mm.

FIG. 19A show elements and self-lock contacts to enable the install of power wires by a push as shown in FIG. 18A for a standard size cable diameter 2.6 mm, 2.0 mm and 1.6 mm, include in-out ground wires, and hand tool. The diameter size may differ by differ countries.

Figures 19B, 19C:
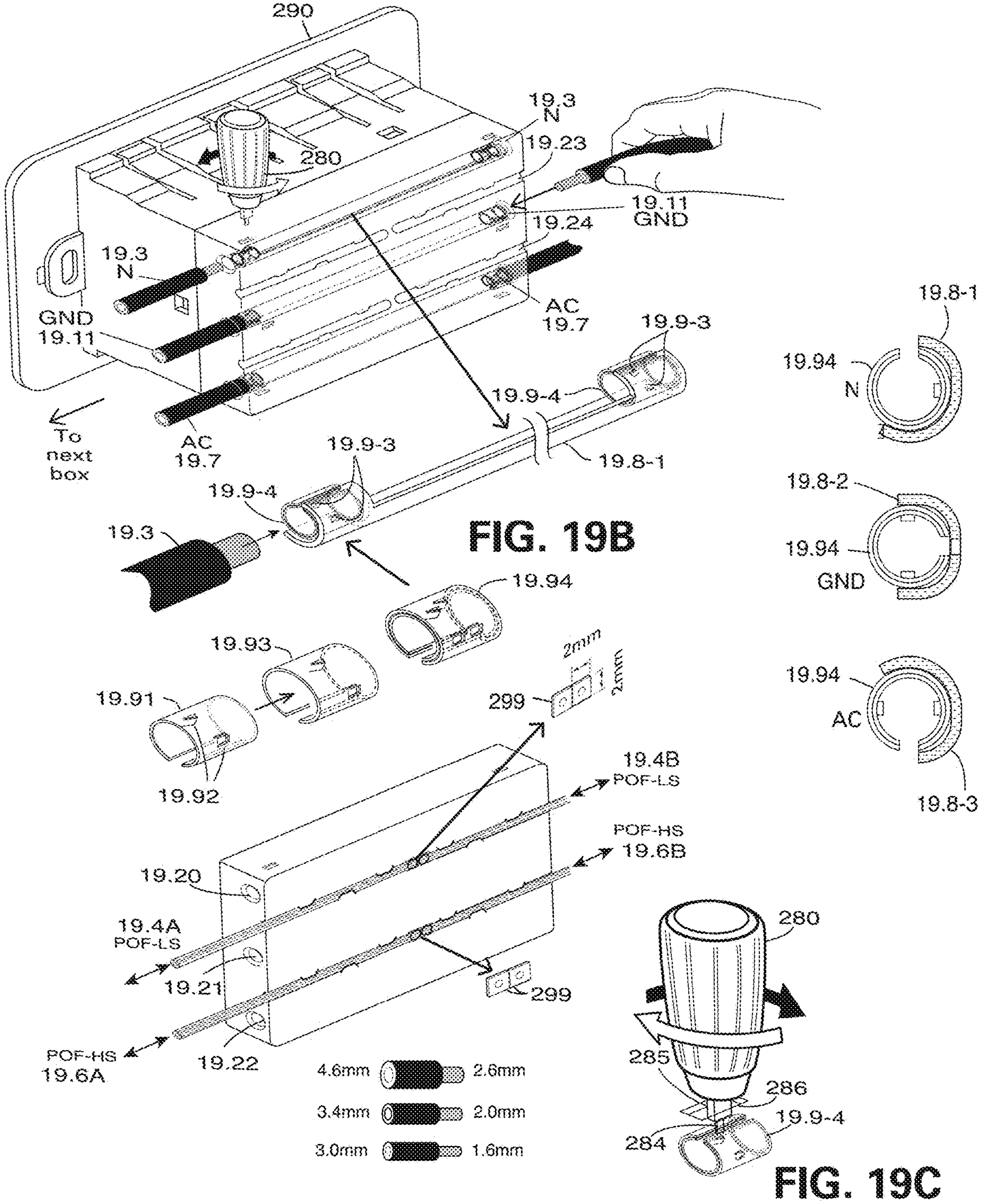

FIG. 19B further show the structure of the novel socket for enabling the ends of the intelligent support box to link with next cascaded intelligent support box.

FIG. 19C shows a safe hand tool for releasing locked AC or neutral power line by a simple left/right rotation of hand tool.

FIG. 20 shows combination of bedroom lights switched and outlets for on-off switching by Beamy push switches or by combi switch as programmed. The shown dual lights are powered by outlets 414 and 415 direct or via a programmed plug-in hybrid switch or combi switch into 401 or 402.

FIG. 21 show another selection of wearable with plurality of wearable.

FIG. 22A-22D show the use of Beamy touch key by speaker selection and touch finger for self-setting her or his hearing aid via the Beamy touch keys as proceed and/or self-programmed. There can be no limits to the wearables.

FIGS. 23A~23B show simplified wearable elements and devices, wherein two speakers, plurality of Beamy touch keys and microphones to set the hearing aid to be comfortable as shown in FIGS. 22A and 22D.

FIG. 24A shows an example of speaker elements and touch light assemblies that are a presentative of the need for hearing aids.

Figures 24B, 24C:
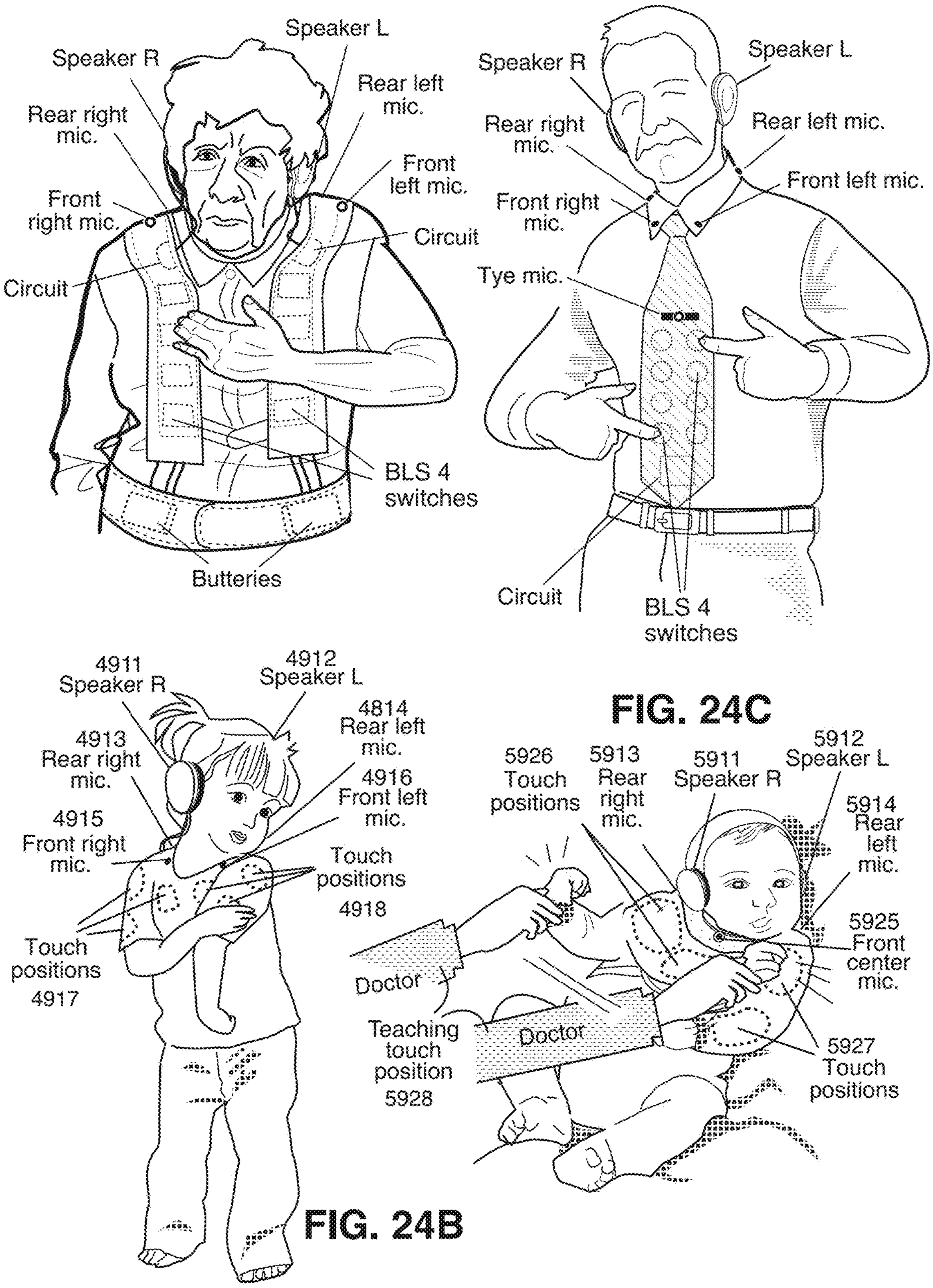

FIG. 24B shows a one year old, and FIG. 24C shows a young born baby, both are born with hearing problem needing support.

DETAILED DESCRIPTION OF THE PREFERRED EMBODIMENT

FIG. 25A (embodiments 25A-1 and 25A-2) and FIG. 25B repeat the simplicity of self-setting with more particulars, clearly showing the conveniences, seriousness and accuracies to be gained by the self-setting at all times.

The applicant starts the introduction detailed description of the preferred embodiment with the last item of the brief description i.e., FIGS. 25A & 25B.

The reason is the introduction of a Beamy device to open a world of light switches is wrong. FIGS. 25A and 25B may seem to be of major importance. Some may view shutters and curtains cost problems and look to provide a simple position of a given shutter or curtain.

The position indicators are well known to be approx. or estimate, positions are estimated based on counting the motor rotation and length of time. While motor rotation is a wrong measuring, for calculating the length of a curtain and other particulars based on a curtain. Longer curtain uses ticker rotating coil, and whatever the measurement, that is or will be far from being "error free from an approx. measurement" via number of rotation.

On the other hand, to create a proper position measurement is costly affair for current homes. Same apply to a shutter and a curtain, best is an approx. value. The shown FIGS. 25A and 25B present for the first time ever a solution for identifying curtains and shutters positions and data, providing accurate positions by introducing a roller, for indicating the shutters and curtains positions 25-2.

This is by attaching low-cost Beamy push key layer 4D-CU into any position along the motor 25-1 or roller 25-2 movements. The two CPUs 4D-C1 & C2 at the layer end enabling the use of just one cord at a low cost to be a perfect solution for all curtains etc.

The capability by the POF is obvious as it can cover every field of life. The curtains and shutters presenting a tip of the future. The entire assembly of a flat POF layer 4D-CUA-~CUn attached to a wall or window frame and other positions, with a pad of 2 mm thick (example), connected to the bottom end via CPU—communicating with light receiver, extending to 2~3 m height (straight or curved).

Above are the only elements disclosed; flat POF 2~3 m long, low-cost CPU and a low-cost light receiver are all the elements involved in identifying the position and status of a system installed to identify the position and the status of a curtain and/or a shutter.

Present application covers two objects based on—home automation and hearing aids. Both are responding on the basis of technologies as existing or better say existed in the past.

Each and every physical Beamy actuator movement to propagates a data through a channel at a relative slow speed (1~3 inches/sec.) for good reasons. The distances within the home are not long. A corner to corner distance in any direction, will rarely pass 200 meters (about 75 inches). No matter how slow the communication line is, it will take from point to point for POF 0.1 milli sec. to reach. Thereby, any higher speed for home automation is an absurd.

The need for high-speed signals can be easily handled via POF cable within the 200 meters (left+right direction) at 400 meg/per second.

The issues of the lighting are discussed in further part of present application. Experienced speed to switch on—off, as explained further, yet faster speed from the current light switches that take 10-20 milli sec. via a finger push for slide to switch key on or off.

The given object within the present disclosure is an introduction of a short "floating optical cut" of a propagated "floating" Beamy light to be received by Beamy light or signal receiver. A second object within above disclosure is the receiving floating beamy light by a beamy light receiver with no + or − base (high-low) references.

Both the Beamy light and the optical signals are individually propagated via a straight or a bending Plastic Optical Fiber (POF) cable, having no floating level to measure and no references to AC and/or DC power level i.e., introducing a floating beam level into optical switch with no references.

The present disclosure further presents home automation and hearing aid devices—including core technologies formed to involve home automation, comprising IoTs and Ai devices (communicating WiFi and other signals) or to further including a core of hearing aid with the surround.

Wherein the home automation with no central controller, controlling every element and device, including reporting power consumption detailed, along with all other anticipated details . . . The hearing aid problems were and are the surround noises, sounds, and music facilities, such as clubs and noisy restaurant, including open spaces etc. where the surround is overbearing. . . . And very little or nothing is done to overcome for supporting the hearing impaired.

In view of the common difficulties faced by home automation and hearing aid, the present applicant deeply studied into the failed attempts by many, that failed to led little, if any to a meaningful something. On the other front, users of the hearing devices were never given meaningful means either to self-control their devices.

The failing home automation, needing a solution to install and operate light system, anticipated to be simple challenge to search for A new light switch (and beyond. The reality remains with none is found or installed into the new home marketplace.

A solution to the issues involved at present time are non-available. It is not a simple push or touch on-off key, expecting a soft touch key to make "it" happen.

Be it "operate and control everything" at home and/or some ware, operated and control hearing aid devices. Be it "anywhere", anytime none can be achieved by a soft push. Statuses facing serious difficulties are for different reasons, yet can be corrected to operate by a touch.

One must agree that the majority of given homes include a total of some 20-30 outlets, 25-35 switches (+−20%) and a max of 50 lights. To control or communicate within the home, need not Giga signals or frequency, nor meaningful time units. In-fact a signal speed of 1 kHz (low sound frequency), will cost far-far less and be far more efficient, for all signals propagated within a home.

This concept enabled the forming of a first ever Beamy Light Actuator (BLA), operated by actuating a Beamy light by a cut of the Beamy light, by a push of a soft plunger. Beamy optical signal generated by a push of a soft key. Be it low voltage AC or DC power feed, or finger push (no electric power) onto the Beamy actuator, enabling to switch on-off-on . . . different devices trough an ISB or as directed by the home controller.

A Beamy light generating references are self-set via an ISB, receive directly by a light transmitter including the action address as recorded into a PC, a CPU of and via ISB via a cascaded POF.

A Beamy light and optical signal are individually fed into Beamy light channel, or simply introduce an optical signal receiver included in a given ISB, for identifying a received command enclosed to operate as a device or element, or both. Beamy light actuators therefore can address and/or command via the home controller and via a DC lines, be it elements, devices or circuits.

A Beamy lights and/or optical signals are insulated from all electric power lines. Beamy lights with no direct bearing to electric power, in any and all forms.

All the available power lines, be it AC or DC and/or battery power can power and feed a Beamy light and/or signals for processing data to and from the home controller (PC). To be further fed and communicate command signal via links included within the home devices direct, and with an external device such as the dweller car, parked within the building parking or outdoor, directly by a given PC signals as programmed (or to be programmed), such as by a car manufacturer or a shopping provider as two examples.

Loads and/or lighting being absolute safe—such as Beamy light or signals—are not to be viewed as elements, nor devices.

Further object of the present application is to support one or more Central Light Cabinet(s) or (CLC), each CLC support at least one ISB for installing at least one plug-in hybrid switch, see U.S. Pat. Nos. 9,036,320; 9,257,251; 9,928,981; and 10,586,671 available for plug-in installation, provided by a range of ISBs installed in the central and/or other light cabinets.

Wherein the CLC can be applied to other loads, while the signal can be applied for switching and controlling AC and/or low voltage DC, including battery operated appliances.

A plurality of Beamy light and light switches, wherein an insulated switch body is/are or can be linked by DC, AC, straight light, bended light via POF or via Beamy light or wireless Beamy light.

The powerless as intended is light fed by LED from within an ISB for generating and feeding a Beamy light and/or light signals for operating a selected powerless switch (es) with at least one is via a finger push and a push key.

The processing of the data is by the engaged ISB or by the Home Controller that feeds command signals through the home optical (POF) network, or other networks to a given devices internally, externally and/or to a dweller car, within the building parking or outdoor directly to the car.

Light propagated inside (internal) a given encapsulated device, cannot be obstructed by other lights from outside the "device". Contrary to "radio frequency" (RF), wherein the shielding of RF signal is not as simple, and may not provide a separation from other devices and signals.

As light colors are segmented, can be filtered and assigned to identify pluralities of light colors, as set-up and assigned to at least one unit or a single home, and/or to at least one unit of high-rise building, and/or to at least one office and other building units, operating appliances, including interior and/or exterior devices for signaling and identification.

Assigned the light colors and process to and via the home controller access, such as codding each Beamy light by a given color, to be a simplest identification of touch and address Beamy light actuator. Select the first color, such as brown to entrance area and to a given light, such as a result of a touch a corridor wall.

Simple to identify is/are the return (move back) from the touched (wearable) key. Measured within 1-50 milli sec. or 1-n Milli sec/sec.

The above 1 Milli sec. is too short time for a finger push or any physical act, and the CPUs within the ISBs are set to respond to light beyond 1.M.s. As to the light signal, the CPUs within the ISBs are set to propagate a short "signal" within 1-n Milli sec. for addressing a given n mega bit device within the ISBs or the controller via the high frequency POF and high-speed support.

Propagated light is an absolute safe signal. The above short summary touches a tip of a future light control including switches, while the "current" application (future) is disclosed herein.

Prior to proceed further, the applicant provides the reader with basic terms, as used by the inventor to simplify read, as memorized and used for terms applied to the different units, devices, systems and HRDs, that are all new for home automation and HRDs circles.

To start, the Home-Controller is fundamental to provide support power lines, lights, IoTs and Ai devices and particulars, along with the ISBs "intelligence", including the need to overcome a whole range of different devices, lighting and wiring difficulties.

One example is the current power wiring, embedded inside the home's walls. Be it a residential, office, restaurant, shop, workshop, school, and other public facilities, all are powered by electric wires drawn via the wall ducts, fed from an electrical cabinet, to the appliances and to lights via switches.

The current light switches locations introduces difficulties due to random distances between all elements involved, be it switches, power lines and power outlets. The most complex to setup a "system" are lighting wires, comprising Live (L) line and neutral (N) line.

The complex is due to mixed "wall boxes locations". Installed switches into wall box(es) location(s). Wires drawn for the many given light locations heavily complicate the home lighting set-up, see FIG. 2A.

The present status mandates the ducts to be extended from main electrical cabinet and pass through a chain of wall boxes via and into walls and ceilings. And from a wall box to light(s). All the above leads to a very long and complex ducts.

On the other hand, the neutral line must be pulled along with some of the Live (L) wires. The L wire will be installed at the shortest possible duct, without the N wire, or as the case may be, to become as complex and costly as can be.

The next hurdle is how to automate on-off mechanical or a Beamy light actuated by a finger touch or a re-push of a Light Switch actuated by a finger push.

Prior solutions may include magnetic pull or a magnetic relay that is far too complex and costly. The only possible solution is the introduction of the hybrid switches and circuits by the applicant, see U.S. Pat. Nos. 10,586,671, 9,928,981, 9,281,147, 9,257,251, 9,219,358, and 9,018,803. See also FIGS. 10A, 10B, 11, & 12.

Even though the applicant hybrid switches disclosed hybrids for the home automation, the lighting power wires difficulties remains.

Supporting added hybrid switches and circuits mandate larger spaces, impractical for the lighting circles.

Same apply to curtains and shutters and/or Ai and IoTs, resulting in minimal capability and little value. Wirings remain the most urgent must be eliminated from light switches and from wall boxes.

The lights and the appliances complicity mandated new ducting and new and innovative support (POF) to link.

Solution to the home automation problem mandates major/fundamental changes, be linked via different elements such as via cascaded POF segments throughout. With the ISB power being limited to feed AC or DC to power outlets only and none to the over many years old switches.

Beamy light and cascaded signals via wall boxes, including devices and appliances, within the cascaded chains, managed by the home controller, via optical signals is—a major change.

The softs bending POF cables are far simpler to draw or pull. POF is terminated by a guillotine sharp cut. The POF is supported by full range of hand-held testers, hand tools or other elements used to enable a simple cut and PLUG-IN by hand push with no collision. Some of—are disclosed in U.S. Pat. Nos. 10,225,005, 10,313,141, 10,586,671, 10,686,535, 10,797,476, 10,840,686, 11,031,760, 11,239,641, 11,329,463.

The above paragraphs are introduced to show the simplicity VS the difficulties to set up agreeable system to include—what we all perceived to be simple. Above only attest that past lighting simpleness is/was wrong throughout.

As stated the major subject matter within the home electric grid are the drawn lighting wires, needing a solution for power line difficulties, and remove complexities, particularly with switches and terminals, as explained above and further with some details.

Live and neutral wires (L&N) are a must power feed to light bulb. Only live wire L must be drawn via a duct and switch to light bulb.

At least one light and a switch are located in every room or zone of a home or unit, any unit of a building The neutral wires N is drawn fixedly via duct(s) but not to a switch.

To cut and simplify the lighting wires the applicant is pointing to U.S. Pat. Nos. 9,036,320; 9,257,251; 9,928,981; and 10,586,671—the only available mechanical latched hybrid switches and circuits . . . and further introducing a Beamy Light Actuator (BLA) by forming a simplified cascaded grid system, into automated cascaded lighting grid. Eliminating the lighting power wires from the cascaded ISBs.

Limiting AC or DC power wires to powering via outlets, FIGS. 6A-8. Hybrid switches are set and installed into at least one lighting wall cabinet, operated via the home controller, see FIGS. 10-12. Providing power push key to all individual hybrid switches, enabling the on-off switching to any and all home lights—a perfect solution for lighting when System has failed.

Simply stated, the complexities within the extensive lighting ducts wires via wall boxes, drawn via many ducts, are history to forget.

Power wires L & N needed to power light bulbs and hybrid switch(es), are fed from a main power cabinet directly to one or plurality of lighting cabinet(s). Connecting in cascaded chain an N line and via few ducts, and the L wires via N ducts and/or any given local short ducts.

The prior ducts for pulling wires from and to wall boxes, connecting AC wires to light switches, are no longer needed. L and N wires within ISBs are to feed and measure power consumed via AC outlets. No prior art light switches are suggested in present application.

The separation of AC line from neutral line mandating in-out complex wires, ducts and wall boxes, was and is the reason for the need to have plurality of ducts, digging and no automation. The present BLA combined with the hybrid switches and via cascaded POF and the home controller, transformed the home automation into a reality.

Lights connect via power wires and switches are history. Hybrid switches operate remotely and a key push. To better understand the lighting circuits and solution see FIGS. 10A~12 and U.S. Pat. No. 10,686,535.

Hybrid switches are a must to complete a remotely operated all lights of each given new home, to start with.

Only hybrid switches or circuits enable to connect power to all lights from one central point via limited ducts. Enabling the home controller to recall via a given Beamy or as assigned via given ISB, and actuate the light(s) via a lighting cabinet(s) within milli sec(s) and/or BLA as programmed.

The proper automation directs the replacement of current light switches with Beamy Actuators (BLA). See FIGS. 10A-12 with hybrid switches how to Connect the lighting cabinet(s) along the power wires, fed from the electric cabinet as planned, or shown to be via hybrid switches-VS-Plugging BLAs into as many ISBs gangs, for lighting any and all of the many lights as set via a dweller, are switched on or off via the controller and all the Beamy actuator.

The only power drawn via the ISBs direct is for power feed to all appliances and devices (including portable lights) fed via power outlet. no lighting power wire is/are drawn direct from the ISBs.

An introduction of another object, wherein the complete removals of lighting power cables, beyond the power outlets results in saving of material, time, install and operate cost for home lights.

The term "DC outlet" refers to low voltage sockets or low voltage communication sockets, including a feed of low voltage power for operating Internet of Things (IoT)s, Artificial Intelligence (AI)s, sensors, processors, communicators and/or controllers.

DC operated via AC-DC converter circuit included in the ISB, via terminals or a given specific internal structure or connector(s).

Each DC outlet is compatible with "attachable device" be it a size matching single gang or plurality of gangs, and referrers here after and/or in the claims to be a "standard plug-in outlet".

The "attachable device" or the "standard plug-in outlets" may be in contradiction to the references disclosed to a similar, smaller or larger currently used AC switch or AC outlet of the prior art. Known to be and referred to hereafter and in the claims as a "standard size AC switch or outlet".

The terms "standard switches" and/or "standard outlets" are referred to the known to be wiring devices that are mounted directly into "a standard electrical wall box". Such as the known 2×4" or 4×4" wall boxes in the US, or such as 60 mm round European electrical wall box or other square or rectangular electrical boxes as used in Europe, UK, Australia or China or other countries & zones.

The term(s) "standard plug-in switch(es)" and/or "standard plug-in outlet(s)" (also to outlets referred to above) and/or "standard plug-in outlet" or "standard plug-in device (s)" that are supported by the support frame and box including the connection to AC power line by plugged-in terminals are referred to hereafter and the claims as "standard plug-in AC device".

The above defined terms are needed to avoid confusion and mis understanding of the lock and release actions of the present invention.

The terms cannot be equated by the known wiring devices assemblies, mounted into wall boxes by different means, with none is attached or released by a plug into-by and lock the body of the device and its terminals by plug-in action, and none is released and pulled away by hand in a single simple action.

The term "standard plug-in AC switches" as referred throughout the application and in the claims refers to any switching semiconductor, or electro mechanical, or manually operated switching element or combined elements, such as hybrid switch, a manual switch and any combination thereof, encapsulated in a size and shape fit the support frame and include at least two channels of ramps and accesses for the release bars to be inserted.

The term "standard plug-in AC outlets" as referred throughout the application and in the claims refers to AC socket of any known country and types be it two pin or three pin plugs, with and without ground terminals, with or without inner movable safety covers for any known given safety standard, enclosed in a casing size occupying at least two gang space and four of said "channel of ramps" and accesses for four or more release bars.

The term "standard plug-in device" or "standard plug-in enclosure" as referred throughout the application and in the claims is at least one device or enclosure selected from a group comprising a switching device, an outlet device, a communication device, a communication connector, an IoT device, an AI device and combinations therefore enclosed in a size and shape fit the support frame and box including at least two channels of ramps and accesses for at least two release bars.

The term "attachable device" as referred throughout the application and in the claims is at least dual gang device, selected from a group comprising a switching device, an outlet device, a communication device, a communication connector, an IoT device, an Ai device and combination thereof, enclosed in casing having a size and shape fit for a given gang channels of ramps.

A whole range of differing 2-*n* gang units with fit the "standard release bar". Establishing new gang's sizes and structures for installing one of a single and a plurality of given plug-in devices or given plug-in AC switches and AC outlet that are differing in gang number but not in the basics of plug-in installed by plug-in action and is/are released in the same process of plug-in to push-in, and plug-in to release, followed by pull and remove.

The release bars disclosed above are molded bars made of hard plastic material, that is rigid to last. Some installers and users may prefer to use a metal to release and pull elements (available). Another release and remove bars are available in a string pull of both plastic and metal bars. For further details see U.S. Pat. No. 10,840,686.

The above unifies the structure and the architectural finishing of an expanding range of "wiring devices" be it AC power, DC power, PC and peripherals, audio, TV, IoT (Internet of Things), AI (Artificial Intelligence) and combinations thereof, all encapsulated in a "standard plug-in device" measured in gang size, such as half gang, single gang or "n" gangs.

The term "outlet" refers to hereafter and in the claims to an expanded range including AC or DC power outlets, and to other wall mounted PC and peripheral connectors, telephone connectors, audio connectors, TV antenna connectors, cable TV connectors, and other connectors used for connecting AC or DC appliance(s) including the expanding the range of the support frames and ISB.

The terms "flat outlet surface" or "flat switch surface" or "touch screen surface" refers to an outlet or a switch key having a flat front surface aligned with the entire flat panel including the decorative frame surface, and further including the surface of a plug-in touch screen device having a size and a flat surface of an outlet or a switch key, or of a whole panel including the decorative frame.

Another important practical object of the present invention is to provide lower cost decorative panels, frames and key covers to a given hybrid switches and power outlets installed into given (ISB), disclosed in U.S. Pat. No. 9,219,358.

The term "hybrid switch" refers to hereafter and in the claims to one of relay/switch combination and mechanical latching relays used for electrical automation system disclosed in the referenced US patents, having front surface and body size and shape including the touch panels to be identical with the outlets and/or the hybrid switches, see U.S. Pat. No. 10,586,671.

The term "standard size and shape" is the other objective attained by the present invention, providing the hybrid switch with a structure that can be fitted with different key levers such as flat push and flat rocker key and the freedom to select any from a wide variety of levers and decorative covers and frames sizes including variety of design and colors that are available and are being regularly introduced to the construction/electrical industry by the different switches manufacturers and can be defined as having half width size of a given outlet, or having the outlet at twice width size of a given "flat key".

"Flat key" is another object refers to hereafter and in the claims to a flat keys of hybrid switch, operated by a push throughout the key surface and to flat key or keys of a manual, toggle or rocker switch operated by a push of an indicated area of the push key.

The followed object is an outlet cabinet enclosure having same flat surface and height of AC outlet enclosure, including the currently disclosed a Combi switch of FIGS. 9A-9B, shown and disclose modified dual gung enclosure size and shape.

FIG. 9A shows the plug-in dual gang combi-switch in currently modify ISB. FIG. 9B shows a block diagram of the newly introduced combi circuit switch employing well known devices.

Wherein the body structure is having standard plug-in into current modified size and shape of the locking/guiding elements, height and a given dual gang width. The dual gang "width" is the size of two single gung side by side width. Be it tact operated switch or any other on/off push switch, switching from on to off and from off to on.

The combi tact switch may be wearable for use with hearing aid system. Particularly when the soft touch by finger may not fit future actions, such as requiring switch over by a toggle or tact switch may be necessary for user applying slight force.

The yet another object shown dual gang outlets in FIGS. 7. 8. and 13. 14. 15. & 16. cover the new modified different AC global outlets. Structured with improve and simplified inner casing, terminals and outer box. Comprised internal safety slider, with all elements and inner parts are structured for internal-external without a single screw be used or be plugged-in OUTLETS into the outlet or the ISB without a screw.

The recited FIGS. 7-16 show the casings, the inner casing parts, the casing inner terminals and self-lock power terminals contacts.

FIG. 17 illustrates the plugged-in simplicities by plugged in variety of, outlets and variety of plugged-in light switches, be it horizontal and vertical plug-into ISBs.

FIG. 18A disclose two assembled contacts 18A.1 and 18A.2+3 employ power clinging terminal 18A.12 and 18*a*.13, supporting flat sockets contacts of the two outlet, for engaging (a firs ever) a load two flat plugs with two outlet sockets, based upon applicant knowhow.

FIGS. 18*a*.4-18*a*.6 showing round structured sockets for round plug pins, used in USA or EP and other countries. The design and the proses shown in FIGS. 18A.4-18A.16 and from 18A.7-18A.11 are known metal works and need not to be explained the provided details. The important to show and explain that the present plug-in outlet are novel and unique.

The term "standard size and shape" pertaining the present invention and claims use the term "gang" to be the reference to a size and a shape of a single switch, hybrid switch, a relay or a touch pad such as single touch pad and other accessories having a single d for example, an intelligent IoT device.

The terms "gang" and "single gang" is defined as the standard shape and size of a given switching device or operating device for at least one given appliance. Single gang occupies a single mounting space within the ISB.

"Single gang touch key" can include two or more touch keys, icons for one or more than one given appliance.

The term "dual gang" has the size and shape for introduction an outlet device, such as at least one AC outlet as used for any known outlet in any given country or region. See FIGS. 7&8 The "dual gang" occupies dual mounting spaces within the support box. A dual gang AC outlet may combine two AC sockets, while a single gang switch can provide for SPST (single pole single throw), SPDT (single pole dual throw), DPST (dual pole single throw) and DPDT (dual pole dual throw) switching devices.

"Multi gang device" is defined as a device occupying a space of three or more gangs of the ISB, including but not limited to Ai (Artificial intelligence) or IoT (Internet of Things) device having complex circuits and/or sensors and/or requiring n optical and/or RFID accesses into the ISB, or requiring ISB with different optical or RFID signals band width, mandating different optical transceiver and or RFID antenna.

It should be noted that a plug-in device (be it a switch or an outlet) are differently applied. Wherein, a switch can be plugged horizontally into a vertical mounted ISB or vertically into horizontal mounted ISB.

Outlet as such can be plugged into any shape for as long as its front (the socket access) is correctly plugged for both horizontal and vertical mounted ISBs.

For this limit the present application shows (fit AC outlets in two versions, as correctly design—enabling any device to be plug into a plug-in receptacle, be it horizontal or vertical mounted ISBs. Further, a similar amended structure can be applied to ISBs to enable selective outlets and switches to be plugged into a given ISB be it horizontal or vertical mounted.

For such application it is also possible to structure (not shown) square or rectangle structure ISBs to accommodate any such vertical and/or horizontal be it switches, outlets, IoTs, Ai, curtain, blinds controller(s) or any other device(s) for operating appliances and/or devices within the home, office or units of given other buildings.

The dual sizes enabled the applicant to maintain and connect the ISBs vertically and horizontally mounted with no change what so ever. The changes mandated a restructure of all the countries power outlets (over 20 types) which the applicant view to be a patented unique-items, structure as shown in FIGS. 14, 15, 16 & 17. This mandates internal-external structure outlets, to be patented item.

The introduction of the horizontal only and/or vertical plugged-in power outlets, enabled for the first time ever to design and assemble a working plug-in electrical grid elements (outlets and switches) as if it was a LEGO game. The term LEGO refers the well-known cubic game structure.

The ISB as disclosed in U.S. Pat. No. 9,219,358 communicate between a chain of cascading ISBs via POF or other "optical cable", recited in the claims to include RF antennas. The practical limit to optical or RF signals is due to the electrical and building codes prohibiting introduction of low voltage copper lines, between or into a wall box, including ISB mixed with AC live or neutral lines or wires.

The POF is a fire retardant and a perfect insulator and is permitted to be mixed and mingled with AC power wires with AC appliance and AC source.

The disclosed ISBs linked in a cascaded chain and directly with the controller via POF (the first ISB in the cascaded chain) is/are the preferred connection via each end of a POF, being terminated by a sharp cut, using POF guillotine cutter.

The terminated end of POF is attached to an "optical-access" (OPTOPORT), by a push-in action, further disclosed to be locked into the optoport via locking screw. Alternatively, the cut end (terminated end) can be locked by a simple push-in via structured lock element needing no supporting tools.

The solution of which makes all the element of the ISBs to be plugged-in, be it the electrical wires, the POF and the plugged-in devices, including AC operated and AC powered devices, such as IoT, that cover variety of functions and specification.

Particularly IoT and/or Ai devices linked to the electric and/or the home automation grid, perform at least one function, such as referring to humidity, temperature, illumination, movement and the other known environmental sensing is included in the other "standard plug-in device", discussed and referred to above.

The introduction of IoT and Ai devices into the interior electrical grid is another major object of the preferred embodiment of the present invention is enabled by the POF.

The different communication via the IoTs and Ai to consider and to provide such as communicating data and commands via different signals such as RF, via given antenna, IR via IR transceiver (transmitter or transceiver), and optical via an optoport disclosed in U.S. Pat. No. 9,219,358, which is communicating at a lower speed for operating electrical appliances and reporting power consumption.

IoT, Ai and other devices "calling" for higher speed optical signal communication, for one of exchanging data with other intelligent devices (IoTs and/or Ai devices), and/or both communicating the referred to lower speed and/or higher speed via same optoports, or via separate two optical grids.

The current enabling only a single RF signal to be transmitted at a time, is expanded to be limited to one only in connection with the above recited IoT and Ai devices communication with each other and beyond, to be permitted to transmit only one RF signal, by any of the dual speed signal fed by two separated optical grids.

Each individual cascading grid, comprising terminated POF segments (cuts), with each cut is directed to propagate its signals via "four-way" optoports.

The four-way lower speed or the higher speed or both, provide for propagating commands and responses to and from electrical appliances and the controller via a given outlet, communicate short protocols and commands via one of the lower and higher speed signals.

Expanding the communication to higher speed by providing the IoT and Ai devices with higher speed circuits, operating the artificial intelligence devices (a given appliance) communicating data and/or mixed data and protocols. Thus, essential to generate higher speed for data propagation.

The low or high speed cascaded optoport require each optoport to comprise dual optical transceivers, each for two-way communication, i.e., receive and/or transmit for two directions, such as respond to command or data, or propagate the command or data to the next optoport of the next cascading intelligent box in the cascading chain, be it for lower speed, higher speed or combined.

The single cascading optoport operating in a two direction, each of the two way is in fact a joint crossing point of dual two way or "four-way" junction to optical signals, such as receive command, respond, transmit the command to the next (cascading segment) and wait for a response and re-propagate the response to complete the four-way exchange.

The propagation of optical signals can be therefore viewed as actual four ways. The repeated responding to the initial transmission are reversed propagation in each direction. No reversing incidences of signals collision is permitted, be it the lower or the higher speed signal disclosed in U.S. Pat. No. 10,225,005 by detecting propagated signal activity, detected by the receiving element of the optoport transceiver.

It should be clear that higher speed and four-way propagation are similarly provided via a setup of ISBs, linked via dual POF with the second POF is for higher speed and capable to handle the above signal activity and a following references, pertaining Ai and IoTs as well as other high-speed devices.

The lower speed signals, such as the use of short protocols with five bytes, as disclosed in U.S. Pat. No. 8,170,722 referred to above, to the lower speed, such as below 1K bit per second can detect by an opto transistor used in the opto transceiver, disclosed in U.S. Pat. No. 8,340,527. A detection duration of 0.1-2 mSec, as an example, provides sufficient time for blocking or preventing the opto-transmitter of the optoport from transmitting.

For higher speed signals the detecting and processing time may be insufficient to prevent collision, and moreover, for higher speed optical signals such as 100 K bit and above the use of photo transistors is not recommended.

The photo transistor processing speed is slower and the photo transistor amplification is non-linear, introducing speed limits. For higher speed the use of photo diode or optodiode is preferred.

On the other-hand the photo transistor provides self-amplification, while signals detected by optodiode need to be amplified, timed and shaped by added circuits which are costly. Further, the multi-processing represents a time delay in the sensing of light or propagated activity of signals via the cascaded POF and therefore may not be effective to ensure no collision.

The cascaded chain of POF cuts for higher speed communication is non an object of the present invention, light speed is, including a newly devised optoport comprising direct optical access to optical elements of a transmitter and a receiver, including a signal sensing optical signal circuit and controlling the transmission start time.

The newly introduced optoport elements and circuits substantially upgrading the intelligence capabilities of an intelligent IoT and Ai boxes of the preferred embodiments of the present invention.

The introduction of higher speed optical grid into the ISB of an electrical grid of a given premises, introduces higher speed grids, cascading between group of boxes. The installing of such higher performance grid cannot be completed without the grid being tested and verified, to be performing as intended, or be adjusted, tested and corrected to perform as designed.

It is preferable and is another object matter being an expanded capability (covering the lower speed cascading grid and the higher speed cascading grid) disclosed testers in U.S. Pat. No. 10,313,141.

The above considering that installers of electrical wiring devices are not fiber optic communication installer, nor knowledgeable in optical signal propagation.

The optical testers can be combined with a calibrating tester, for calibrating intelligent AC outlet that measures AC current and calculates the power consumed by a load, disclosed in U.S. Pat. Nos. 8,442,792, 8,594,965 which are incorporated herein by reference.

The disclosed optical signal testers, along with hand pull tools for release and remove the structured enclosure of the hybrid switches, the AC outlets, the IoTs and Ai devices.

Cover different sensors for the interior and exterior environments, sensing functions and detailing the known, and or are unknown at present time, to be introduced into the future.

All connected via at least one cut POF segment of a plurality of cascading optical segments of POF grid, with each segment is terminated by a sharp cut of a terminating guillotine hand cutting tool, disclosed in U.S. Pat. Nos. 8,453,332, 8,596,174.

The combined hand tools, form a combined support to electrical installers, adding substantial support to simplify and ease the installation and settings, as disclosed in the many US patens listed above in the prior art, and introduced herein by reference.

An introduction of ISBs into wall boxes of occupied premises, be it a stand-alone house or an apartment of high-rise building, will be problematic in many instances.

It may involve variety of physical elements and may not be accessible to an optical fiber, such as a cut and terminated POF segment to other boxes and/or to a system distributer, or to a controller direct (no in between possible).

To connect the whole of a given plurality of ISBs may require complete replacement of wiring devices and boxes, a high cost and inconveniences to the tenants occupying the residence.

For such reasons there is an option to provide the ISB and the interior of the premises with wireless grid including RF or IR in open spaces for part of the element and combinations, covering optical, RF and IR or optical and IR, optical and RF, RF and IR.

Further, the referenced U.S. Pat. Nos. 7,973,647, 8,170,722, 8,639,465 and the many US Pat. disclose two-way command converters including optical to RF, RF to optical, optical to electrical, electrical to optical, IR (optical) to RF, RF to IR, IR to electrical, electrical to IR, RF to electrical, electrical to RF and combinations thereof.

Introducing ISB powered via AC power line, along with other circuits of the ISBs for segmenting the boxes into confined areas and be cascaded by a segmented communication, be it electrical, optical, IR or RF and/or combinations thereof will remain complex.

Another object is to segment the communication signals and protocols to prevent collisions with other, non-optical signals by limiting a transmit of a selected given signal to one only, as managed and controlled by the home controller.

Providing different frequencies and/or modulation to electrical and RF signals, shorten the protocols by reducing bit count, addresses length. Including programs to prevent collisions with and between two or more ISBs in given segmented cascaded line as set. The particulars of which are further detailed in the preferred embodiment descriptions.

Further the well-known cordless telephones, operating at 25-60 MHz band for internal communication within a building. Using modulated signals, such as FM, AM, ASK, FSK and other well-known modulation for max. eight or sixteen zones or channels.

Using common coded protocols, unified for all frequencies, can be adapted (as an example) to communicate between the ISBs and/or the standard plug-in support boxes, and between plurality of IoT's and Ai's devices can use voice commands via an attached IoT or Ai plug-in device, using well known RF transceivers and antennas.

As explained above the lighting wires are complex, time consuming, complex to pre-design conduits tasks, that are regularly changeable prior to the building being completed. Once the installation is completed a change is trouble and costly.

The installers hopes are to have cover-all grids and ducts to all lights, independently from the wall boxes.

The applicant hybrid switches termed (Hiber™) (U.S. Pat. No. 10,586,671; 9,281,147; 9,257,251; 9,219,358; 9,036,320) and currently the Beamy Light actuators, enables first time ever the introduction of Central Lightings Wall Cabinet (s) and/or panel(s), to Physically connecting all of the home lights, operating any of the hybrid switches by a push of a key and by the controller command. With no single lighting power wire is connected to any of the ISB(s).

Instead of feeding power to a switch, the ISBs feeds optical data to the controller via the cascading POF grid. With the wall cabinet operate by the controller commands, based upon the ISB fed data.

The plugged-in outlets (with no switching capability) feed AC power for powering AC loads at random (via the load power plug), attached to the AC outlet of ISB, reporting the consumed power via the cascading POF to the controller.

The plugged-in Beamy-light switches are plugged-into the ISBs, to operate any of the lights or other loads by a finger touch as programmed. With no wires to measure, the actual power consumed is fed, calculated and report statuses by the Controller as programmed.

The further object is an introduction of a new line-up of 1-4 Combination switch, to be plugged into AC or DC ISBs, with n plugin Combi switch(es)™) into as many dual gangs (outlet accesses units) fit the COmbi Switches (COS) for switching on-off up to four lights per single switch, and reporting status and power consumed by up to as many lights, via each dual-gang of ISB, powered by AC or low voltage DC.

Each plugged-in Beamy Light operated switch (light switch or BLA) as such, disclosed further below, optically operated by two LEDs, installed into and operated by a CPU of the (ISB). Indicating the switch status and generating the Beamy light into the Combi switch. The other element in the (ISB) is a photo transistor identifying and reporting the on-off state.

A new plug-in casing for introduction into a dual gang plug-in size for outlet within the ISB. The ISB including an LED and a photo transistor for identifying, displaying and reporting the on-off status to the CPU of the (ISB).

The lighting system complexities and costs are directly relate-to the wiring via the prior wall boxes. Each chandelier or single light needs to be switched. Mandating at least one or plural switches for each lighting unit, be it chandelier or multi light bulbs.

Each light must be connected via at least two wires AC (or DC power).

A commonly sized home of approx. 100 $m^2$ install some of 20-25 light bulbs and some 20-25 on-off switches. Each light bulb must be connected by two wires, neutral and live line.

The plurality of ducts and wire separately drawn (in part) together. The high cost to light installations are the tip to over-come. The present application further introduces the most efficient way to simplify the light's wiring and the ducts plus wiring costs, including power consumption reporting, by and via a Beamy actuator and/or the Combi switch further provide another new object.

The Beamy Light Actuators with the Combi switches generate optical signal or Beamy, each communicated via at least one cascading POF with the Combi switch and the Beamy actuator via a given cascaded POF. Wherein the Combi switch is further operated by a push of the Combi switch key or via an optical command fed by the home controller, in response to a push of a key assigned to a given Combi switch.

The first ever lighting hybrid cabinets or panel, operate in concert with the cascaded ISBs, and by a parallel on-off switch via common push keys within the hybrid switches.

The push Combi key is new introduction and is not a mechanical operated hybrid switch. Mechanical hybrid switches are not known to be operated by an optical Beamy actuator.

The known hybrid switches, are not known to be generating an on-off light command via POF to a given lighting cabinet, comprising hybrid switches for lighting the entire home.

The above along with a Beamy light cut and Combi switches, provide for an object and a freedom to a system engineer and electrical installer, the object and ability to design a central lighting cabinet(s), and set panels for connecting the L and N power lines via an efficient setup of wall ducts. Live and neutral wire lines, fed from a single or several lighting cabinets, switching hybrid switches, one for each light within, and surround the home.

The light cabinet(s) and/or panel(s) discussed above and the hybrid switches operated by the home controller, based on Beamy light or optical signal propagated from the Beamy light actuator or the combi switch.

It is important to note that each given plug-in switch is self-set via and into the ISB for recording the given plug-in switch, followed with details set into and via the controller display screen.

The on or off command to a given hybrid switch is optically propagated via a cascaded POF to the home controller, and from the controller to the given hybrid switch.

In the rare event that a Beamy light actuator or a combi switch are defective and are unable to generate a command, or in a rare event that the controller is defective, the home' dwellers can operate by—(Finger touch) any of the lights manually, or via the assigned push key, to each hybrid switch as assigned, onto the front lighting panel.

The terms "touch" or "finger touch" and/or "soft touch" refer to a finger soft touching a wall mounted or other fixedly mounted push key for switching a light element "on" or "off" and/or the terms "push" or "soft push" may be used to replace the terms "touch" and/or "soft touch" as the case may be, including the claims.

The expressions "soft", "push" or "touch" refers in the present application and in the claims to a user pushing, touching or applying a soft push or pressure to actuating a key to cut the "Beamy-light" of a visible or non-visible spectrum to pass, or deny the "Beamy-light" from passing through the opening of present presentation.

The two differing "touch" or "push" there-by refers to a solid push of a light switch key, installed into an ISB and onto a wall.

The "other Beamy-light switch" is a wearable light switch attached onto such as a decoratively designed shirt, or onto a wearable tie or other wearables.

The Beamy light and the combi switches differ in their disclosed functions, the first one switches on-off (a light for example) and the other directs sound volume to increase or decrease (up or down) level steps. However, switches basic functions I.E. SPST or SPDT are identical for both versions.

A DPST and DPDT version are similarly identical via dual optical cascading grid lines via the ISBs. Light switches are known to be formed on a base of color spectrum. It is stressed that the present light switches are operated by a cut of the optical signal, fed via POF or any other optic cable, straight or bended. None of which was ever disclosed.

The Combi switch in contrast, is introduced for currently existing home automation (cascaded via POF), that are in need for added light switches but cannot change or add an existing-ducts or wires.

The plug-in Combi switch is introduced to provide a plug-in device replacing a given dual gang outlet with a link to a given ISB optical access, for switching 1-4 lights on-off wirelessly lights. Further Combi switch particulars are disclosed in page 37 line 3 page 38 line 22.

The commonality of the Home Automation and the Hearing Aid basics control and communication via optical signals cannot be denied. Both the Hearing aid and the Home controller must solve past and current fundamental issues by an optical switch as disclosed above.

The decorating surfaces of keys and outlets are preferably including decorating surfaces of communication connectors such as the known RJ-45 or USB connectors for connecting routers, printers and other PC peripherals and/or antenna socket or audio socket for connecting low voltage devices via audio connectors, cable television connectors, television antennas or dish antennas to be all in similar standard enclosure, to form a standard structures and sizes fitting the plug-in structures of the hybrid switches of the intelligent outlets.

The half gang size and shape as disclosed in U.S. Pat. No. 10,225,005. to the home controller.

The applicant presentation is not common in filing patent application. The applicant apologizes for shifting few "parcel that may not be clear with the applicant intent pertaining both the home automation and the hearing aids.

The examiner handling this application may be confused with a non clear direction and the combinations that touch upon individual item, elements, device or system. The applicant preempts with this explanation with the aim to introduce a very serious common single that should not be viewed as single.

As we all know but not understand the reason, the home automation is failed and the history of Edison is covering the home automation.

And in parallel, the history of hearing aids dating back to WWII in 1940-1945 at time that light tubes were used for amplification with the light bulbs cutting the during the 1960s and creating a standard for hearing aids that is totally evolving into limiting sizes that is varies of today and ignoring the meaning of hearing aids. It is not simple to create natural hearing aids. So it is about the time to find means to enable the hearing aids needing person the ability to self-control.

The hearing aids is a human VS a machine, and the home automation is facing the decorated devices VS a control that is needed in the home. No device can replace the current capabilities to control the entire home as program. Yet, the electrical industry is searching for ghosts to replace a home controller. Some of the home devices are under strict control and rules that are non bending that can be replaced but no one has ever taken a step to change the home electrical structure that is a massive obstacle some of which is based upon antique sizes.

As to the remains home automation items to be further detailed are the method for setting at least one of home automation electric grid and network formed to replace a century old wiring, screws and terminals into a solid highly conducting electric power (N19.3, GND19.11, AC19.7) into a shorten (the depth) of all ISBs rear surface and, transforming a plurality of individual different three power wires; L for Live, N for Neutral and G for Ground, into fit wires to introduce a cascading power lines.

FIGS. 18B and 19A&B clearly disclose particulars and the processes for latching the stripped wires L-N-G 19.3-19.11 and 19.7; the other tool involved is the shown release tool 280, shown in FIG. 19C, a known hand tool to release locked elements as 19.8-1-19.8-3, the uniqueness of the three springs is to firmly lock the wires and be able to release by all the three release tools 19.94, enabling a removal of a century old integration of electrical wires of at least one of a residential and a commercial unit via cascading ISBs, each connects to said electrical grid directly and to at least one load via at least one plugged in electrical wiring device. said plurality of ISBs are linked to at least one of a controller, a distributer and a command converter by one of bidirectional optical signals via one of cascading grid of optical cable and at least one of wireless RF and IR signals bidirectionally propagated in open air;

said ISB comprising a CPU, at least one of setting selector and a memory for said setting and for loading particulars data, circuits for operating and for calculating the power consumed by each load via each said wiring device and communication circuits for communicating at least one way of bidirectional signal with said one of controller and command converter via one of said home automation grid and network, said method comprising the steps of:

loading said particulars data pertaining to each installed intelligent support box as structured including data pertaining to said at least one wiring device into said memory via said communication circuit;

setting one of identifying numeral and one of a code and address for identifying the installed location within said unit of each of said intelligent support boxes by one of said setting selectors and via said controller or wirelessly via one of an hand held loader and a pad;

The applicant is requesting the examiner to carefully review the issues pertaining common light bulbs via common wall switch. There are gaps between lights install by professionals, not really understand why no solutions for lightings are found.

One big issue is/are the spacing within the residence wall boxes (such as from 1880-Edison era) remaining to be 4×4 in. Over the years the problems were persistent but were never challenged the rules of the game. FIG. 2A clearly presents the current problems in illustrated reality.

Other issues in current days lights are; almost all bulbs are LEDs based, needing low voltage supply, and demand is growing. Be it 12V, 100V or 250V our world gets hotter.

The above is the easy part . . . One cannot light a bulb without electric wires and contacts (switch) in any given form! The wire (in all forms) is needed to feed the electric power, be it AC or DC.

So here we are, the situation where the numbers of lights are growing, with the issues and the industry was and is looking for ways to eliminate the wiring. Not only, going back to basics, one cannot switch a bulb on without electric power and a switch. Wiring problems are due to the switch location, light location and ducts inside the walls.

None of above including wireless or suggesting wire in any form. Similarly, no contacts or a combined element(s) are disclosed.

The industry suggests cutting of wires length, and searching how to make and/or apply wireless or contactless devices.

The applicant has foreseen and have disclosed within the present application the light beam elements, but not the cut of a light, to be a counter, or substantial imaginary filing with intent to file a list of patents—for cut light switch solutions.

None of the discussed and shown or suggested is being an imaginary hybrid switch(es) or an imaginary beam light switch. Some two years ago a new switch idea popped up under the term beam light switch. The beam light is actuated by a cut of optic cable. Some believed that they could make a switch by using beam light. Beam light cannot generate, nor carry electric power. Electric light is a result of a visual generated beam.

To shorten the "story" the applicant discloses a "Beam light" and a "Beamy" switches, actuated by a cut of plastic optical fiber and a contact closure respectively.

In all cases the answer to the switch, the answer (currently) discloses the absolute need for hybrid switches or hybrid circuits. The applicant has issued US patents, dated 2015 to 2020, U.S. Pat. Nos. 9,018,803; 9,036,320; 9,219,358; 9,257,251; 9,281,147; 9,541,911 and 10,586,671 for hybrid switch and hybrid circuits and the Beamy including the Combi switches are applied together within the present application.

What is claimed is:

1. A method of installing or setting at least one of home automation grid and network, structurally hardened for supporting cascading structure via hardened three separated solid structured conductors, including self-lock for a plug-in power wires, Live (L), Neutral (N), and Ground (G), the method further providing for at least one or two Plastic Optical Fiber (POF) lines, and for combinations via three power lines and two communication signal lines is enabled by a simple plug in assembly into Intelligent Support Boxes (ISB)(s), along with an electric wall box and hybrid switches, be it a residential and a commercial unit, via a chain of the cascading plurality of ISBs linked to said cascaded POF grids and/or direct to RF and IR signals, wherein a plurality of said ISB(s) being set and linked to at least one of a home controller and a command converter, and be commonly and/or further informed by one of Beamy lights and/or Combi signals via one of cascaded POF grid, and at least one or two way wireless, RF and IR signals;

said ISBs being self-set and adjust in concert with n universal serial bus (USB) and at least one of setting selector and a memory for said setting and to include all data particulars loads, including the power consumed by each load via each said ISB and via communication circuits for communicating at least one way of bidirectional signal with one of a controller and a command converter, via one of said home automation grid and network, said method comprising the steps of:

a. loading said data particulars to ISBs as designed and set, including data pertaining said at least one device memory via at least one of said communication circuit (s);

b. setting one of identifying numeral and one of a code and address for identifying the installed location within said unit of each of said ISBs via one of the setting selectors and the said controller and/or wirelessly via one of hand-held loader and a pad;

c. recording into said memory and via said communication circuit(s) and said at least one of home automation grid and network, into at least one of a memory included in said one of the controller and command converter the stored particulars and the identified installed location within said unit; and d. identifying each load powered by one of said power wiring via one of the setting selectors and a given load identifier, stored in the memory of said one controller and command converter, wherein a cut-off of the propagated Beamy light is caused by a plunger-actuated displacement of one POF line, within one of the ISBs, the plunger-actuated displacement of the one POF line physically interrupting an optical path of a closed optical coupling between a Beamy light generator and a Beamy light receiver disposed within said one of the ISBs to link and delink at least one light bulb, and wherein said one of the ISBs self-identifies and records each said cut-off as a Beamy cut action via said universal serial bus (USB) and self-reports said cut action over said cascaded POF grid to said one of the controller and command converter.

2. The method according to claim 1 wherein said grid is one optical grid for propagating at least one of said optical signals via said optical cable including IR signal in line of sight in said open air, said network including signals comprising said optical signals in line of sight, said RF signals in open air and combinations thereof; and wherein a group comprising a video interphone monitor, a shopping terminal, a dedicated home automation controller, a home automation grid distributor, a key pad, a touch pad, hand held controller and combinations thereof are linkable with said controller.

3. The method according to claim 2 wherein said optical signal and electrical signal are converted two way for interfacing the propagated optical signal with electric signal and electrical signal with optical signal via one of said command converter and automation grid distributor.

4. The method according to claim 1 wherein said bidirectional signals comprising an operate commands for on-off switching and operating at least one given load powered by at least one given electrical wiring device and responses for providing said one of controller and command converter with at least one of data pertaining the status of and one of the current drawn and the power consumed by said at least one given load.

5. The method according to claim 4 wherein a combination of said particulars of a given load powered by a given electrical wiring device, said one of installed location and one of code and address, said operate commands and responses are integrated into integrated control commands stored in said memory and a memory of at least one of said controller and command converter for storing the integrated control commands during the initial setup of the system and upgrade via the controller at random, enabling the propagating of short recall of operate commands and responses via said grid and network and operate said given function of said given load in the given location via a single integrated command and a single integrated response.

6. The method according to claim 5 wherein a specific load powered via said intelligent support box is communicating via one of said RF signal in open air and via one of said optical signal through said optical port and IR in line of sight wherein said specific load is responsive to a specific commands and responses only and, wherein said memory and said memory of said controller and said command converter are updated to include said specific commands and responses and the intelligent support box (ISB)(s) is further set via said controller to communicate said specific commands and responses with said specific load.

7. Said method according to claim 5 wherein variety of loads powered via said intelligent support box are communicating via one of said RF signal in open air and via one of said optical signal through said optical port and in line of sight wherein said variety of loads are responsive to diverse commands and responses and wherein said memory and said memory of said controller and said command converter are updated to include said diverse commands and responses and the intelligent support box is further set via said controller to communicate with each of said variety of loads only diverse commands and responses, each commensurate with each one of said variety of loads.

8. The method according to claim 1 wherein said intelligent support boxes comprising a restructured body for unifying both versions horizontal and vertical into a single size, shape and capacity for supporting said electrical wiring devices selected from a group comprising manual switches, hybrid switches, relays, power outlets, power sockets and combinations thereof.

9. The method according to claim 8 wherein said intelligent support box is structured to switch on-off a load directly connected to one of an attached manual and an hybrid switch including the switching on-off of a load, powered via a given power outlet jointly, attached to said intelligent support box for powering a load.

10. The method according to claim 1 wherein said residential and commercial unit is selected from a group comprising a single home, an apartment of a building, one of a room and suit of a hotel, a shop, a restaurant, a club, a given area of a warehouse, an office, a garage, a workshop, one of a class and classes of a school, a library, one of a room and rooms of an hospital, at least one of a room and rooms of a public building, and at least one of area and a zone of a factory.

11. A structurally integrated electrical grid within one of a residential and a commercial unit with at least one of home automation grid and network via plurality of intelligent support boxes each connects to said electrical grid directly and to at least one load via at least one electrical wiring device, said plurality of intelligent support boxes are linked to at least one of a controller and a command converter by one of bidirectional optical signals via one of cascading grid of optical cable and at least one of wireless RF and IR signals bidirectionally propagated in open air;

each of said plurality of intelligent support boxes comprising a CPU, at least one universal serial bus (USB), at least one of setting selector and a memory for setting the home automation grid and for loading particulars data pertaining to each installed intelligent support box as structured including data pertaining to said at least one wiring device, circuits for operating and for calculating the power consumed by each load via said wiring device and communication circuits for communicating at least one way of bidirectional signal with said at least one of controller and command converter via one of said home automation grid and network;

each of said intelligent support box is structured and set to attach at least one of a given wiring devices and is one of preloaded and randomly loaded with said particulars and further comprising a structured current drain sensor for each attached wiring device for said power consumed calculation, said setting including one of an identifying numeral and one of a code and address via said at least one of setting selector or wirelessly via one of an hand held loader and a pad for loading a box identifier to said memory and to the memory of said at least one controller and command converter for recording and identifying each of said intelligent support boxes and their installed location within said unit; and each given load powered via said given wiring device is identified via one of said setting selector and a given load identifier stored in said memory and in the memory of said one of controller and command converter, wherein a cut-off of the propagated Beamy light is caused by a plunger-actuated displacement of one POF line, the plunger-actuated displacement of the POF line physically interrupting an optical path of a closed optical coupling between a Beamy light generator and a Beamy light receiver disposed within said one of the intelligent support boxes to link and delink at least one light bulb, and wherein each said intelligent support box self-identifies and records each said cut-off as a Beamy cut action via said universal serial bus (USB) and self-reports said cut action over said cascading grid of optical cable to said at least one of the controller and command converter.

12. The structurally integrated electrical grid according to claim 11 wherein said grid is one of a low voltage bus-line for propagating electrical signal and an optical grid for propagating at least one of said optical signals via said optical cable including IR signal propagated in line of sight in said open air, said network including propagation of signals comprising said optical signals via said optical cable and said IR signals in line of sight, said electrical signals via bus line, said RF signals and combinations thereof; and said controller is selected from a group comprising a video interphone monitor, a shopping terminal, a dedicated home automation controller, an home automation grid distributor, a key pad, a touch pad, hand held controller and combinations thereof.

13. The structurally integrated electrical grid according to claim 12 wherein said optical signal and electrical signal are converted two way for interfacing the propagated optical signal with electric signal and electrical signal with optical signal via one of said command converter and an automation grid distributor, and wherein said RF signal and said optical signals are converted two way for interfacing said RF signal with optical signals and said optical signals with RF signals via at least one of said automation grid distributor and said intelligent support box for exchanging signals commensurate with command and response signals of a given load via said automation grid.

14. The structurally integrated electrical grid according to claim 11 wherein said bidirectional signals comprising an operate commands for on-off switching and operating at least one given load powered by at least one given electrical wiring device and responses for providing said one of controller and command converter with at least one of data pertaining the status of and one of the current drawn and the power consumed by said at least one given load.

15. The structurally integrated electrical grid according to claim 14 wherein a combination of said particulars of a given load powered by a given electrical wiring device, said one of installed location and one of code and address, said operate commands and responses are integrated into integrated control commands stored in said memory and a memory of at least one of said controller and command converter for storing the integrated control commands during the initial setup of the system and upgrade via the controller at random, enabling the propagating of short recall of operate commands and responses via said grid and network and operate said given function of said given load in the given location via a single integrated command and a single integrated response.

16. The structurally integrated electrical grid according to claim 15 wherein a specific load powered via said intelligent support box is communicating via one of said RF signal in open air and via one of said optical signal through said optical port and IR in line of sight wherein said specific load is responsive to a specific commands and responses only and, wherein said memory and said memory of said controller and said command converter are updated to include said specific commands and responses and the intelligent support box is further set via said controller to communicate said specific commands and responses with said specific load.

17. Said structurally integrated electrical grid according to claim 15 wherein variety of loads powered via said intelligent support box are communicating via one of said RF signal in open air and via one of said optical signal through said optical port and in line of sight wherein said variety of loads are responsive to diverse commands and responses and wherein said memory and said memory of said controller and said command converter are updated to include said diverse commands and responses and the intelligent support box is further set via said controller to communicate with each of said variety of loads only diverse commands and responses, each commensurate with each one of said variety of loads.

18. The structurally integrated electrical grid according to claim 11 wherein said intelligent support boxes comprising horizontally oriented boxes diversified in size and capacity and vertically oriented boxes diversified in size and capacity for supporting said electrical wiring devices selected from a group comprising manual switches, hybrid switches, relays, power outlets, power sockets and combinations thereof.

19. The structurally integrated electrical grid according to claim 18 wherein said intelligent support box is structured to switch on-off a load directly connected to one of an attached manual switch and an hybrid switch including the switching on-off of a load powered via a given power outlet jointly attached to said intelligent support box for powering a load.

20. The structurally integrated electrical grid according to claim 11 wherein said residential and commercial unit is selected from a group comprising a single home, an apartment of a building, one of a room and suit of an hotel, a shop, a restaurant, a club, a given area of a warehouse, an office, a garage, a workshop, one of a class and classes of a school, a library, one of a room and rooms of an hospital, at least one of a room and rooms of a public building, and at least one of area and a zone of a factory.

* * * * *